US007197620B1

(12) United States Patent
Adcock

(10) Patent No.: US 7,197,620 B1
(45) Date of Patent: Mar. 27, 2007

(54) SPARSE MATRIX PAGING SYSTEM

(75) Inventor: James W. Adcock, Stillwater, MN (US)

(73) Assignee: Unisys Corporation, Blue Bell, PA (US)

( * ) Notice: Subject to any disclaimer, the term of this patent is extended or adjusted under 35 U.S.C. 154(b) by 572 days.

(21) Appl. No.: 10/315,557

(22) Filed: Dec. 10, 2002

(51) Int. Cl.
*G06F 12/00* (2006.01)

(52) U.S. Cl. .................. 711/202; 711/206; 711/207

(58) Field of Classification Search ............. 711/202, 711/206, 207
See application file for complete search history.

(56) References Cited

U.S. PATENT DOCUMENTS

| | | | |
|---|---|---|---|
| 5,420,993 A | | 5/1995 | Smith et al. |
| 5,530,823 A | * | 6/1996 | Tsuchiya et al. ............ 711/207 |
| 5,724,538 A | * | 3/1998 | Morris et al. ............... 711/206 |
| 5,732,404 A | | 3/1998 | Johnson et al. |
| 5,815,686 A | | 9/1998 | Earl et al. |
| 6,327,640 B1 | * | 12/2001 | Gittinger et al. ............ 711/105 |
| 6,832,295 B1 | * | 12/2004 | Stonecypher ................ 711/135 |
| 6,868,017 B2 | * | 3/2005 | Ikeda ..................... 365/189.05 |

OTHER PUBLICATIONS

Andrew S. Tanenbaum, Structured Computer Organization, 1990, Prentice Hall, pp. 321-329.*

* cited by examiner

*Primary Examiner*—Reginald Bragdon
*Assistant Examiner*—Mehdi Namazi
(74) *Attorney, Agent, or Firm*—Charles A. Johnson; Mark T. Starr; Crompton, Seager & Tufte LLC

(57) ABSTRACT

A sparse matrix paging system is provided that dynamically allocates memory resources on demand. In some cases, this is accomplished by dynamically allocating memory resources, preferably only after a page has been requested. Such a sparse matrix paging system may allow a platform with a large linear address space to more efficiently execute on a platform with a smaller linear address space. Preferably, the sparse matrix paging system only indexes those pages that are actually requested and used in the address space on main store pages or backing store pages. Further, the backing store is preferably not involved unless the total address space allocated by the operating system exceeds the available main store pages.

24 Claims, 42 Drawing Sheets

SPARSE MATRIX PAGING SYSTEM

TECHNICAL FIELD OF THE INVENTION

The present invention generally relates to the field of data processing systems, and more particularly to memory paging systems for data processing systems.

BACKGROUND OF THE INVENTION

The term "virtual memory" (or virtual storage) denotes the simulation of a uniformly addressable computational memory large enough to accommodate all instantiations of a program on all configurations of a computer system. Virtual memory originated as a way to simplify application programming in machines with memory hierarchies. With virtual memory, application programmers no longer had to include commands to move blocks of information among the levels of the memory hierarchy as the operating system manages the application's virtual memory.

Virtual memory is also being incorporated into parallel processing computer systems that may include hundreds or even thousands of computers (each with a processor and local RAM), hooked together by an interconnection network. The virtual addressing concept is being extended to map a single, common virtual address space across distributed systems. Its uniform addressing scheme allows any processor to refer to any data element in any of the component computers' memories. The memory access algorithm scales across many sizes of computer systems. Thus, virtual memory also hides distributed memory.

The key to virtual memory is a uniform address format and addressing protocol that is independent of the sizes of memory levels and the number of computing elements. Virtual address space is the programmer's view of memory. Typically, the virtual address space contains $2^A$ words (or bytes) on a machine whose processors use A-bit virtual addresses. The entire set of addresses supported by the 2200 computer system commercially available from Unisys Corporation is called the "absolute address space" of the system. The absolute address space is often much larger than the virtual address space. The absolute address space holds all programs and data which are spread across the various virtual address spaces visible to different programs or threads of control. The set of addresses recognized by the hardware is called the "real address space" of the machine. The real address space is bound by the physical constraints of the memory size. The real address space contains $2^B$ words on a machine with B-bit addresses. While some computer architectures utilize a three-level memory hierarchy of virtual, absolute, and real addresses as discussed above, most utilize a two-level memory hierarchy of virtual and linear addresses.

The virtual address space does not have to be the same size as the real address space. If it is smaller, RAM typically holds several address spaces and the virtual memory system implements multiprogramming. If it is larger, the virtual memory system typically automatically moves information from a backing store into RAM as needed, to simulate the appearance that the whole address space is available to a program in RAM. Even if it is larger, the same RAM can be partitioned among several address spaces, again implementing multiprogramming.

The mapping from processor-generated addresses to memory-recognizable addresses is often carried out by a dynamic address translator. When the program generates a read access request, for example, the processor address translator presents a read request to the memory system, and passes back the value read to the processor and thus to the program. Similarly, when the program generates a write access request, the processor address translator presents the write to the memory system. This design makes address translation transparent to the computer programmer. The program view of addressing invariance with respect to changes in the machine's configuration or the distribution of data among memory elements in the memory hierarchy is achieved by allowing the operating system to change the mapping tables during a program's execution, thereby reflecting the system state dynamically during the mapping operation, rather than in the program itself.

As software systems become more and more complex, there is an increasing demand for more storage. The size of the virtual address is typically only limited by the addressing scheme of the computer system and is the amount of auxiliary storage available, and not by the number of main storage locations. Due to the mapping of virtual addresses into real addresses, virtual addresses storage systems are often able to satisfy the ever increasing demand for storage in a manner that is transparent to the user who may regard all the storage space as addressable main storage.

The translation of virtual addresses into physical addresses that can be used to access memory is often accomplished by dividing the virtual addressing space into fixed size segments referred to as "pages", which are analogous to the data portions of the records in a data base. The virtual address space is divided into pages, and page table entries are used to designate those pages which are currently resident in main, or real, memory. The classical method of accomplishing this is to select part of the virtual address as an index. Another portion of the virtual address is selected as a comparison segment. The remaining bits of the virtual address then serve as the in-page, or offset, address into the page. The combined index and comparison portions of the virtual address are analogous to the key portion of a record in a data base system.

To access the page table entries, a number of least significant bits (for example, 12) can be used as the offset into the page and the next N significant bits may be used to index into the page table. When used in this fashion, the operation is referred to as "hashing", and the page table is also termed a hash table. The entries into the hash table can initiate a number of chains of page table entries all of which have the same value of N bits (e.g. synonyms). Each of the entries contains the remaining bits of the virtual address that it represents, and the value of N is determined by the hardware and software that is utilized to implement the algorithm.

In operation of this system, the instruction processor goes to the hash entry that is specified by these N bits and locates a chain of all pages whose virtual addresses include the same value of the N bits. The instruction processor then progresses through the chain from one page entry to the next, and at each entry compares the comparison portion of the virtual address to be located with a stored comparison portion of the page table entry until a match is obtained. Once a match is obtained, the real page address is retrieved from the entry, and then concatenated with the page offset to form the complete real address. In the event that the instruction processor does not find a match in the chain, (i.e., there is no entry containing the value of the comparison portion), the page is not resident in real memory.

A more detailed description of a prior art technique for address hashing is shown in FIG. 1. Paging techniques have been utilized to access memory in virtual memory systems through the use of key fields. For example, and referring to FIG. 1, in such systems virtual address requests 10, 12 may be used to map large virtual addresses into comparatively small real address space. This has been accomplished by dividing the virtual addresses into compare, index (or key), and offset segments. The index, or key, portions 14, 16 of the virtual addresses 10, 12 are used to reference memory locations in a page table 32. The compare portions 18, 20 of the virtual addresses 10, 12 represent values, each of which may be associated with a number of page table entries. The page offsets 22, 24 of the virtual addresses 10, 12 represent the offset location of the requested address in a page, which may be utilized along with an appropriate real page address 36 to obtain a real address 28. Since only the index portions 14, 16 of the virtual addresses 10, 12 are utilized to select page table entry 34, auxiliary techniques must typically be employed to resolve conflicts among non-unique index portions in a paged virtual memory system of the described type. One such technique previously mentioned is the chaining method.

When prior art virtual memory systems incorporate tables, such as the page table 32, the value of the index 14 of the virtual address 10 may be used to locate the desired page table entry 34 in the page table 32. The page table entry 32 includes a specified real page address 36 and a compare segment 38. A second virtual address 12 can also be used to locate a second entry in the same page table 32, wherein its index value 16 may be the same as index value 14, providing there is no conflict between the values of the compare segments 18 and 20. FIG. 1 illustrates a prior art implementation in which index 14 and index 16 both point to the same page table entry 34. Because of this possibility of encountering non-unique index values, it is necessary to look at the compare portion 38 of the page table entry 34, and to compare this with the compare portions 18, 20 of the virtual addresses 10 and 12, respectively. Although FIG. 1 implies that this comparison takes place in a simultaneous manner, sequential comparison of the compare segment 18 with the compare segment 38, either followed, or preceded, by comparison of the compare segment 20 with the compare segment 38, is consistent with prior art implementations. This comparison may be achieved by use of either a hardware comparator, or through a software algorithm, either of which may be achieved in various ways now known to those skilled in the art. It is assumed in this description that a comparison match occurs between the compare segment 18 and compare segment 38, but that no match occurs between the compare segment 20 and the compare segment 38.

The values of compare segment 18 of virtual address 10 and of the compare segment 38 of the page table entry 34 are coupled to a comparison device, or step, 40, as represented by the line 42 and the lines 43, 44. In a hardware implementation, these lines each represent signal-carrying data lines. In a software implementation, they represent program data flow. The comparison check provided by the comparison device or step 40 thus indicates a match on the lines 46, 48, which are coupled to enable the enabling gates, or steps, 50, 52, respectively, which may be achieved through either hardware or software implementation.

If the compare segments 18 and 38 are equal, the enabling gate 50 couples the offset segment 22 of the virtual address 10, as indicated by the lines 49 and 51, to serve as the least significant bits, or offset 26 of the real address 28. Likewise, the real page address 36 of the page table entry 34 is coupled, as represented by the lines 54 and 56 through the gate 52, to serve as the most significant bits portion 30 of the real address 28. The real page address 30 is combined with the offset portion 26 to form the total real address 28.

The comparison device, or step, 58, as the case may be according to whether implementation is accomplished through hardware or software, represents a comparison of the compare segment 20 of the virtual address 12, with the compare segment 38 of the page table entry 34. The values of the compare segment 20 and of the compare segment 38 are coupled to the comparison device, or step, 58 for such comparison as represented by the line 60 and the lines 43, 45. The lines 60, 43, 45, like the lines 42, 43, 45, may represent either data lines or program data flow according to whether a hardware or software implementation is undertaken. In the illustrated embodiment, it is assumed that although index 14 and index 16 are equal, the values in compare segments 18 and 20 are not. Since the page table can contain only one page table entry which has a given index value, the page table entry 34 corresponds only to virtual address 10 and not to virtual address 12. This being the case, the comparison device, or step, 58 will indicate that there is no comparison for virtual address 12, and, as indicated by the output on the line 64 to the mass memory access 66, it will then be necessary to obtain the contents of virtual address 12 from mass storage since it will not be resident in the main memory. The complete virtual address 12 is supplied, as indicated by the line 68, to active mass memory access 66 so that it may be used to supply, as indicated by the line 70, data stored at the desired location in backing storage, since in the illustrated Figure it is assumed that the compare segment 20 does not match the compare segment 38.

In other words, FIG. 1 does not illustrate the conflict case where both virtual addresses 10, 12 are present in main memory. If both of the virtual addresses are present in main memory, a conflict mechanism must be called to resolve the ambiguity. As previously noted, this is typically accomplished by searching an extended chain of page table entries, each of which point to another element in the chain, until the search terminates either by locating the desired real address, or by providing a "page fault" that indicates that the virtual address is not resident in main memory.

In order to provide a relatively large linear address space for today's user applications, the operating system often loads the application into the absolute address space and reserves a relatively large area of contiguous absolute address space following the load area. This gives each user application the ability to dynamically expand its address space. In order to accomplish this, the absolute address linear space can be much larger such as 262,144 times larger them the available real address space. Despite this, storage pages are typically created for each of the absolute addresses that are reserved by the operating system.

The operating system typically uses a second level of memory management to map the absolute address pages to real addresses. The operating system often performs the management of the page tables as well as converting I/O addresses from absolute to real addresses. A typical paging system involves a backing store file that contains all of the allocated storage pages, with a subset of the pages on the backing store loaded into main store pages as needed.

A limitation of such systems is that in many cases only a relatively small number of the absolute addresses are actually used by the user applications running on a system. Therefore, such schemes can often result in an inefficient use of resources, which can reduce the capacity and/or performance of the system. In some cases, a user application may have to access the backing store even though some of the locations in main memory are unused by another user application. This can significantly reduce the performance of the system.

SUMMARY

The present invention provides a sparse matrix paging system that dynamically allocates memory resources on demand. In some cases, this is accomplished by dynamically allocating memory resources, preferably only after a page has been requested. Such a sparse matrix paging system may allow a platform with a large linear address space to more efficiently execute on a platform with a smaller linear address space. Preferably, the sparse matrix paging system only indexes those pages that are actually requested and used in the address space on main store pages or backing store pages. Further, the backing store is preferably not involved unless the total address space allocated by the operating system exceeds the available main store pages.

In some embodiments, the sparse matrix paging system is included in an operation system. In other embodiments, the sparse matrix paging system is provided as an emulator or the like and executes separately from the operating system. This may allow the operating system, executing instructions on an emulated platform, to be relieved of its paging responsibilities. The sparse matrix paging emulator, executing in native mode, may thus be responsible for at least in part maintaining an apparent linear absolute address space.

In one illustrative embodiment, the sparse matrix paging emulator calculates a virtual address from an absolute address by hashing the absolute address to form both an index into a look up table and an absolute address tag. The absolute address lookup table entry is locked and the chain of entries is searched for a match on the absolute address tag. The algorithm preferably dynamically converts chained entries to a second level of indexing if the number of chained entries exceeds a predetermined threshold. A successful search yields a pointer to the page assigned to the absolute address block.

In the event the look up table does not contain a pointer to the page for the absolute address, the absolute address of the page may be hashed to form an index in a backing store look up table. If the page does exist on the backing store, then the page may be acquired from the Least Recently Used (LRU) queue, placed on the absolute address look up table, and loaded from the backing store. If the page does not exist on the backing store, then a page may be acquired from a Least Recently Used (LRU) page queue, generated and placed on the absolute address look up table. In either case, if the acquired page from (LRU) is not squashed (written to zeros or released by exec), then the page is preferably written to backing store. The backing store control structures are preferably organized to allow large variations in the absolute address range stored on the backing store. This may reduce input/output to the actual page being stored or loaded.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION

Figure 1:
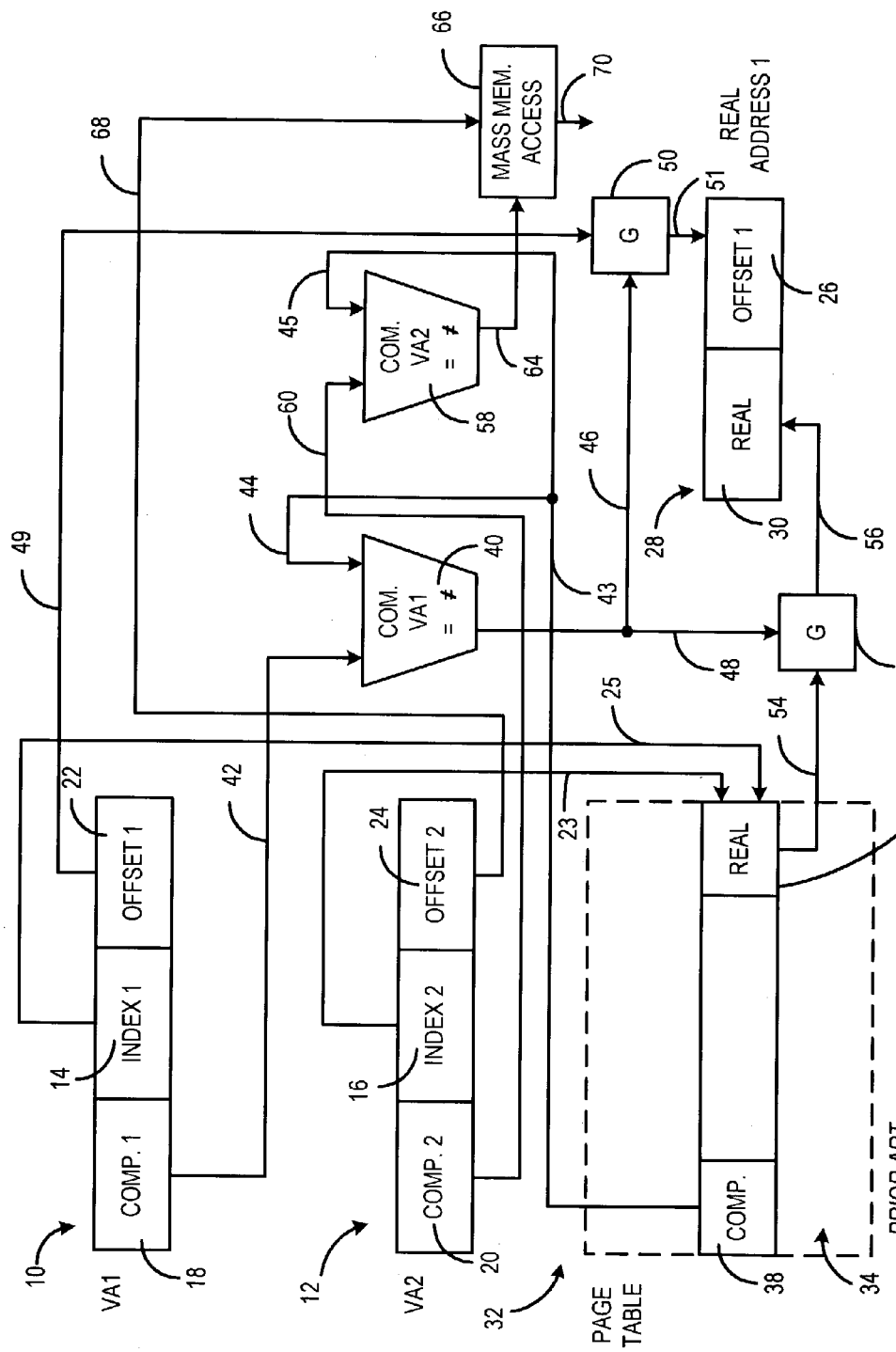
FIG. 1 is a block diagram of a prior art virtual address to real address paging translation system.

The detailed description which follows is presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding and comparing, which are commonly associated with mental operations performed by a human operator. No such capability of a human operator is necessary, or desirable in most cases, in any of the operations described herein which form part of the present invention; the operations are machine operations.

Useful machines for performing the operations of the present invention include general purpose digital computers or other similar devices. In all cases, it should be kept in mind the distinction between the method operations in operating a computer and the method of computation itself. The present invention relates to method steps for operating a computer in processing electrical or other (e.g., mechanical, chemical) physical signals to generate other desired physical signals.

The present invention also relates to an apparatus for performing these operations. This apparatus may be specially constructed for the required purposes or it may comprise a general purpose computer as selectively activated or reconfigured by a computer program stored in the computer. The algorithms presented herein are not inherently related to a particular computer system or other apparatus. In particular, various general purpose computer systems may be used with computer programs written in accordance with the teachings of the present invention, or it may prove more convenient to construct more specialized apparatus to perform the required method steps. The required structure for such machines will be apparent from the description given below.

In sum, the present invention preferably is implemented for practice by a computer code expression executing on a computer. It is contemplated that a number of source code expressions, in one of many computer languages, could be utilized to implement the present invention. A variety of computer systems can be used to practice the present invention, including, for example, a personal computer, an engineering work station, an enterprise server, etc. The present invention, however, is not limited to practice on any one particular computer system, and the selection of a particular computer system can be made for many reasons.

Figure 2:
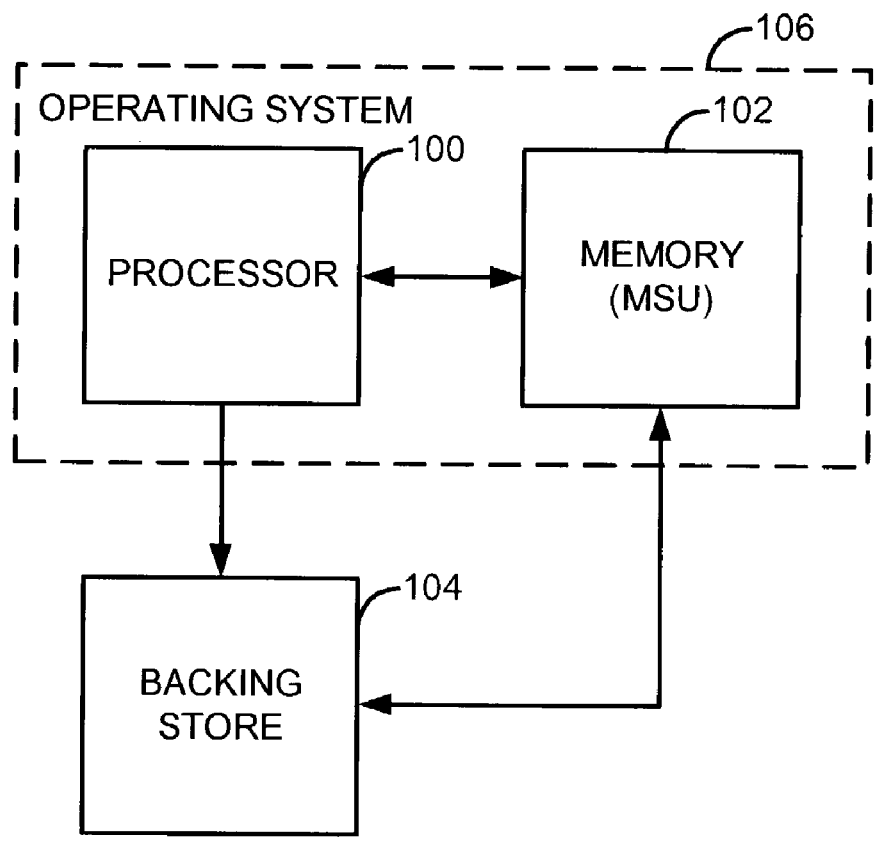
FIG. 2 is a block diagram showing an illustrative data processing system in accordance with the present invention.

FIG. 2 is a block diagram showing an illustrative data processing system in accordance with the present invention. The illustrative data processing system includes a processor 100, a main memory 102 and a backing store 104. Although only one processor is shown, it is contemplated that multiple processors may be used in some embodiments. The main memory (Main Storage Unit) 102 is preferably one or more RAM memories, which are coupled to the processor 100. The backing store 104 is preferably a hard disk or the like that can provide storage pages to/from the main memory 102, either directly or via processor 100.

During operation, and in one illustrative embodiment, an operating system 106 is used to manage the interaction of the processor 100, main memory 102, and the backing store 104. In some embodiments, the operating system 106 includes a sparse matrix paging system that dynamically allocates memory resources on demand. In some cases, this is accomplished by dynamically allocating memory resources only after a page has been requested. Such a sparse matrix paging system may allow a platform with a large linear address space to more efficiently execute on a platform with a smaller linear address space. Preferably, the sparse matrix paging system only includes those pages that are actually used in the address space on main store pages or backing store pages. The backing store is preferably not involved unless the total address space allocated by the operating system 106 exceeds the available main store pages on main memory 106.

Figure 3A:
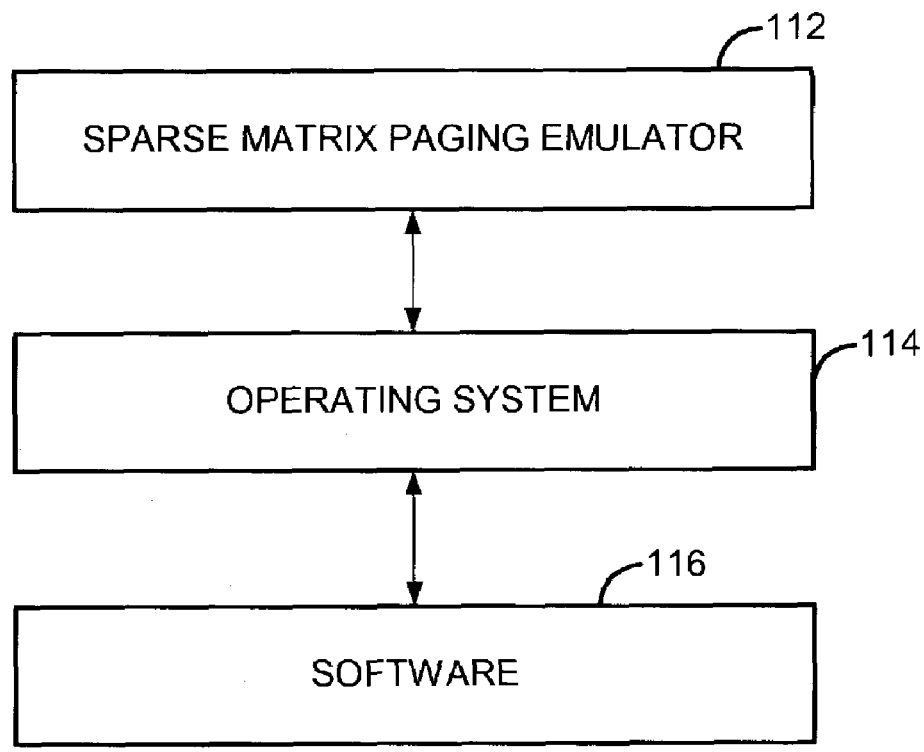
FIGS. 3A–3C are block diagrams showing illustrative emulator configurations in accordance with the present invention.

In some embodiments, the sparse matrix paging system of the present invention is provided as an emulator 112 executing separately from the operating system 114. FIG. 3A shows one such embodiment. This embodiment may allow the operating system 114, executing instructions on an emulated platform, to be relieved of much or all of its paging responsibilities. Instead, the sparse matrix paging emulator 112 itself, executing in native mode, may be responsible for maintaining an apparent linear absolute address space for software or application program 116.

The sparse matrix paging emulator 112 may calculate a virtual address from an absolute address by hashing the absolute address to form both an index into a look up table and an absolute address tag. The absolute address lookup table entry is locked and the chain of entries is searched for a match on the absolute address tag. The algorithm preferably dynamically converts chained entries to a second (or third, fourth, etc.) level of indexing if the number of chained entries exceeds a predetermined threshold. A successful search yields a pointer to the page assigned to the absolute address block.

In the event the look up table does not contain a pointer to the page for the absolute address, the absolute address of the page may be hashed to form an index in a backing store look up table. If the page does exist on the backing store 104, the page may be acquired from the Least Recently Used (LRU) queue, placed on the absolute address look up table, and loaded from the backing store. If the page does not exist on the backing store, then a page may be acquired from a Least Recently Used (LRU) page queue, generated and placed on the absolute address look up table. In either case, if the acquired page from (LRU) is not squashed (written to zeros or released by exec), then the page is preferably written to backing store. The backing store control structures are preferably organized to allow large variations in the absolute address range stored on the backing store. This may reduce input/output to the actual page being stored or loaded.

Figure 3B:
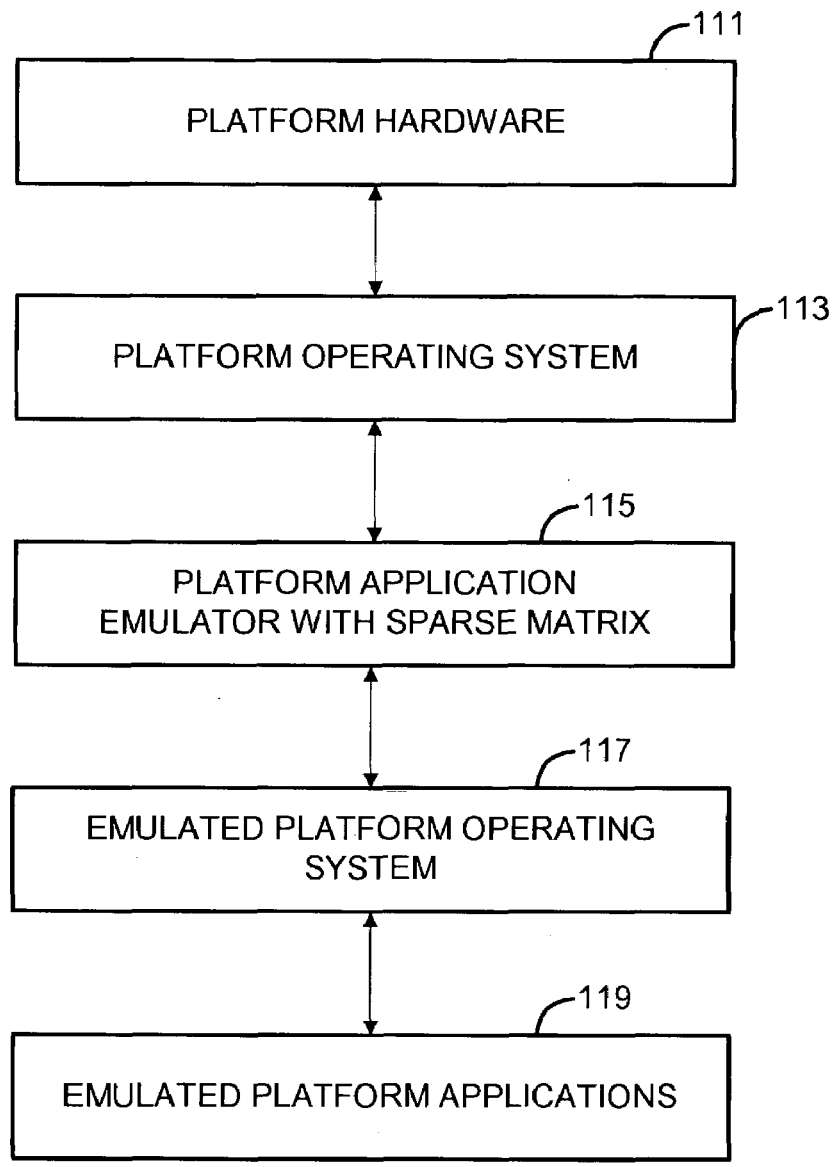

FIG. 3B is a block diagram showing another illustrative emulator configuration in accordance with the present invention. In FIG. 3B, platform hardware 111 executes an operating system 113. The platform hardware 111 may be, for example, an Intel® based platform, and the operating system 113 may be a Windows® NT based operating system. A Platform Application Emulator 115 may be running on the platform hardware 111 via the operating system 113. The Platform Application Emulator 115 may be an application program that emulates another hardware platform, such as a Unisys 2200 hardware platform. In the illustrative embodiment, the Platform Application Emulator 115 includes a sparse matrix emulator. An Emulated Platform Operating System 117 may run under the Platform Application Emulator with Sparse Matrix 115, and one or more Emulated Platform Applications 119 may run under the Emulated Platform Operating System 117. The Sparse Matrix may be responsible for maintaining an apparent linear absolute address space for the Emulated Platform Operating System 117 and one or more Emulated Platform Applications 119.

Figure 3C:
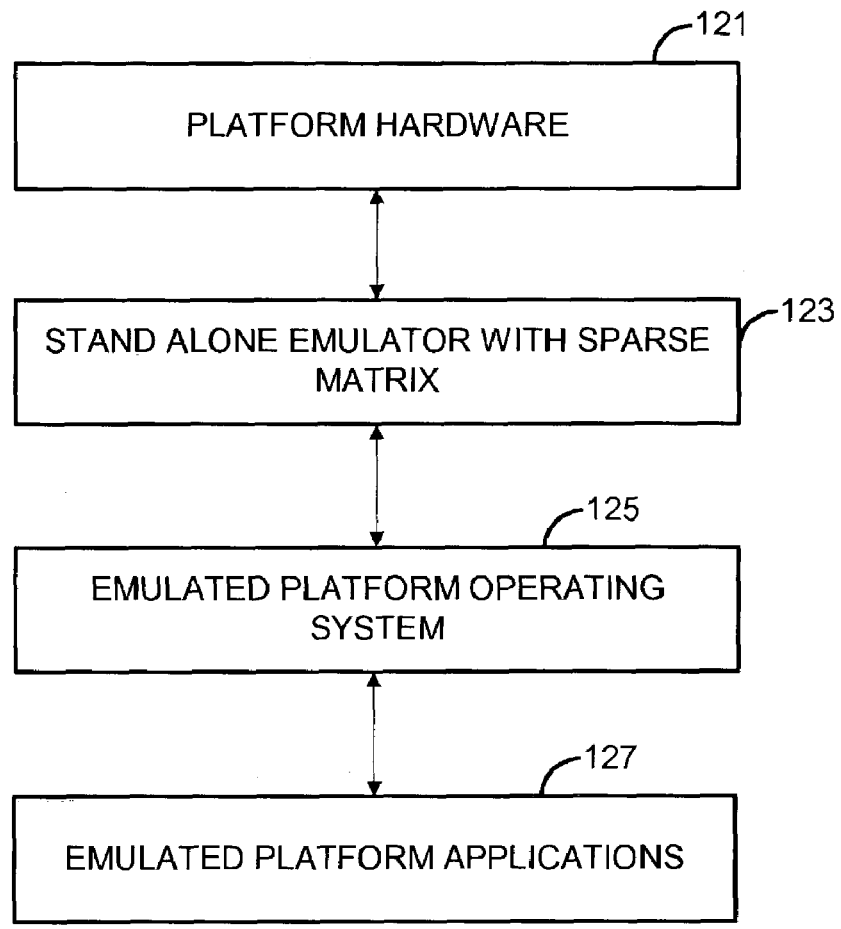

FIG. 3C is a block diagram showing yet another illustrative emulator configuration in accordance with the present invention. In FIG. 3C, platform hardware 121 directly executes a Stand Alone Platform Emulator 123, which emulates another hardware platform, such as a Unisys 2200 hardware platform. In this embodiment, a Platform Operating System, such as Platform Operating System 113 of FIG. 3B, may not be required or even desired. An Emulated Platform Operating System 125 may run under the Stand Alone Platform Emulator 123, and one or more Emulated Platform Applications 127 may run under the Emulated Platform Operating System 125. The Stand Alone Platform Emulator 123 may include the sparse matrix functionality, and may be responsible for maintaining an apparent linear absolute address space for the Emulated Platform Operating System 125 and one or more Emulated Platform Applications 127.

Figure 4:
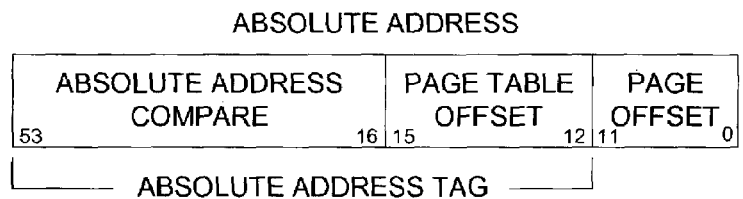
FIG. 4 is a diagram showing an illustrative absolute address in accordance with the present invention.

FIG. 4 is a diagram showing an illustrative absolute address in accordance with the present invention. The illustrative absolute address includes 54 bits. Bits 11–0 represent the page offset into the identified page. Bits 15–12 represent the page table offset, and bits 53–16 represent the absolute address compare field. In the illustrative embodiment, the absolute address compare field and the page table offset are collectively called the absolute address tag.

Figure 5:
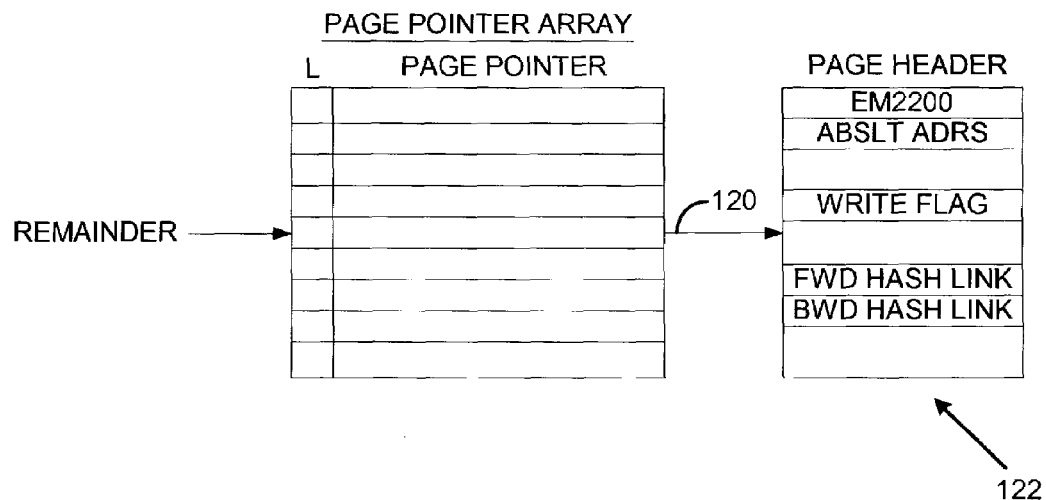
FIGS. 5–6 are diagrams showing an illustrative one level hashing algorithm to identify a page in main memory in accordance with the present invention.
Figure 6:
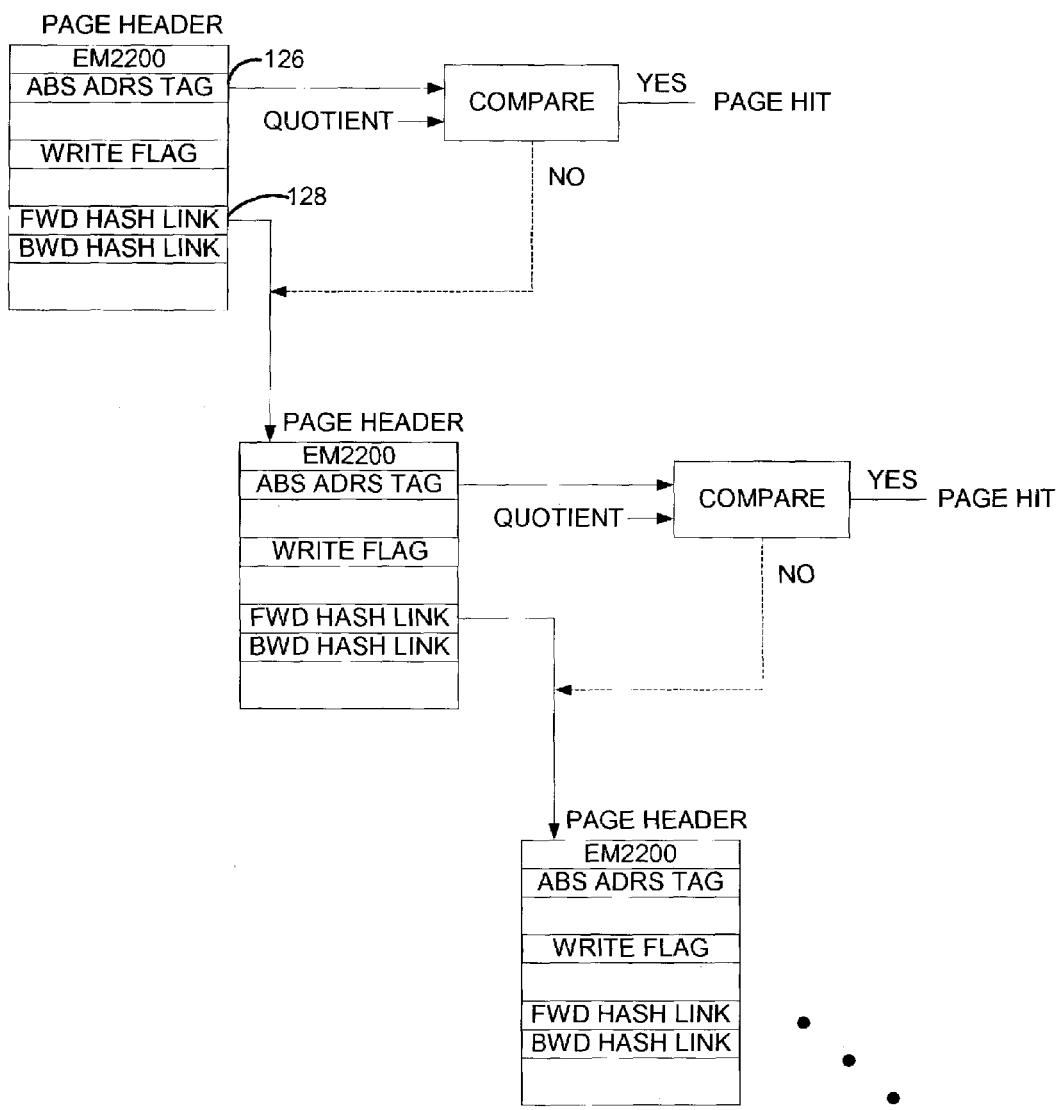

FIGS. 5–6 are diagrams showing an illustrative one level hashing algorithm to identify a page in main memory in accordance with the present invention. In the illustrative example, the absolute address tag (see FIG. 4) is divided by the size-of the first level page pointer array, yielding a remainder as the index into the first level page pointer array. The first level page pointer array produces a current pointer 120.

The current pointer 120 points to an initial page index header 122 in a chain of storage type Page Index Headers. One such chain is shown in FIG. 6. Referring to FIG. 6, the chain is searched for a match between the quotient of the absolute address tag (see FIG. 4) divided by the size-of the first level page pointer array, and the corresponding absolute address tag 126 field stored in the page index header. If a match is found, the word to be read is located in the blkarray of PAGESTOR using bits 11–0 of the absolute address as the index. If a match is not found, the forward hash link 128 of the current page index header is followed, and another compare is performed. This is continued until the desired page is found, or the end of the chain is reached. After the word is accessed the locked index is released.

If the end of the chain is reached, the page, if it exists, is identified by the hashing of bits 53–18 of the absolute address to find a File Page Index Entry associated with the desired block of 64 pages on the backing store 104. In the illustrative embodiment, bits 53–12 are divided by the size-of a PIDXENTRY array, yielding a remainder as the index into the selected Page Index Copy Page Index Entry array (pidxarray). The current pointer points to an initial Page Index Copy Page header in a chain of Page Index Copy Page headers. One such chain is shown in FIG. 7.

Figure 7:
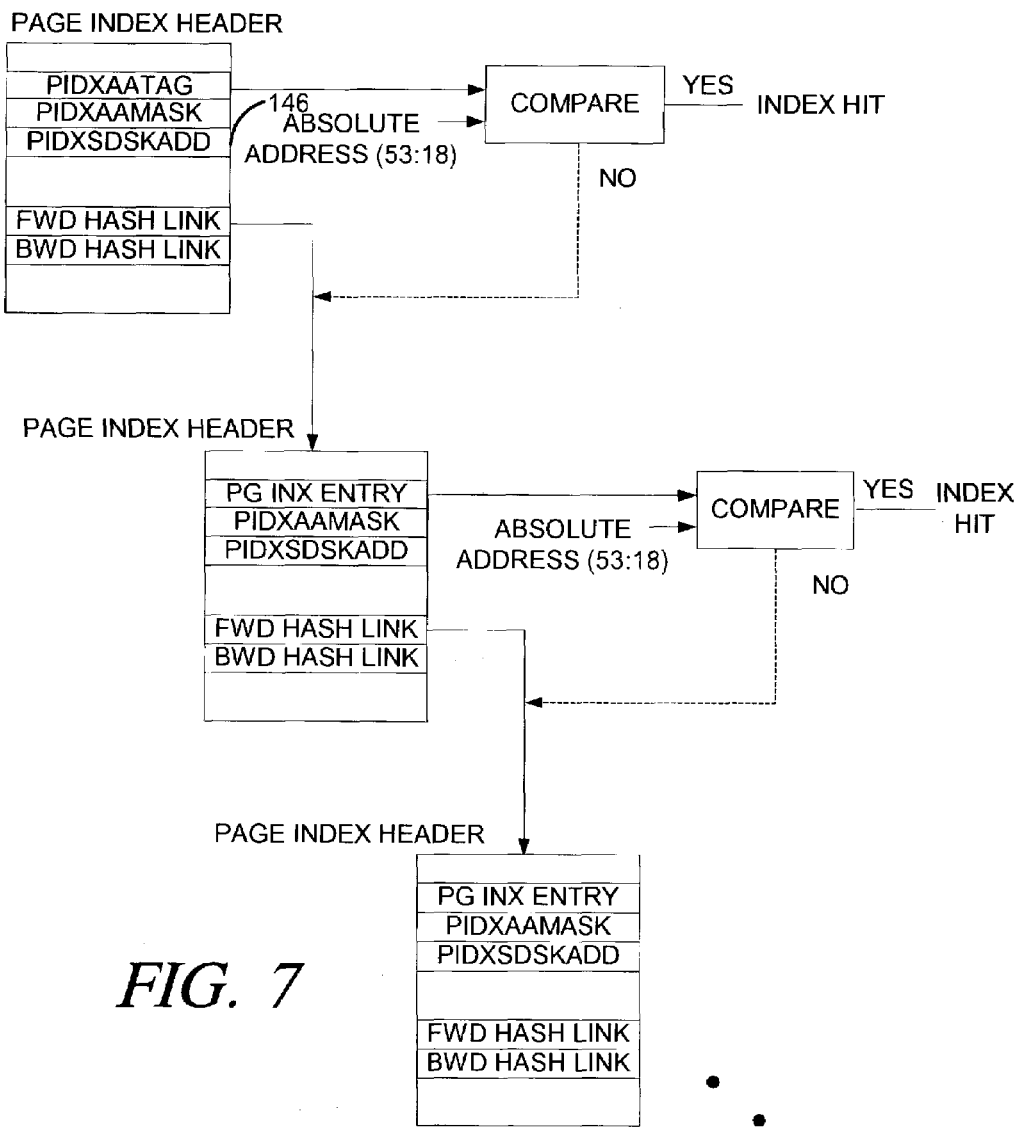
FIGS. 7–8 are diagrams showing an illustrative one level hashing algorithm to identify a page in the backing store in accordance with the present invention.
Figure 8:
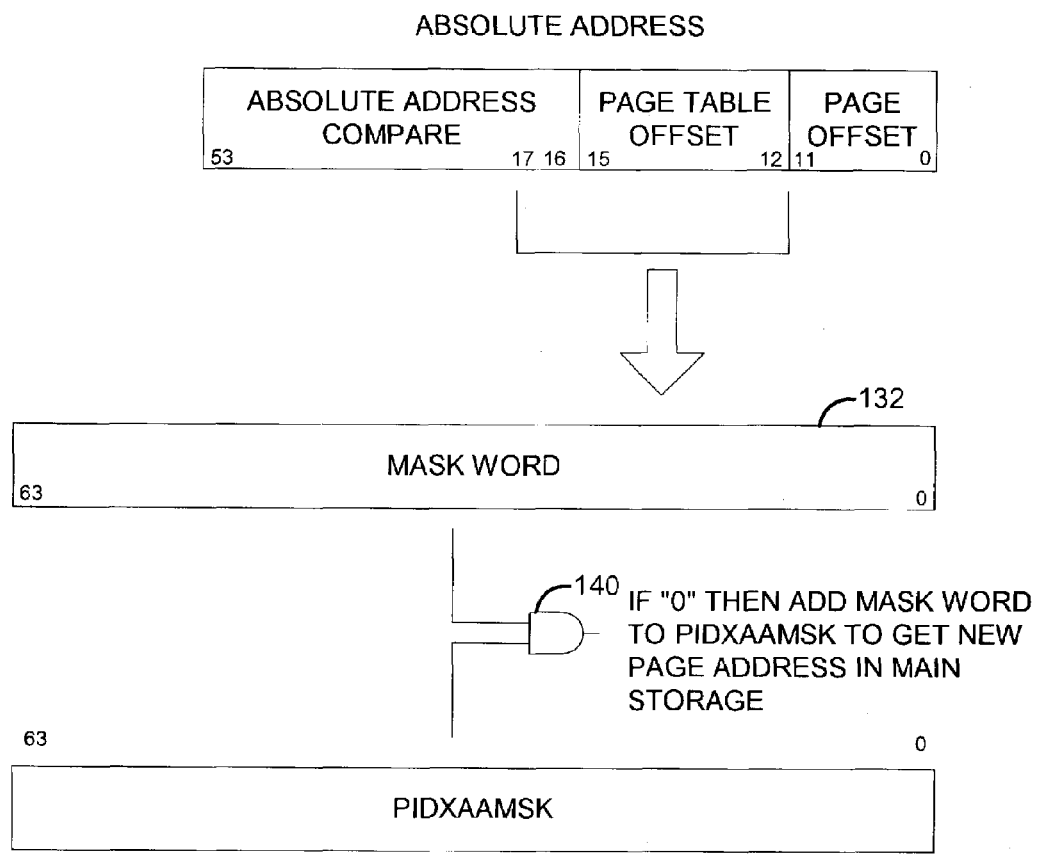

Referring to FIG. 7, the chain of Page Index Entries is searched for a match on absolute address tag bits 53–18. If a match is found, absolute address bits 17–12 are converted into a 64 bit mask word 132, as shown in FIG. 8. In one illustrative embodiment, the 64 bit mask word 132 includes one bit that is set. The set bit is identified by absolute address bits 17–12. For example, for absolute address bits "000", the 64 bit mask word may be "0x0000000000000001"; for absolute address bits "001", the 64 bit mask word may be "0x0000000000000002", for absolute address bits "002", the 64 bit mask word may be "0x0000000000000004", and for absolute address bits "077", the 64 bit mask word may be "0x8000000000000000".

The formed 64 bit mask word is then ANDED, as shown at 140, with the pidxaamsk field of the indexed Page Index Entry. If the AND result is zero, then the formed 64-bit mask word is added to the pidxaamsk field of the indexed Page Index Entry. A main storage page is then acquired, initialized to zero and linked to the current pointer chain. If the current pointer chain is a level one and the chaining level exceeds the maximum chain loop count, then an extension buffer is acquired, and initialized to a level two page array, and the chained entries are loaded into the level two page array look up table area. The word to be read is thus all zeros, and the locked index is released.

If the AND result is non-zero, a main storage page is acquired and linked to the current pointer chain. If the current pointer chain is a level one and the chaining level exceeds the maximum chain loop count, then an extension buffer is acquired, and initialized to a level two page array, and the chained entries are loaded into the level two page array look up table area. If the file start address pidxsdskadd (seek address) 146 of the Page Index Entry is NULL, then the page is initialized to zeros and the word to be read is all zeros, and the locked index is released.

If the file start address pidxsdskadd 146 of the Page Index Entry is not NULL, a seek I/O is initiated to the backing store file at the file start address pidxsdskadd 142 of the Page Index Entry plus (absolute address bits 17–12\* size of IOPAGE). After the seek completion, a read I/O is initiated and the data is transferred to the Page Storage Copy portion of the Page. The word to be read is located in the blkarray of PAGESTOR using bits 11–0 of the absolute address as the index. After the word is accessed, the locked index is released.

Figure 9:
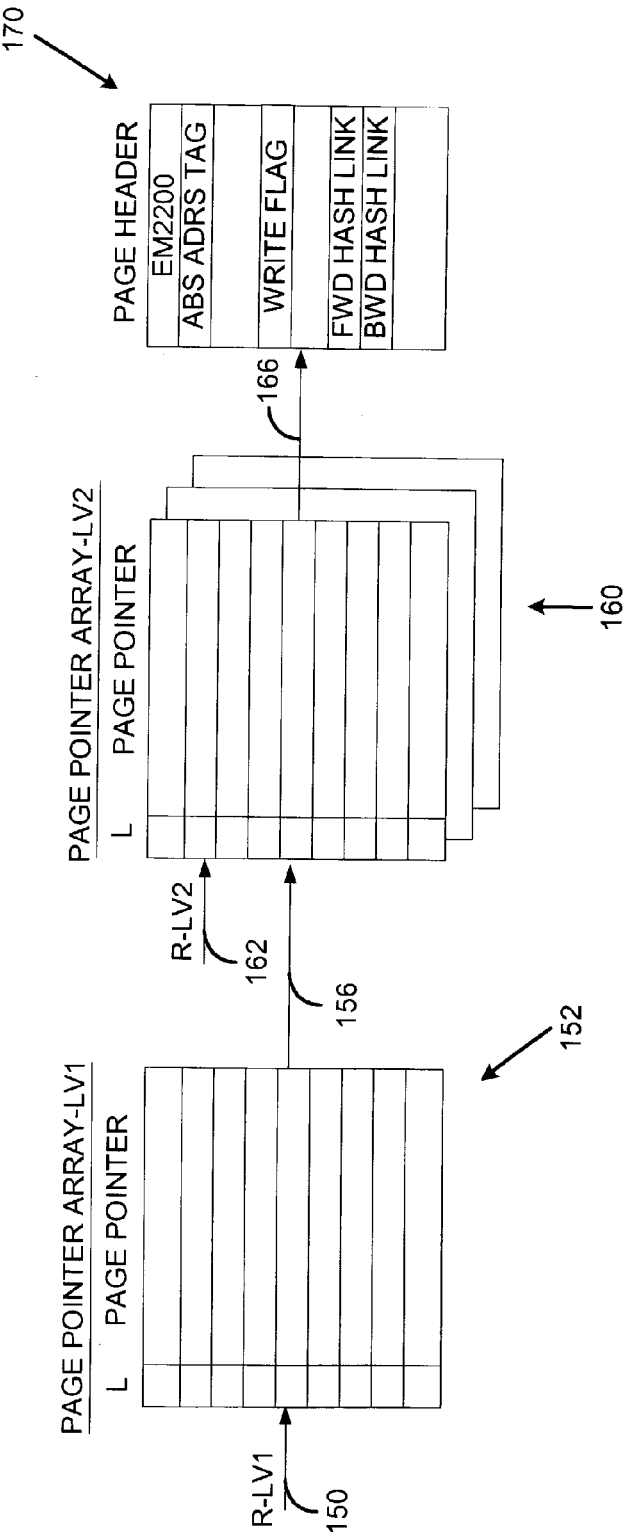
FIG. 9 is a diagram showing an illustrative two level hashing algorithm to identify a page in main memory in accordance with the present invention.

As noted above, two or more levels of indexing may be used. FIG. 9 is a diagram showing an illustrative two level hashing algorithm to identify a page in main memory in accordance with the present invention. In the illustrative example, the absolute address tag (see FIG. 4) is divided by the size-of the first level page pointer array, yielding a remainder as the index 150 into the first level page pointer array 152. The first level page pointer array index entry is locked.

If the pointer 156 selected by the index 150 into the first level page pointer array 152 does not point to a second level page pointer array 160, then the pointer 156 becomes the current pointer. If, however, the pointer 156 selected by the index 150 into the first level page pointer array 152 points to a second level page pointer array 160, then the quotient of the first division is divided by the size-of the second level page pointer array 160, yielding a remainder as the index 162 into the indexed second level page pointer array 160. The pointer 166 selected by the index 162 into the second level page pointer array 160 becomes the current pointer. The second level page pointer array entry is locked and the first level page pointer array entry is unlocked. Addition levels of index tables may be used, if desired. The current pointer points to an initial page index header 170 in a chain of storage type Page Index Headers, which is searched similar to that shown and described above with respect to FIG. 6.

If the end of the chain is reached, the page, if it exists, is identified by the hashing of bits 53–18 of the absolute address to find a File Page Index Entry associated with the desired block of 64 pages on the backing store. The File Page Index Copy tables may also include more than one level of indexing, as shown in FIG. 10.

Figure 10:
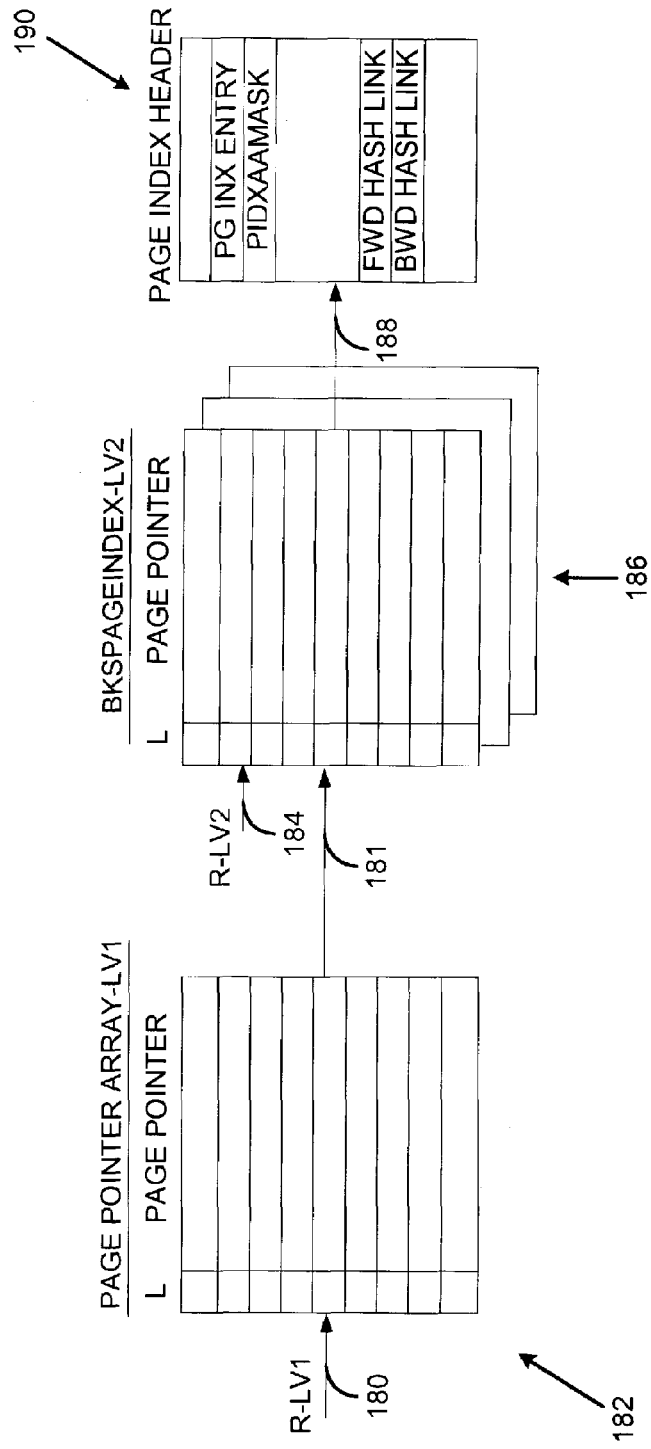
FIG. 10 is a diagram showing an illustrative one level hashing algorithm to identify a page in the backing store in accordance with the present invention.

Referring to FIG. 10, bits 51–12 of the absolute address are divided by the size-of a PIDXENTRY array, yielding a remainder as the index 180 into a first level of the Page Index Copy Pointer array (pidxarray) 182. If the pointer 181 selected by the index 180 first level of the Page Index Copy Pointer array 182 does not point to a second level Page Index Copy Pointer array 186, then the pointer 181 becomes the current-pointer. If, however, the pointer 181 selected by the index 180 into the first level of the Page Index Copy Pointer array 182 points to a second level of the Page Index Copy Pointer array 186, then the quotient of the first division is divided by the size-of the backing store page index, yielding a remainder as the index 184 into the indexed second level of the Page Index Copy Pointer array 186. The pointer 188 selected by the index 184 into the second level of the Page Index Copy Pointer array 186 becomes the current pointer. The second level of the Page Index Copy Pointer array 186 is locked and the first level of the Page Index Copy Pointer array entry is unlocked. Addition levels of index tables may be used, if desired.

The current pointer 188 then points to an initial Page Index Copy Page header 190 in a chain of Page Index Copy Page headers, which is searched similar to that shown and described above with respect to FIG. 7.

In one illustrative embodiment, the Sparse Matrix Absolute Address implementation provides a translation of an absolute address page to a NT virtual address page. The implementation provides hash-lookup tables to facilitate a rapid location of the absolute address page in the array of absolute addresses. The absolute address range may be global across multiple IP and IOP threads. This implementation may include multiple levels of locking in order to reduce lock contention for shared resources. The allocation of pages is normally satisfied with main storage pages.

In one illustrative embodiment, the main store pages are organized into two queues. The first queue is a doubly linked list Most Recently Used/Least Recently Used (MRU/LRU), where the MRU is the head of the queue and the LRU is the tail. The second queue is a doubly linked list Invalidate queue.

The Invalidate queue is initially set to a percentage of the Free Page pool. The number of pages on the Invalidate queue preferably remains constant, but this is not required in all embodiments. The following may occur when a page is acquired:

1. The page at the end of the LRU is removed.
2. Cache entries associated with the page are invalidated.
3. The page is placed on the head of the Invalidate queue.
4. The page at the tail of the Invalidate queue is removed.
5. If the page is non-zero and written-to, then it is written to the backing store file.
6. If the page is zero and written-to, then it's backing store page, if it exists, is written to zeros and released.
7. The page is initialized to all-zeros.

If the page requested is not available on main storage, then the page, if it exists, is located on the backing store. If the page does not exist, then a backing store block entry is created, a main store page is acquired, initialized to all-zeros and linked into the main store hashing system. The 2200 Emulated Main Store Absolute Address Array is an array of 64-bit words, which is $2^{54}$ in size.

The array is implemented in main storage pages, with overflow to the backing store file. Only those pages on the tail of the Invalidate queue, written-to & non-zero are maintained on the backing store. The absolute address space that is released by the operating system is marked as all-zeros. When the all-zeros pages are reused, the page is removed from the backing store. The ratio of absolute to real storage is $2^{54}$ divided by $2^{36}$ or $2^{18}$ in the illustrative embodiment (e.g. a ratio of 1 to 262144).

An illustrative read access, write access, page acquire, hash table entry removal, acquisition of a backing store block, and release of a backing store block are described more fully below.

Read Access

Read page access first involves the hashing of bits 53–12 of the absolute address. First, bits 53–12 of the absolute address are divided by size-of a first level page pointer array, yielding a remainder as the index into the first level page pointer array. The first level page pointer array index entry is locked.

If the pointer selected by the index into the first level page pointer array does not point to a second level page pointer array, then the pointer becomes the Current Pointer. If, however, the pointer selected by the index into the first level page pointer array points to a second level page pointer array, then the quotient of the first division is divided by the size-of the second level page pointer array, yielding a remainder as the index into the second level page pointer array. The pointer selected by the index into the second level page pointer array becomes the Current Pointer. The second level page pointer array entry is locked and the first level page pointer array entry is unlocked. Addition levels of index tables may be used, if desired.

The Current Pointer points to a chain of storage type Page Index Headers. The chain is searched for a match on the absolute address tag. If a match is found, the word to be read is located in the blkarray of PAGESTOR using bits 11–0 of the absolute address as the index. After the word is accessed the locked index is released.

If a match is not found, the page, if it exists, is identified by the hashing of bits 53–18 of the absolute address to find the File Page Index Entry associated with the block of 64 pages. Bits 53–12 are divided by the size-of a PIDXENTRY array, yielding a remainder as the index into the selected Page Index Copy Page Index Entry array (pidxarray) and a quotient, which divided by the size-of Page Index Copy Pointer array, yields a remainder as the index into the Page Index Copy Pointer Array. The chain of Page Index Entries (PIDXENTRY) is located in the selected Page at the index.

The chain of Page Index Entries is searched for a match on absolute address tag bits 53–18. If a match is found, absolute address bits 17–12 are converted into a 64 bit mask word. In one illustrative embodiment, the 64 bit mask word includes one bit that is set. The set bit is identified by absolute address bits 17–12. For example, for absolute address bits "000", the 64 bit mask word may be "0x0000000000000001"; for absolute address bits "001", the 64 bit mask word may be "0x0000000000000002", for absolute address bits "002", the 64 bit mask word may be "0x0000000000000004", and for absolute address bits "077", the 64 bit mask word may be "0x8000000000000000". The formed 64 bit mask word is then ANDED with the pidxaamsk field of the Page Index Entry.

If the AND result is zero, then the formed 64-bit mask word is added to the pidxaamsk field of the Page Index Entry. A main storage page is then acquired, initialized to zero and linked to the Current Pointer chain. If the Current Pointer chain is a level one and the chaining level exceeds the maximum chain loop count then, a main storage page is acquired, converted to a level two page array, and the chained entries are loaded into the level two look up table. The word to be read is thus all zeros, and the locked index is released.

If the AND result is non-zero, a main storage page is acquired and linked to the Current Pointer chain. If the Current Pointer chain is a level one and the chaining level exceeds the maximum chain loop count, then a main storage page is acquired, converted to a level two page array, and the chained entries are loaded into the level two look up table.

If the file start address pidxsdskadd of the Page Index Entry is NULL then, the page is initialized to zeros and the word to be read is all zeros, and the locked index is released.

If the file start address pidxsdskadd of the Page Index Entry is not NULL, a seek I/O is initiated to the backing store file at the file start address pidxsdskadd of the Page Index Entry plus (absolute address bits 17–12* size of IOPAGE). After the seek completion, a read I/O is initiated and the data is transferred to the Page Storage Copy portion of the Page. The word to be read is located in the blkarray of PAGESTOR using bits 11–0 of the absolute address as the index. After the word is accessed, the locked index is released.

As noted above, the Current Pointer points to a chain of storage type Page Index Headers. The chain is searched for a match on the absolute address tag. If a match is not found, a Page Index Entry is acquired and initialized. Absolute address bits 17–12 are converted into a 64 bit mask word. The formed 64-bit mask is stored in the pidxaamsk field of the Page Index Entry. A main storage page is acquired, initialized to zero and linked to the Current Pointer chain. If the Current Pointer chain is at level one and the chaining level exceeds the maximum chain loop count, then a main storage page is acquired, converted to a level two page array and the chained entries are loaded into the level two look up table. The word to be read is all zeros, and the locked index is released.

A more detailed description of an illustrative read access is shown and described below with reference to FIGS. 11A–11I. Referring to FIG. 1A, and as shown at step 400, a word select (or page offset) variable is assigned a value equal to the absolute address of the desired memory location ANDED with a mask field that, in this case, is 07777. The mask field produces a word select that is 12 bits long, and thus assumes a memory page size of 4096 words. If the memory page size is different, however, the mask field can be adjusted to provide the desired word select length.

Step 402 calculates an absolute address tag, which in the case, equals the absolute address bits 53–12 divided by the size of a first level page array. The 4096 in the denominator is used to shift the absolute address 12 bits, thereby shifting bits 11–0 (i.e. the page offset) from the absolute address leaving bits 53–12 as bits 41–0. Step 404 calculates a level 1 index (lvl1Index) into the first level page array by performing a similar operation as in step 402, but only provides the remainder. The remainder is used as the level 1 index into the first level page array.

Step 406 calculates a lock pointer (lockptr) by indexing the level 1 index calculated in step 404 into the first level page array (firstlvlpagearray), which returns a NT pointer to the memory location that points to the specific page within the first level page array. Step 406 multiplies the level 1 index by the size of the pointer and adds the result to the beginning address of the first level page array and stores the result as the lock pointer.

In step 408, the "Lock" function returns the data content identified by the lock pointer. The "Lock" function also locks the location identified by the lock pointer, or waits until the location is unlocked and then locks it. The lock return pointer represents a pointer to the desired page, a pointer to a second level page array, or is null if no page exists. Step 410 determines if the lock return pointer is null, which as noted above, indicates that the page currently does not exist. If the page does exist, control is passed to step 412. Step 412 determines if the header of the identified page is a storage page, where the reference em22str is included in the header of all storage pages. If the header of the page identified by the lock return pointer is a storage page, control is passed to step 414.

Step 414 determines if the absolute address tag in the identified storage page is equal to the absolute address tag calculated in step 402. If it is, control is passed to step 416. Step 416 determines whether the page identified by the lock return pointer is currently being loaded by another processor. If the page is not currently being loaded by another processor, control is passed to step 418. Step 418 loads the data word from the page indexed by word select (see step 400). Control is then past to block 420.

Step 420 uses a function that takes the page selected by the lock return pointer from wherever it is in the least recently used chain, and marks it as the most recently used page by placing it on the head of the least recently used chain. Control is then passed to block 422. Step 422 unlocks the lock pointer. As noted above, the lock pointer (lockptr) was calculated in step 406 and was locked in step 408. Control is then passed to step 424. Step 424 returns the data word obtained in step 418 to the requesting function or requesting hardware, as desired.

Figure 11A:
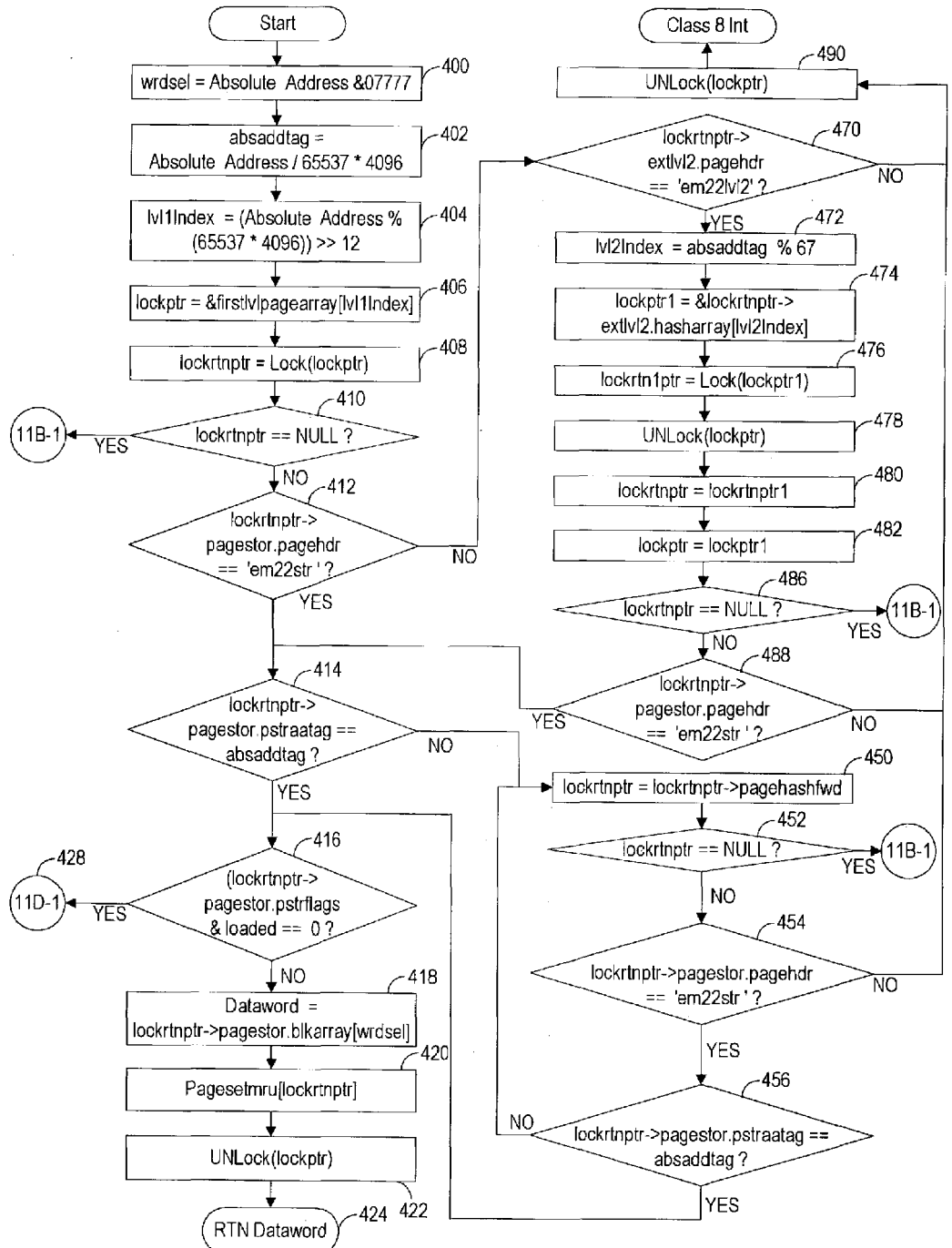
FIGS. 11A–11I are flow diagrams showing an illustrative read access in accordance with the present invention.
Figure 11B:
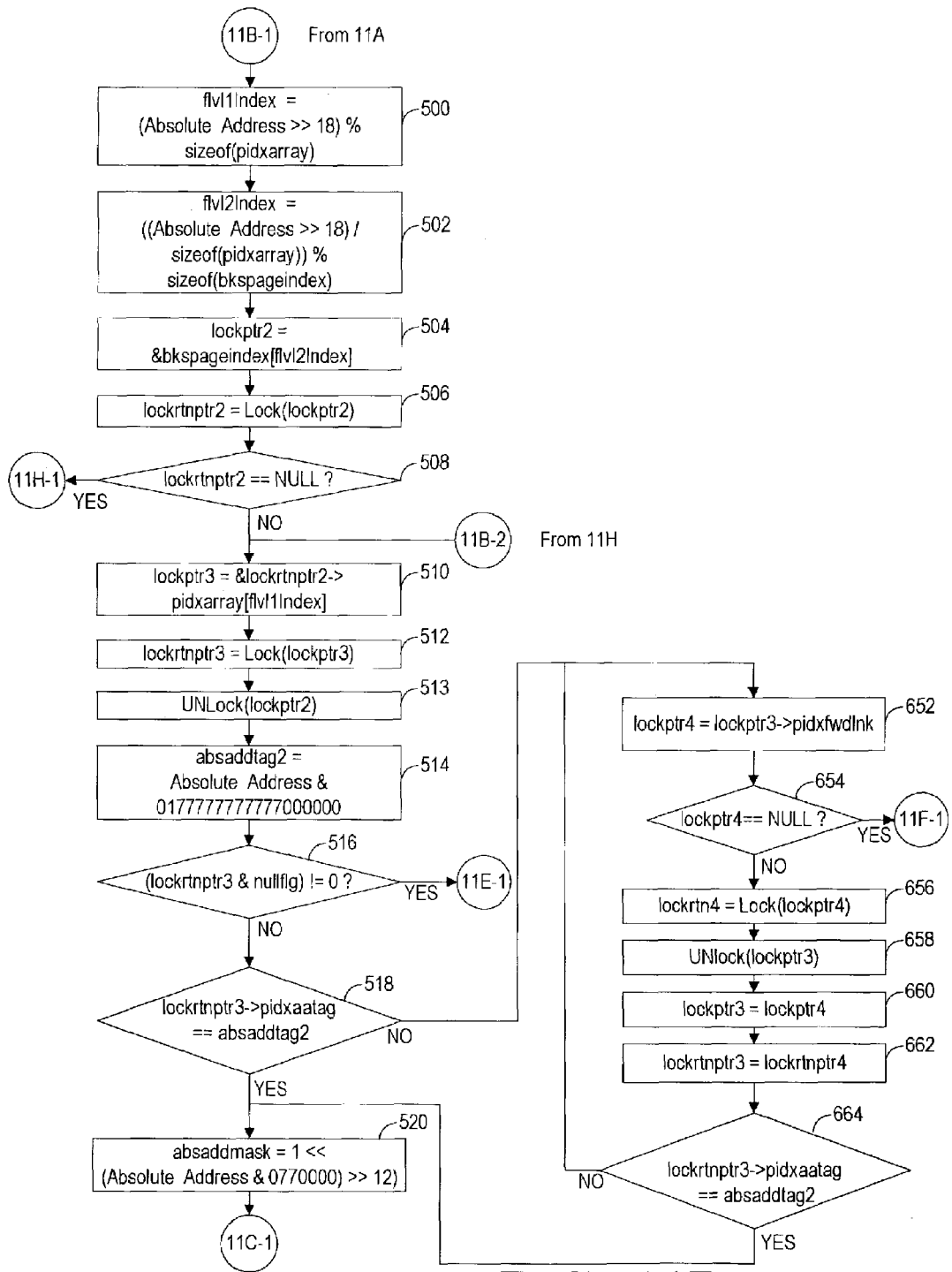
Figure 11C:
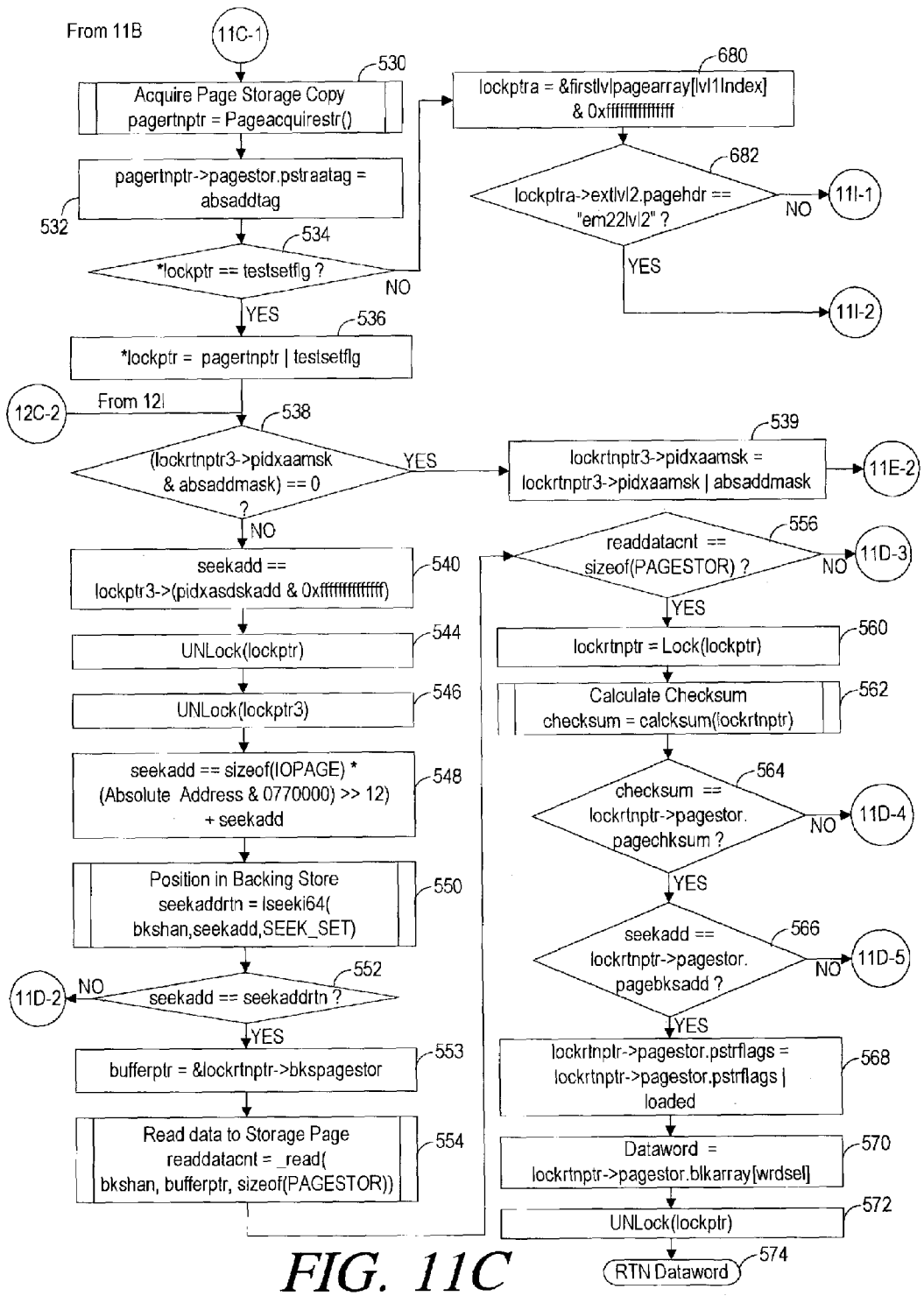
Figure 11D:
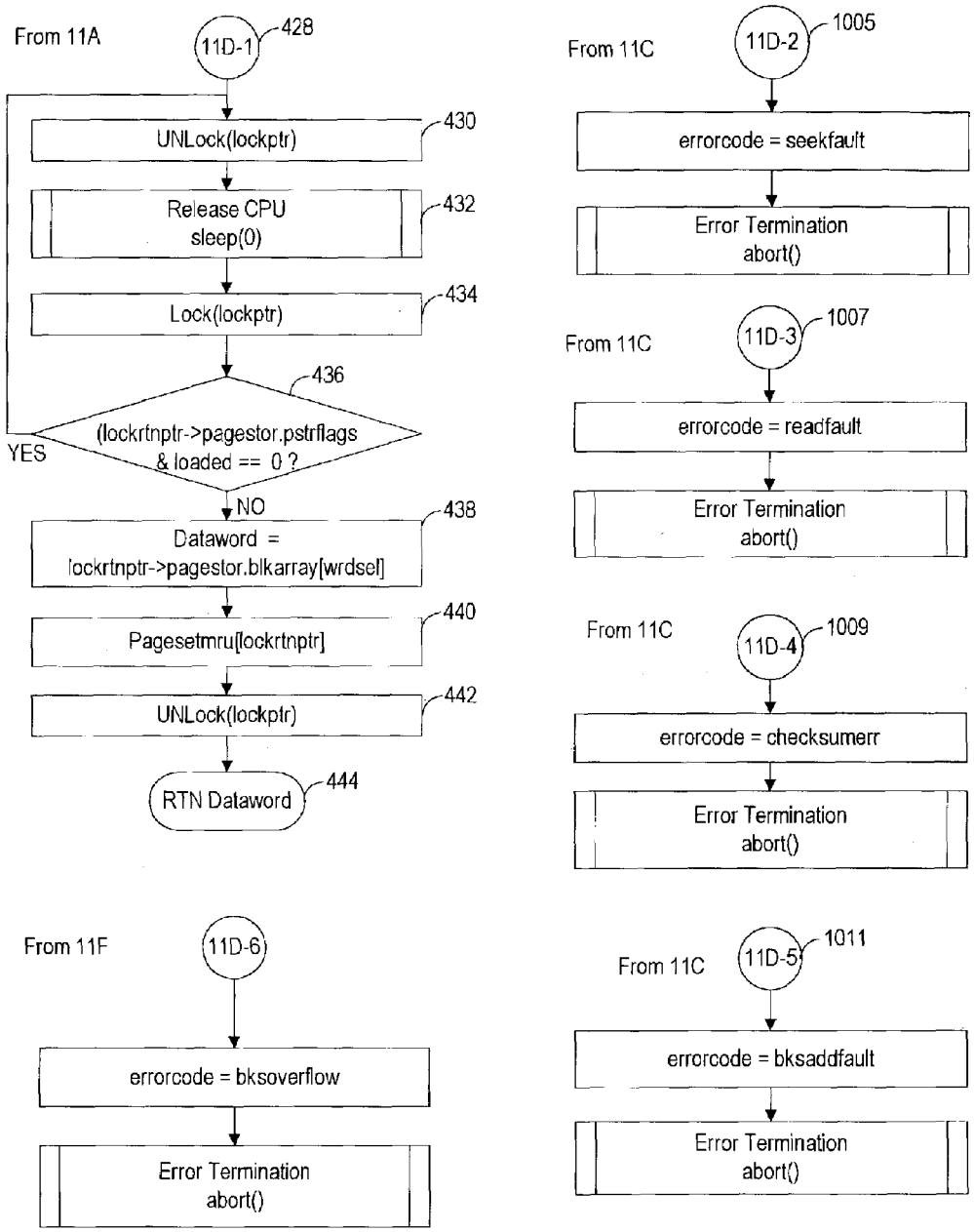

Referring back to step 416, if the identified page is currently being loaded by another processor, control is passed to step 430 of FIG. 11D via path 428. Referring to FIG. 11D, step 430 unlocks the lock pointer, which was locked in step 408. Control is then passed to step 432. Step 432 executes a release CPU sleep instruction for, in this case, zero time. This allows other threads to utilize that CPU temporarily. If no other threads request the use of the CPU, block 432 receives control back from the CPU. Control is then passed to step 434. Step 434 relocks the lock pointer and passes control to step 436. Step 436 determines whether the identified storage page is still being loaded. If it is still being loaded, control is passed back to step 430. If however, the identified storage page is not still being loaded, control is passed to step 438.

Step 438 loads the data word from the page indexed by word select (see step 400). Control is then past to block 440. Step 440 uses a function that takes the page selected by the lock return pointer from wherever it is in the least recently used chain, and marks it as the most recently used page by placing it on the head of the least recently used chain. Control is then passed to block 442. Step 442 unlocks the lock pointer. As noted above, the lock pointer (lockptr) was calculated in step 406 and was locked in step 408. Control is then passed to step 424. Step 424 returns the data word obtained in step 418 to the requesting function or requesting hardware, as desired.

Referring now back to step 414 of FIG. 11A. If the absolute address tag in the page identified by the lock return pointer does not equal the absolute address tag calculated in step 402, control's passed to step 450. Step 450 sets the lock return pointer to the page hash forward link in the page identified by the current lock return pointer. Control is then passed to step 452.

Step 452 checks to see if the current lock return pointer is null, which would means that the end of the chain has been reached. If the end of the chain has not been reached, control is passed to step 454. Step 454 determines if the page identified by the current lock return pointer is a storage page in a similar manner to that discussed above with respect to step 412. If the page identified by the current lock return pointer is a storage page, control is passed to step 456. Step 456 compares the absolute address tag stored in the storage page identified by the lock return pointer is equal to the absolute address tag calculated in step 402. If the absolute address tag stored in the storage page identified by the lock return pointer is not equal to the absolute address tag calculated in step 402, control is passed back to step 450, wherein the lock return pointer is set to the page hash forward link in the page identified by the current lock return pointer. This continues until either the end of the chain is reached, as determined in step 452, or the absolute address tag identified in the storage page indexed by the lock return pointer is equal to the absolute address tag calculated in step 402. Referring back to step 456, if the absolute address tag in the storage page identified by the lock return pointer is equal to the absolute address tag calculated in step 402, control is passed back to step 416. Steps 450, 452, 454 and 456 are usually only performed when synonyms are present.

Referring back to step 412, if the page identified by the lock return pointer is not a storage page, control is passed to step 470. Step 470 determines if the page identified by the lock return pointer is a level 2 page. In the illustrative read access, this is accomplished by determining if the header of the identified page includes the reference em22lvl2. If the page identified by the lock return pointer is a level 2 page, control is passed to step 472. Step 472 calculates a level 2 index which, in this case, equals the remainder of the level 1 index divided by the size of the second level page array (e.g. 67). Control is then passed to step 474. Step 474 calculates a new pointer (lockptr1) into the level 2 page array. The lock pointer 1 (lockptr1) calculated in step 474 is an NT pointer that points to the memory location that points to the specific page within the second level page array. Control is then passed to step 476. Step 476 locks the cell on the second level page array identified by the lock pointer 1, and returns the data contents of that location and assigns it to lock return 1 pointer (lockrtn1*ptr*). Control is then passed to step 478. Step 478 unlocks the first level lock pointer (lockptr1), which frees the first level page array entry for access by other threads. Control is then passed to step 480. Step 480 sets the lock return pointer equal to the lock return pointer 1 that was calculated in step 476. Control is then passed to step 482. Step 482 sets the current lock pointer (lockptr) to the lock pointer 1 calculated in step 474. Control is then passed to step 486. Step 486 checks to see if the current lock return pointer is equal to null, which would indicate that the page is not currently in the main store, or it doesn't exist at all. If the lock return pointer is not equal to null, then control is passed to step 488. Step 488 determines if the page identified by the lock return pointer is a storage page. If the page identified by the lock return pointer is a storage page, control is passed to step 414.

In steps 470, 488 and 454, if the page identified by the lock return pointer is not a storage page, control is passed to step 490, wherein the page is unlocked and an interrupt is issued. In steps 410, 486 and 452, if the lock return pointer is null, which as noted above indicates that the page currently does not exist, control is passed to step 500 of FIG. 11B.

Step 500 calculates a first level index (flvl2index), which equals the remainder of bits 53–18 of the absolute address divided by the size of a PIDX array, which in this case, is 1039. When calculating the first level index, the quotient of bits 53–18 of the absolute address and the size of the PIDX array is also stored. Control is then passed to step 502.

Step 502 calculates a level 2 index (flvl2index) which equals the remainder of the quotient calculated in step 500 divided by the size of a backing store page index. The size of the backing store page index in this illustrative embodiment is 61. Control is then passed to step 504. Step 504 calculates a lock pointer 2 (lockptr2), which is a pointer into the back storage page index. Control is then passed to step 506.

In step 506, the "Lock" function locks the page identified by lock pointer 2 (lockptr2), and passes the data contents to lock return pointer 2 (locktrnptr2), which is a pointer to an array of PIDXT entries. Each PIDXT entry represents 64 consecutive pages in the address range. Control is then passed to step 508.

Step 508 determines if the lock return pointer 2 (locktrnptr2) is equal to null. If the lock return pointer 2 equals null, then the page identified by the lock return pointer 2 has not yet been created, and control is passed to FIG. 11H. If the lock return pointer 2 is not null, control is passed to step 510.

Step 510 calculates a lock pointer 3 (lockptr3). The lock pointer 3 is a pointer into the page identified by the first level index (flvl1Index) calculated in step 500. Control is then passed to step 512. In step 512, the lock function locks the lock pointer 3 and passes its contents into lock return pointer 3 (lockrtnptr3). Control is then passed to step 513. Step 513 unlocks lock pointer 2. Control is then passed to step 514. Step 514 calculates an absolute tag 2 (absaddtag2) using a mask field, which in this case, equals bits 53–18 of the absolute address. Control is then passed to step 516.

Step 516 determines whether the PIDX entry identified by lock return pointer 3 is empty or blank. If the PIDX entry is empty or blank, the block of pages identified by the lock return pointer 3 have never yet been created. That is, they don't exist in the PIDX table. If they don't exist, control is passed to FIG. 11E. If they do exist, control is passed to step 518.

Step 518 determines if a PIDXAA tag in the page identified by the lock return pointer 3 is equal to the absolute address tag 2 calculated in step 514. If they are equal, control is passed to step 520. Step 520 calculates an absolute address mask which has 64 bits, with all bits zero except one. Bits 17–12 of the absolute address determine which of the 64 bits of the absolute address mask is a one. Control is then passed to step 530 in FIG. 11C.

Referring now to step 530 of FIG. 11C. Step 530 is a function that acquires the least recently used page, and returns a pointer to that page as the page return pointer (pagertnptr). Control is then passed to step 532. Step 532 sets the absolute address tag in the header of the acquired page to the absolute address tag calculated in step 402. Control is then passed to step 534. Step 534 determines if the current lock pointer (lockptr) is equal to a test set flag. If the current lock pointer is equal to the test set flag, this means that this is the first hash entry and no chain exists. If the current lock pointer equals the test set flag, control is passed to step 536. Step 536 sets the current lock pointer to the page return pointer provided in step 530 ORed with the test set flag. The test set flag sets the lock bit of the lock pointer. Control is then passed to step 538.

Step 538 compares the PIDXAAMSK field in the PIDX entry identified by the lock return pointer 3 ANDED with the absolute address mask calculated in step 520 with zero. If equal to zero, the page did not exist before and control is passed to step 539. Step 539 sets the bit and the PIDX-AAMSK entry that represents the page that was just created. Control is then passed to FIG. 11E, wherein a page is initialized.

Referring back to step 538, if the page exists, control is passed to step 540. Step 540 sets the seek address (seekadd)

equal to the lower 56 bits of the PIDXASDSKADD field of the PIDX entry identified by the lock pointer 3 pointer. Control is then passed to step 544.

Step 544 unlocks the lock pointer. Control is then passed to step 546. Step 546 unlocks the lock pointer 3. Control is then passed to step 548. Step 548 sets the seek address equal to the size of an IO page times an address identified by bits 17–12 of the absolute address plus the seek address. This will identify the specific page in the backing store where the cache miss occurred. Control is then passed to step 550. Step 550 positions the backing store file at the spot where it is going to begin reading the data. Step 550 also returns a seek address return value. Control is then passed to step 552. Step 552 compares the seek address with the seek address return identified in step 550. This verifies that the seek address that the backing store is about to read is the same as the seek address calculated in step 548. If the seek address equals the seek address return, control is passed to step 553. Step 553 sets a buffer pointer equal to the address of lock page return pointer. Control is then passed to step 554.

Step 554 reads the data from the backing store to the storage page. The backing store provides a read data count which indicates how much data was read. Control is then passed to step 556. Step 556 compares the read data count with the size of a page store. If the read data count equals the size of the page store, control is passed to step 560. Step 560 locks the lock pointer and returns the data to the lock return pointer. Control is then passed to step 562. Step 562 calculates the check sum of the page. Control is then passed to step 564. Step 564 compares the check sum calculated in step 562 with the page check sum value stored in the page. Control is then passed to step 566. Step 566 compares the seek address with the page backing store address of the page. If the seek address equals the page backing store address of the page, control is passed to step 568. Step 568 sets the loaded flag for the page. Control is then passed to step 570. Step 570 sets the data word equal to the particular word in the page that is indexed by the word select. Control is then passed to step 572. Step 572 unlocks the lock pointer. Control is then passed to step 574. Step 574 returns the data word to the calling function or calling hardware, as desired.

Figure 11E:
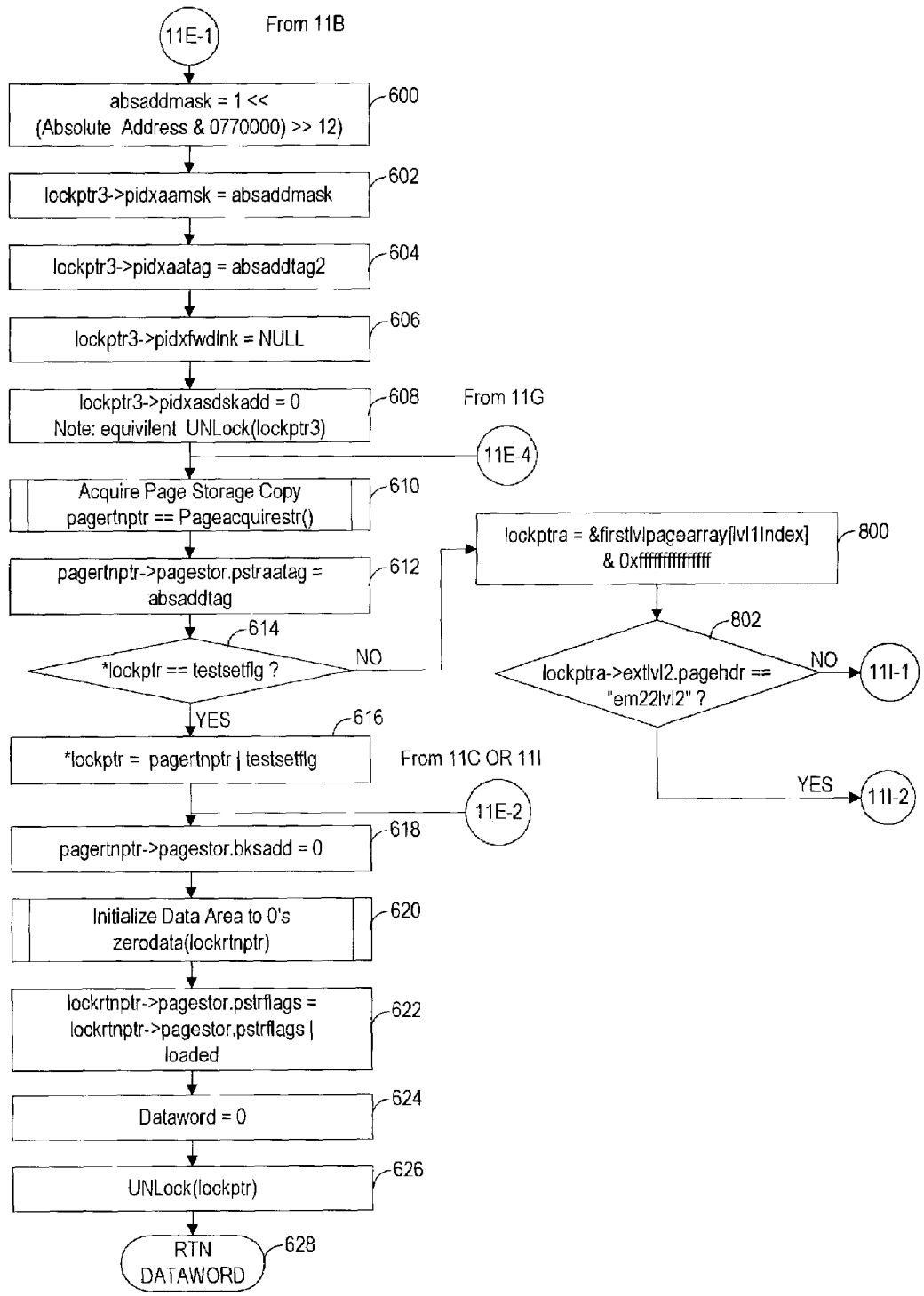

Referring back to step 539 of FIG. 11C, if the page did not exist, control is then passed to step 618 of FIG. 11E. As can be seen, steps 618 through 628 of FIG. 11E do not perform an I/O read, but rather only acquire the backing store space for the actual blocks of address that are needed, which may increase the speed of the system. Step 618 zeros out the backing store address for the specific page identified by the page return pointer. Control is then passed to step 620. Step 620 initializes the data area in the identified page to all zeros. Control is then passed to step 622. Step 622 sets the loaded flag indicating that the page has been loaded. Control is then passed to step 624. Step 624 sets the data word equal to zero. Control is then passed to step 626. Step 626 unlocks the lock pointer and passes control to step 628. Step 628 returns the data word to the calling function or calling hardware, as desired.

Referring back to step 518 of FIG. 11B, if the PIDX-AATAG field of the PIDX entry is not equal to the absolute address tag 2 calculated in step 514, control is passed to step 652. Step 652 sets a lock pointer 4 equal to the PIDX forward link (PIDXFWDLNK) of the PIDX entry identified by lock pointer 3. Control is then passed to step 654. Step 654 determines whether the lock pointer 4 is null. If the lock pointer 4 is null, control is passed to FIG. 11F. If the lock pointer 4 is not null, control is passed to step 656. Step 656 locks the lock pointer 4, returns the data pointed to by lock pointer 4, and assigns the data to lock return pointer 4. Control is then passed to step 658. Step 658 unlocks the lock pointer 3. Control is then passed to block 660. Block 660 sets the lock pointer 3 equal to the lock pointer 4. Control is then passed to 662. Step 662 sets lock return pointer 3 equal to the lock return pointer 4. Control is then passed to 664. Step 664 determines if the PIDXAA tag of the PIDX entry identified by lock return pointer 3 is equal to the absolute address tag 2 calculated in step 514. If it is not, control is passed back to step 652, wherein the next PIDXFWDLNK in the PIDX entry chain is followed. If the PIDXAA tag of the PIDX entry identified by lock return pointer 3 is equal to the absolute address tag 2 calculated in step 514, control is passed to step 520. This indicates that the PIDX entry was found for the requested page.

Referring now back to step 534 of FIG. 11C. If the lock pointer is not equal to the test set flag, then a synonym entry must already exist in either the first or second level hash tables, and control is passed to step 680. Step 680 creates a temporary lock pointer A (lockptra), which is equivalent to the lock pointer calculated in step 406 but has the lock bit masked out. Control is then passed to step 682. Step 682 determines if the page identified by the lock pointer A is a level 2 storage page. If the page identified by lock pointer A is not a level 2 storage page, control is passed to entry point 599 of FIG. 11I.

Figure 11F:
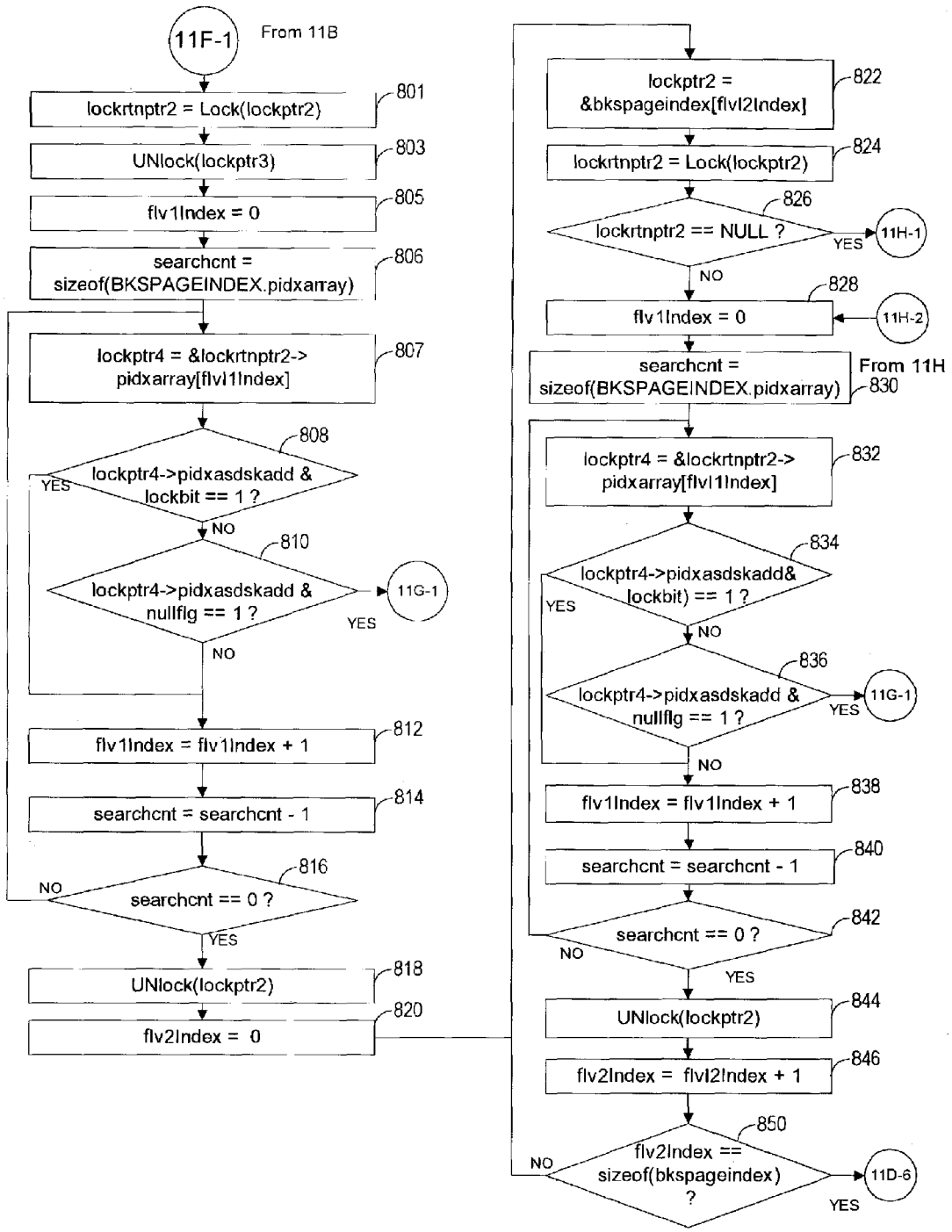
Figure 11G:
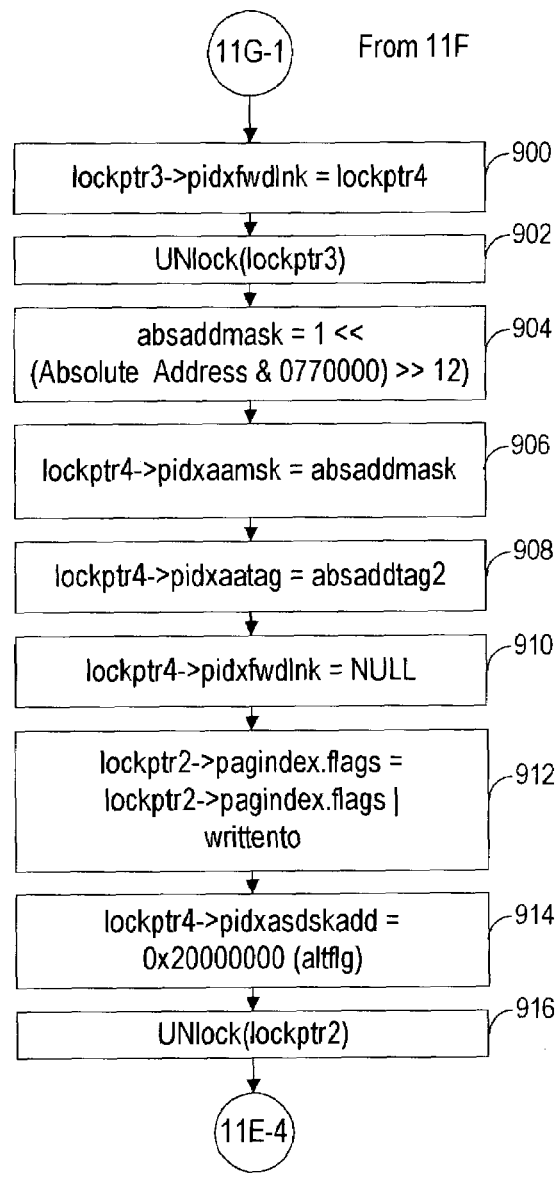
Figure 11H:
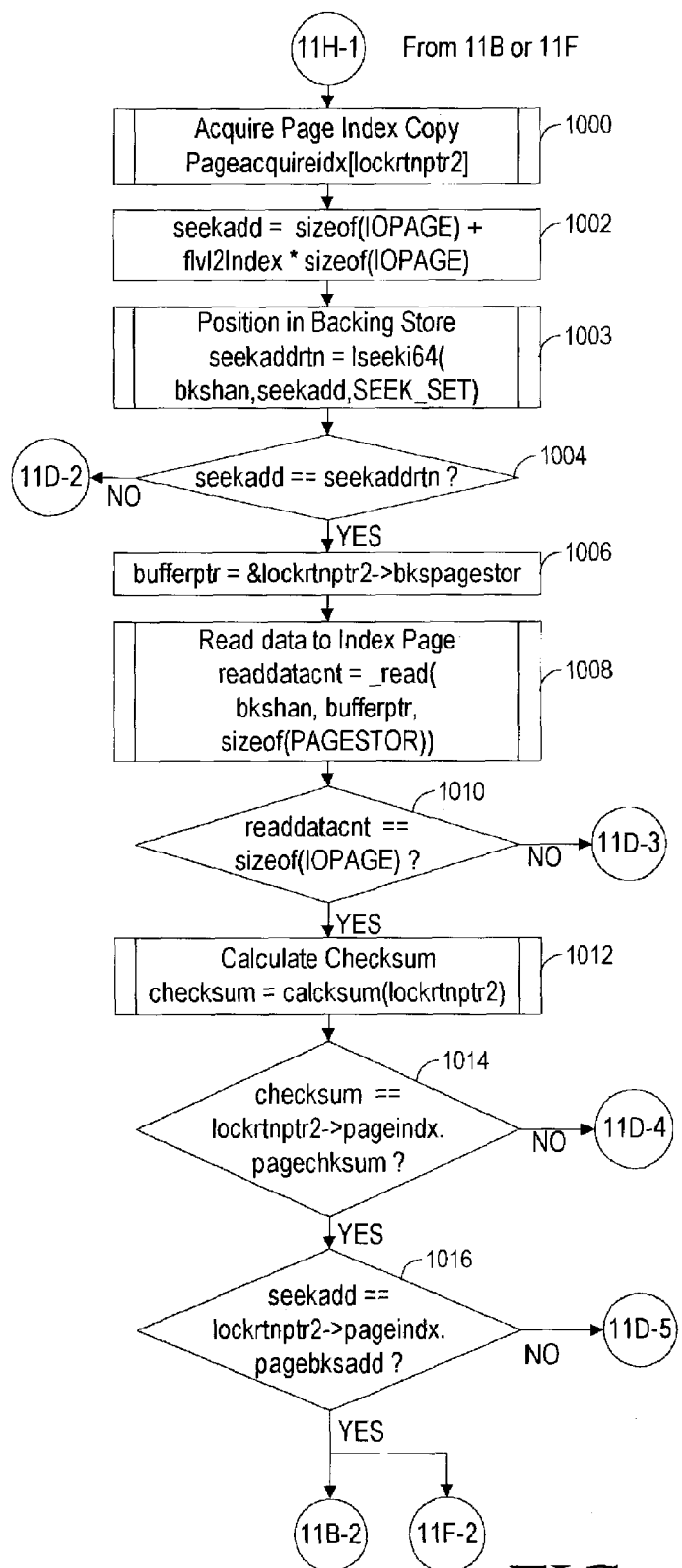
Figure 11I:
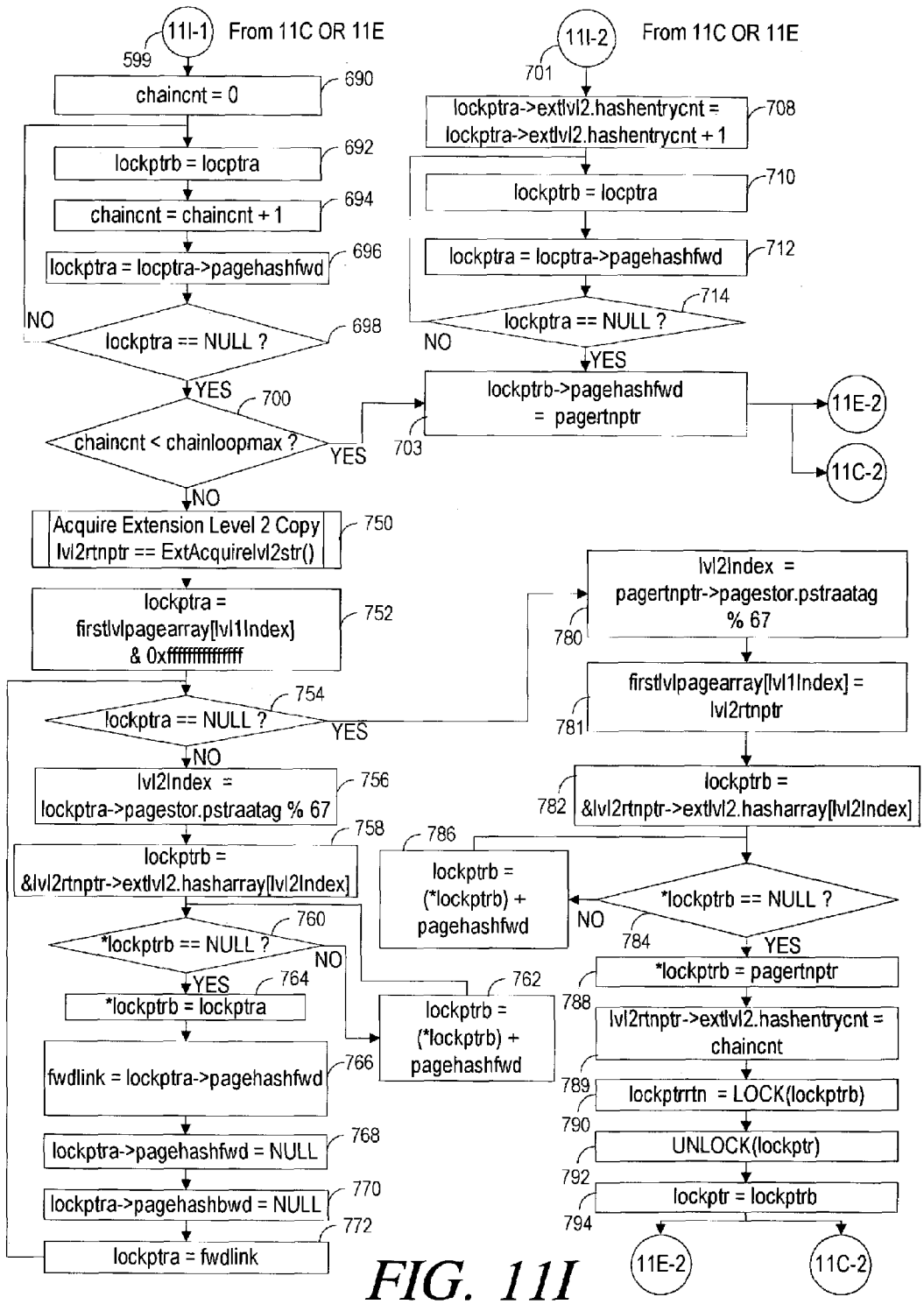

Referring now to page FIG. 11I, step 690 sets a chain count equal to zero. Control is then passed to step 692. Step 692 sets a lock pointer B (lockptrb) equal to lock pointer A. Control is then passed to step 694. Step 694 is an increment function that sets the chain count equal to the chain count plus 1. Control is then passed to step 696. Step 696 sets the lock pointer A equal to the page hash forward link in the header of the page identified by lock pointer A. Control is then passed to step 698. Step 698 determines if lock pointer A equals null. If lock pointer A is not null, the end of the page chain has not been reached, and control is passed back to step 692. If, however, lock pointer A is null, the end of the chain has been reached, and control is passed to step 700. Step 700 determines whether the chain count is less than the chain loop maximum. If the chain count is less than the chain loop maximum, control is passed to 703. Step 703 sets the page hash forward link in the header of the page identified by lock pointer B to the page return pointer value (pagetrnptr). Control is then passed to step 618 of FIG. 11E if FIG. 11I was entered from FIG. 11E, or to step 538 of FIG. 11C if FIG. 11E was entered from FIG. 11C.

Referring back to step 682 of FIG. 11C, if the page identified by the lock pointer A is a level 2 page, control is passed to entry point 701 of FIG. 11I. Step 708 increments the level 2 hash entry count of the location identified by lock pointer A. Control is then passed to step 710. Step 710 sets a lock pointer B equal to lock pointer A. Control is then passed to step 712. Step 712 sets the lock pointer A equal to the contents of the page hash forward link in the header of the page identified by lock pointer A. Control is then passed to step 714. Step 714 determines whether lock pointer A is null. If lock pointer A is not null, the end of the chain has not yet been reached, and control is passed back to step 710. If, however, lock pointer A is null, the end of the chain has been reached, and control is passed to step 703.

Step 710, 712 and 714 are similar to steps 790–698 but no chain count is maintained. A chain count is not necessary because, in the illustrative embodiment, only 2 levels of indexing are used. However, if a third level of indexing were used, a chain count could be maintained and compared to a chain loop maximum.

Referring back to step 516 of FIG. 11B, if the PIDXT identified by lock return pointer 3 is not equal to null or blank, control is passed to step 600 of FIG. 11E. Step 600 calculates an absolute address mask that includes 64 bits with only 1 of the bits set to 1. The one set bit is determined by bits 17–12 of the absolute address. Control is then passed to step 602. Step 602 writes the absolute address mask, calculated in step 600, to the PIDXAAMSK field in the PIDX entry identified by lock pointer 3. Control is then passed to step 604. Step 604 sets a PIDXAA tag in the PIDX entry identified by lock pointer 3 to the absolute address tag 2 calculated in step 514 of FIG. 11B. Control is then passed to step 606. Step 606 sets the PIDX forward link field in the PIDX entry identified by lock pointer 3 to a null. Control is then passed to step 608. Step 608 sets the PIDXASDSKADD field in the PIDX entry identified by lock pointer 3 equal to zero. This is equivalent to unlocking lock pointer 3. Control is then passed to step 610.

Step 610 acquires a page, where the page return pointer points to the location of the acquired page. Control is then passed to step 612. Step 612 sets a PSTRAA tag in the page identified by the page return pointer to the absolute address tag calculated in step 402 of FIG. 11A. Control is then passed to step 614. Step 614 determines if the contents pointed to by the lock pointer are equal to a test set flag, which in this case is all zeros. If the contents pointed to by the lock pointer are equal to the test set flag, the entry is null and locked and is the first entry in the chain. Control is then passed to step 616. Step 616 sets the current lock pointer to the page return pointer provided in step 612 ORed with the test set flag. The test set flag sets the lock bit of the lock pointer. Control is then passed to step 618. Steps 618 through step 628 are described above.

Referring back to step 614, if the contents pointed to by the lock pointer are not equal to the test set flag, then a synonym entry must already exist in either the first or second level hash tables, and control is passed to step 680. Control is passed to step 800. Step 800 creates a temporary lock pointer A (lockptra), which is equivalent to the lock pointer calculated in step 406 but has the lock bit masked out. Control is then passed to step 802. Step 802 determines if the page identified by the lock pointer A is a level 2 storage page. If the page identified by lock pointer A is not a level 2 storage page, control is passed to entry point 599 of FIG. 11I. If the page identified by the lock pointer A is a level 2 page, control is passed to entry point 701 of FIG. 11I.

Referring back to step 700 of FIG. 11I, if the chain count is equal to the chain loop maximum, control is passed to step 750. Beginning with step 750, a second level table is being built. Step 750 acquires a free level 2 table. The free level 2 table already has a page level in the page header information stored therein. Control is then passed to step 752. Step 752 sets the lock pointer A equal to the contents of the location in the first level page array that points to the first page in a chain of 32 pages. Control is then passed to step 754. Step 754 determines if lock pointer A is equal to null which would indicate that the end of the chain of pages has been reached. If lock pointer A does not equal null, control is passed to step 756.

Step 756 sets the level 2 index equal to the remainder of the absolute address tag divided by, in this case, 67. In the illustrative embodiment, the second level index has 67 entries. Control is then passed to step 758. Step 758 sets lock pointer B equal to the address of the hash entry selected by the level 2 index calculated in step 756. Control is then passed to step 760. Step 760 determines if the contents of the location pointed at by lock pointer B is equal to null, which would indicate that there is already a page at that location. If the contents pointed to by lock pointer B is not equal to null, control is passed to step 762.

Step 762 sets lock pointer B equal to the contents of the location pointed to by lock pointer B plus the page hash forward displacement within the page. Now lock pointer B points to the page hash forward location within the page that was linked to. Control is then passed back to step 760. Step 760 determines again whether the contents of the location pointed to by lock pointer B is equal to null. If the contents pointed to by lock pointer B is equal to null, control is passed to step 764, otherwise control is passed back to step 762.

Step 764 stores lock pointer A into the location pointed to by lock pointer B. At this point, the first page in the chain of pages has been linked it into the second level table. Control is then passed to step 766. Step 766 sets the page forward link equal to lock pointer A's forward link. Control is then passed to step 768. Step 768 sets lock pointer A's forward link to null. Control is then passed to step 777. Step 770 sets lock pointer A's backward link to null. Control is then passed to step 772. Step 772 sets lock pointer a equal to the forward link. Control is then passed back to step 754. Step 754 determines whether lock pointer A is equal to null.

The loop including step 754 through 772 continues until the end of the chain is reached. When it is reached, all pages in the chain of pages will have been processed and hashed into the newly acquired second level table. Control is then passed to step 780.

Beginning at step 780, the newly acquired page will be hashed into the second level table. At step 780, the level 2 index is set equal to the remainder of the absolute address tag stored in step 532 divided by 67. The absolute address tag stored in step 532 is the quotient of the absolute address divided by the size of the first level hash table as calculated in step 402 above. Control is then passed to step 781. Step 781 sets the contents of the first level page array indexed by the first level index to the value of the level two return pointer. Control is then passed to step 782. Step 782 sets the lock pointer B equal to the address of the hash entry selected by the level 2 index calculated in step 780. Control is then passed to step 784.

Step 784 determines if the contents of the location pointed at by lock pointer B is equal to null, which would indicate that there is already a page at that location. If the contents pointed to by lock pointer B is not equal to null, control is passed to step 788. Step 788 stores the page return pointer at the location pointed to by lock pointer B. Control is then passed to step 789. Step 789 sets the hash entry count identified by the level 2 return pointer equal to the chain count. Control is then passed to step 790. Step 790 sets lock pointer B return equal to the contents of lock pointer B and locks the location pointed to by lock pointer B. Control is then passed to step 792. Step 792 unlocks the location in the first level table that points to the newly created second level table. Control is then passed to step 794. Step 794 sets the lock pointer equal to lock pointer B. Lock pointer B as indicated above, now points to the newly created page in the second level table. Control is then passed to step 538 if FIG. 11E was entered from FIG. 11C or step 618 if FIG. 11E was entered from FIG. 11E.

Referring back to step 654 of FIG. 11B, if lock pointer 4 is equal to null, which indicates that the PIDX entry for the block of pages does not exist, control is passed to step 801 of FIG. 11F. Step 801 locks lock pointer 2 and passes the contents of the location pointed to by lock pointer 2 to lock return pointer 2. Control is then passed to step 803. Step 803 locks lock pointer 3. Control is then passed to step 805. Step 805 sets the first level index to zero. Control is then passed to step 806. Step 806 sets the search count equal to the size of the PIDX array, which is an array of PIDXT entries. Control is then passed to step 807. Step 807 sets lock pointer 4 equal to the address of the PIDX entry indexed by the first level index. In the first case, lock pointer 4 equals the address of the first entry in the PIDX array. Control is then passed to step 808.

Step 808 determines if the lock bit of location identified by the lock pointer 4 equals one. If the lock bit is set, control is passed to step 812. If, however, the lock bit is not set, control is passed to step 810. Step 810 determines if the null flag of location identified by lock return 4 is equal to one. If the null flag is equal to one, control is passed to FIG. 11G. If however, the null flag is not equal to one, control is passed to step 812.

Step 812 increments the first level index value. Control is then passed to step 814. Step 814 increments the search count. Control is then passed to step 816. Step 816 determines if the search count is equal to zero. If the search count is not equal to zero, control is passed back to step 806. If the search count is equal to zero, the entire PIDX array is full, and control is passed to step 818. Step 818 unlocks lock pointer 2. Control is then passed to step 820. Step 820 sets the first level 2 index equal to zero. Control is then passed to step 822.

Steps 822 through 850 of FIG. 11F attempt to identify an unused PIDX entry by systematically searching through the Backing Store (BKS) page index. Step 822 sets lock pointer 2 equal to the address of the location indexed by the level 2 index. Control is then passed to step 824. Step 824 locks lock pointer 2 and passes the contents of the location identified by lock pointer 2 to lock return pointer 2. Control is then passed to step 826. Step 826 determines if lock return pointer 2 is equal to null. If lock return pointer 2 is equal to null, the identified page will be acquired and used as indicated in FIG. 11H. If lock return pointer 2 is not equal to null, control is passed to step 828.

Step 828 sets the level 1 index equal to zero. Control is then passed to step 830. Step 830 sets the search count equal to the size of the PIDX array, which is an array of PIDXT entries. Control is then passed to step 832. Step 832 sets lock pointer 4 equal to the address of the PIDX entry indexed by the first level index. In the first case, lock pointer 4 equals the address of the first entry in the PIDX array. Control is then passed to step 834.

Step 834 determines if the location identified by lock pointer 4 has the lock bit set. If the location identified by lock pointer 4 does have the lock bit set, control is passed to step 838. If, however, the location identified by lock pointer 4 does not have the lock bit set, control is passed to step 836. Step 836 determines if the location identified by lock pointer 4 has the null flag set. If the location identified by lock pointer 4 does have the null flag set, control is passed to FIG. 11G. If, however, the location identified by lock pointer 4 does not have the null flag set, control is passed to step 838.

Step 838 increments the first level index. Control is then passed to step 840. Step 840 increments the search count. Control is then passed to step 842. Step 816 determines if the search count is equal to zero. If the search count is not equal to zero, control is passed back to step 832. If the search count is equal to zero, the entire PIDX array is full, and control is passed to step 844. Step 844 unlocks lock pointer 2. Control is then passed to step 846. Step 846 increments the second level index to identify the next page in the BKS page index. Control is then passed to step 850.

Step 850 determines whether the level 2 index equals the size of BKS page index. If the second level index is not yet equal to the size of the BKS page index, control is passed back up to step 822. If however, the level 2 index equals the size of BKS page index, all of the pages in BKS page index have been searched and control is passed to error 445 of FIG. 11D. Referring back to steps 810 and 836, if the null flag of lock return 4 equals 1, which indicates that a blank entry is encountered, control is passed to FIG. 11G.

Referring to FIG. 11G, step 900 sets the PIDX forward link of the PIDX entry that is at the end of the chain to the identified PIDX entry. Lock pointer 3 was found to be the last entry in the PIDX entry chain in steps 652 and 654 of FIG. 11B. Lock pointer 4 was found to be a blank PIDX entry in steps 810 and 836. Control is then passed to step 902. Step 902 unlocks lock pointer 3. Control is then passed to step 904. Step 904 sets the absolute address mask, with one bit set. The one bit that is set is determined by bits 17–12 of the absolute address. Control is then passed to step 906. Step 906 sets the PIDXAA mask of the PIDX entry identified by lock pointer 4 equal to the absolute address mask calculated in step 904. Control is then passed to step 908.

Step 908 sets the PIDXAA tag of the PIDX entry identified by lock pointer 4 equal to the absolute address tag calculated in step 514 of FIG. 11B. Control is then passed to step 910. Step 910 sets the PIDX forward link of the PIDX entry identified by lock pointer 4 equal to null. Control is then passed to step 912. Step 912 sets a "written to" bit in the page index flags of the PIDX entry pointed to by lock pointer 2. The "written to" bit indicates that the page has been written to and needs to be stored to backing store before being removed from memory. Control is then passed to step 914. Step 914 sets the alt flag in the PIDXASD-SKADD field of the PIDX entry identified by lock pointer 5. When the alt flag is set to 1, the test set flag is also set to zero, which is equivalent to unlocking lock pointer 4. The alt flag indicates that the PIDX entry identified by lock pointer 4 is not in its normal hash location. Control is then passed to step 916. Step 916 unlocks lock pointer 2. Control is then passed back to step 610 of FIG. 11E.

Referring back to step 826 of FIG. 11F, or step 508 of FIG. 11B, if lock return pointer 2 is not equal to null, control is passed to step 1000 on FIG. 11H. When control is passed to step 1000, the new page within the Backing Store (BKS) page index does not yet exist. Step 1000 acquires a new page. Control is then passed to step 1002. Step 1002 sets the seek address equal to the size of the I/O page plus the level 2 index times the size of the I/O page. In the illustrative embodiment shown, there is a predetermined amount of mass storage space reserved for PIDX pages. Control is then passed to step 1003. Step 1003 positions the backing store file at the spot where it is going to begin reading the data. Step 1003 also returns a seek address return value. Control is then passed to step 1004. Step 1004 compares the seek address with the seek address return identified in step 1003. This verifies that the seek address that the backing store is about to read is the same as the seek address calculated in step 1002. If the seek address equals the seek address return, control is passed to step 1004. If the seek address does not equal the seek address return, control is passed to step 1005 of FIG. 11D.

Step 1006 sets a buffer pointer equal to the address of lock pointer 2. Control is then passed to step 1008. Step 1008 performs a read operation to the backing store. The read operation retrieves one page from the backing store and places the results at the location identified by buffer pointer. Control is then passed to step 1010. Step 1010 determines if the read data counter is equal to the size of an I/O page. If the read data count is not equal to the size of an I/O page, control is passed to step 1007 of FIG. 11D, which is an error. If, however, the read data equals the size of the I/O page, control is passed to step 1012.

Step 1012 calculates the check sums of the page just read. Control is then passed to step 1014. Step 1014 determines if the check sum calculated in step 1012 is equal to the page check sum stored in the retrieved page. If the check sum calculated in step 1012 is not equal to the page check sum stored in the retrieved page, control is passed to step 1009 of FIG. 11D, and an error is issued. If, however, the check sum is equal to the page check sum of the retrieved page, control is passed to step 1016.

Step 1016 determines if the seek address is equal to the seek address stored in the retrieved page. If the seek address is not equal to the seek address that is stored in the retrieved page, control is passed to step 1011 of FIG. 11D, and an error is issued. If, however, the seek address equals the seek address in the retrieved page, control is passed to step 510 if FIG. 11H was entered from FIG. 11B or to step 828 if FIG. 11H was entered from FIG. 11F.

Write Access

An illustrative write page access also involves the hashing of bits 53–12 of the absolute address. Bits 53–12 of the absolute address are divided by size-of the first level page pointer array, yielding a remainder as the index into the first level page pointer array. The first level page pointer array index entry is locked.

If the pointer selected by the index into the first level page pointer array does not point to a second level page pointer array, then the pointer becomes the Current Pointer. If, however, the pointer selected by the index into the first level page pointer array points to a second level page pointer array, then the quotient of the first division is divided by the size-of the second level page pointer array, yielding a remainder as the index into the second level page pointer array. The pointer selected by the index into the second level page pointer array becomes the Current Pointer. The second level page pointer array entry is locked and the first level page pointer array entry is unlocked. Addition levels of index tables may be used, if desired.

The Current Pointer points to a chain of storage type Page Index Headers. The chain is searched for a match on the absolute address tag. If a match is found, the word to be written is located in the blkarray of PAGESTOR using bits 11–0 of the absolute address as the index. The write flag is set in the page, which allows the page copy to be destaged to the backing store file if the page copy is reused. After the word is written the locked index is released.

If a match is not found, the page, if it exists, is identified by the hashing of bits 53–18 of the absolute address to find the File Page Index Entry associated with the block of 64 pages. Bits 53–12 are divided by the size-of a PIDXENTRY array, yielding a remainder as the index into the selected Page Index Copy Page Index Entry array (pidxarray) and a quotient, which divided by the size-of Page Index Copy Pointer array, yields a remainder as the index into the Page Index Copy Pointer Array. The chain of Page Index Entries (PIDXENTRY) is located in the selected Page at the index.

The chain of Page Index Entries is searched for a match on absolute address tag bits 53–18. If a match is found, absolute address bits 17–12 are converted into a 64 bit mask word. In one illustrative embodiment, the 64 bit mask word includes one bit that is set. The set bit is identified by absolute address bits 17–12. For example, for absolute address bits "000", the 64 bit mask word may be "0x0000000000000001"; for absolute address bits "001", the 64 bit mask word may be "0x0000000000000002", for absolute address bits "002", the 64 bit mask word may be "0x0000000000000004", and for absolute address bits "077", the 64 bit mask word may be "0x8000000000000000".

The formed 64 bit mask word is then ANDED with the pidxaamsk field of the Page Index Entry. If the AND result is zero, then the formed 64-bit mask word is added to the pidxaamsk field of the Page Index Entry. A main storage page is then acquired, initialized to zero and linked to the Current Pointer chain. If the Current Pointer chain is a level one and the chaining level exceeds the maximum chain loop count then, an extension buffer is acquired and initialized to a level two page array, and the chained entries are loaded into the level two page array look up table area. The word to be written is located in the blkarray of PAGESTOR using bits 11–0 of the absolute address as the index. The write flag is set in the page, which allows the page copy to be destaged to the backing store file if the page copy is reused. After the word is written, the locked index is released.

If the AND result is non-zero, a main storage page is acquired and linked to the Current Pointer chain. If the Current Pointer chain is a level one and the chaining level exceeds the maximum chain loop count, then a main storage page is acquired, converted to a level two page array, and the chained entries are loaded into the level two look up table. If the file start address pidxsdskadd of the Page Index Entry is NULL then, the page is initialized to zeros and the word to be read is all zeros, and the locked index is released.

If the file start address pidxsdskadd of the Page Index Entry is not NULL, a seek I/O is initiated to the backing store file at the file start address pidxsdskadd of the Page Index Entry plus (absolute address bits 17–12\* size of IOPAGE). After the seek completion, a read I/O is initiated and the data is transferred to the Page Storage Copy portion of the Page. The word to be read is located in the blkarray of PAGESTOR using bits 11–0 of the absolute address as the index. After the word is accessed, the locked index is released.

As noted above, the Current Pointer points to a chain of storage type Page Index Headers. The chain is searched for a match on the absolute address tag. If a match is not found, a Page Index Entry is acquired and initialized. Absolute address bits 17–12 are converted into a 64 bit mask word. The formed 64-bit mask is stored in the pidxaamsk field of the Page Index Entry. A main storage page is acquired, initialized to zero and linked to the Current Pointer chain. If the Current Pointer chain is at level one and the chaining level exceeds the maximum chain loop count, then a main storage page is acquired, converted to a level two page array and the chained entries are loaded into the level two look up table. The word to be read is all zeros, and the locked index is released.

If the AND result is zero, the formed 64-bit mask is added to the pidxaamsk field of the Page Index Entry. A main storage page is then acquired, initialized to zero and linked to the Current Pointer chain. If the Current Pointer chain is a level one and the chaining level exceeds the maximum chain loop count then, a main storage page is acquired, converted to a level two page array, and the chained entries are loaded into the level two look up table. The word to be written is located in the blkarray of PAGESTOR using bits 11–0 of the absolute address as the index. The write flag is set in the page, which allows the page copy to be destaged to the backing store file if the page copy is reused. After the word is written the locked index is released.

If the AND result is non-zero, a main storage page is acquired and linked to the Current Pointer chain. If the Current Pointer chain is a level one and the chaining level exceeds the maximum chain loop count, then a main storage page is acquired, converted to a level two page array, and the chained entries are loaded into the level two look up table. If the file start address pidxsdskadd of the Page Index Entry is NULL, then the page is initialized to zeros, and the word to be written is located in the blkarray of PAGESTOR using bits 11–0 of the absolute address as the index. The write flag is set in the page, which allows the page copy to be destaged to the backing store file if the page copy is reused. After the word is written the locked index is released.

If the file start address pidxsdskadd of the Page Index Entry is not NULL, a seek I/O is initiated to the backing store file at the file start address pidxsdskadd of the Page Index Entry plus (absolute address bits 17–12\* size of IOPAGE). After the seek completion, a read I/O is initiated and the data is transferred to the Page Storage Copy portion of the Page. The word to be written is located in the blkarray of PAGESTOR using bits 11–0 of the absolute address as the index. The write flag is set in the page, which allows the page copy to be destaged to the backing store file if the page copy is reused. After the word is written the locked index is released.

As noted above, the Current Pointer points to a chain of storage type Page Index Headers. The chain is searched for a match on the absolute address tag. If a match is not found, a Page Index Entry is acquired and initialized. Absolute address bits 17–12 are converted into a 64 bit mask word. The formed 64-bit mask is stored in the pidxaamsk field of the Page Index Entry. A main storage page is acquired, initialized to zero and linked to the Current Pointer chain. If the Current Pointer chain is at level one and the chaining level exceeds the maximum chain loop count, then a main storage page is acquired, converted to a level two page array and the chained entries are loaded into the level two look up table. The word to be written is located in the blkarray of PAGESTOR using bits 11–0 of the absolute address as the index. The write flag is set in the page, which allows the page copy to be destaged to the backing store file if the page copy is reused. After the word is written the locked index is released.

A more detailed description of an illustrative read access is shown and described below with reference to FIGS. 12A–12I. FIGS. 12A–12I are flow diagrams showing a write access in accordance with an illustrative embodiment of the present invention. FIGS. 12A–12I are similar to FIGS. 11A–11I, with a few differences. The differences are detailed below.

Figure 12A:
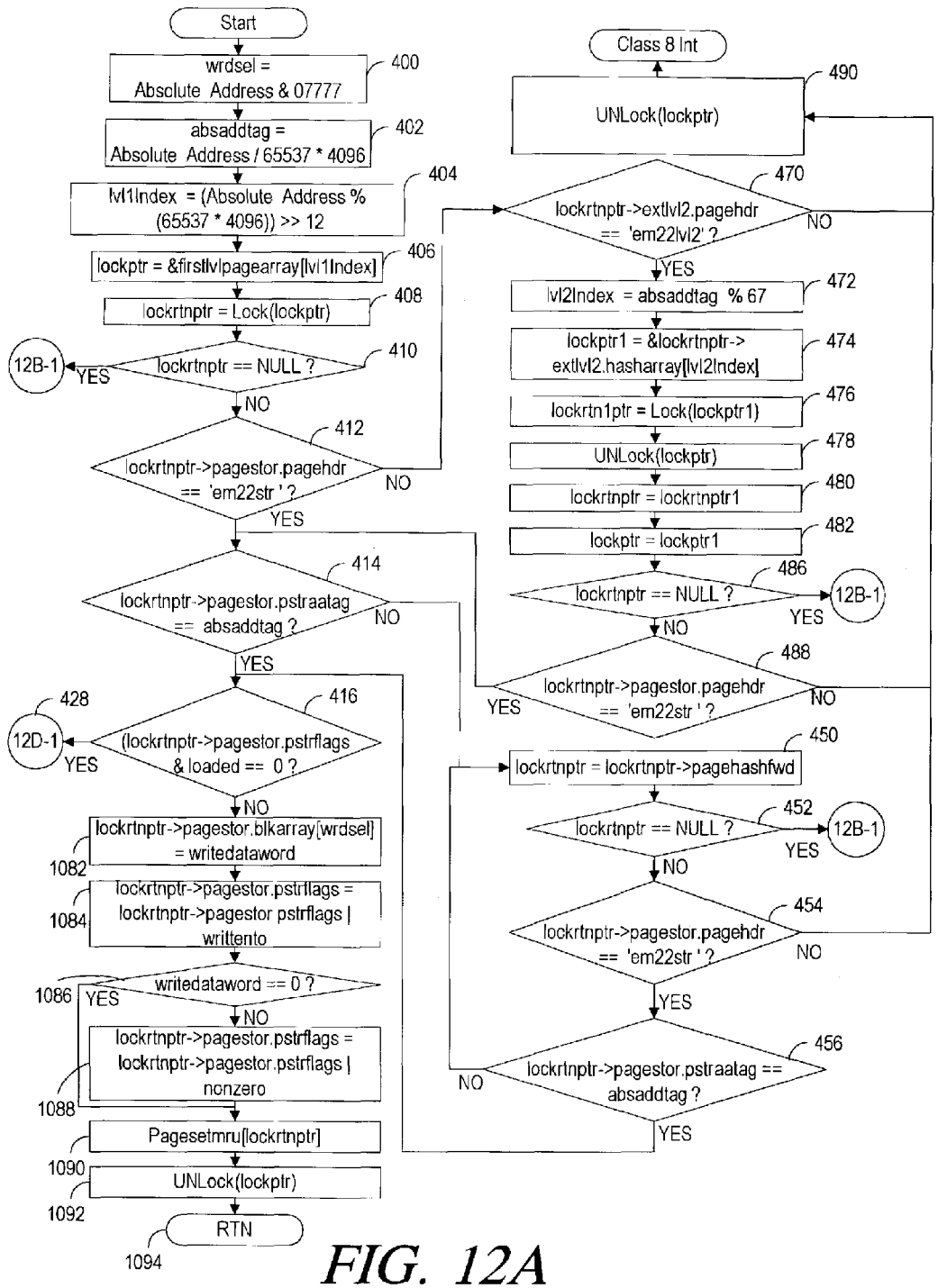
FIGS. 12A–12I are flow diagrams showing an illustrative write access in accordance with the present invention.
Figure 12B:
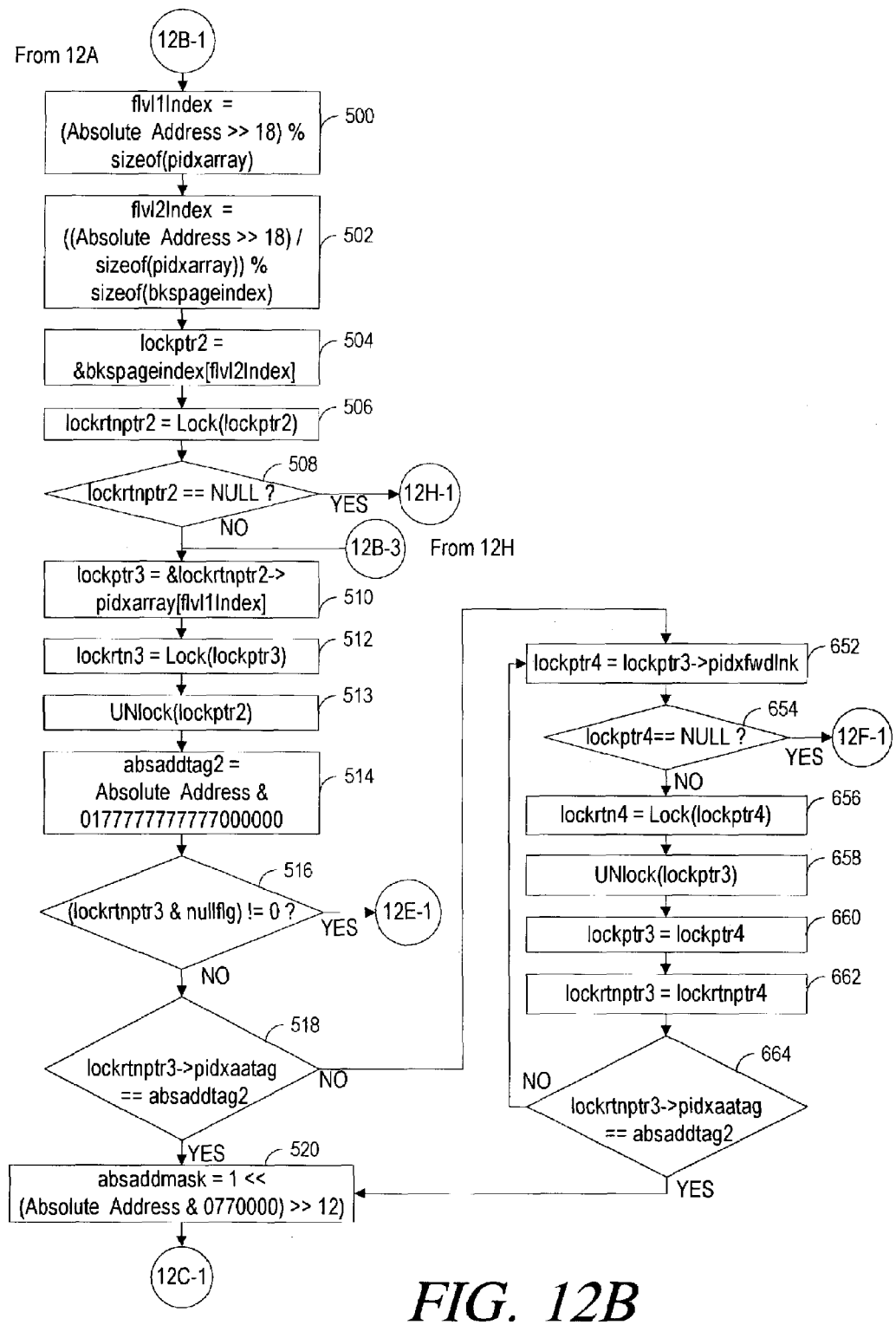

FIG. 12A is the same as FIG. 11A except that steps 418, 420, 422 and 424 of FIG. 11A are replaced with steps 1082, 1084, 1086, 1088, 1090, 1092 and 1094. Step 1082 writes the data word (writedataword) to the location indexed byword select calculated in step 400 of the page identified by lock return pointer. Control is then passed to step 1084. Step 1084 sets the "written to" flag in the header of the page identified by lock return pointer. Control is then passed to step 1086. Step 1086 determines if the write data word is equal to zero. If the write data word is equal to zero, control is passed to step 1090. If, however, the write data word is not equal to zero, control is passed to step 1088. Step 1088 sets the non-zero flag in the header of the page identified by lock return pointer, and control is passed to step 1090. The "written to" and non-zero flags can be used to determine if a particular page has to be written to backing store before the page is released or reused.

Step 1090 uses a function that takes the page selected by the lock return pointer from wherever it is in the least recently used chain, and marks it as the most recently used page by placing it on the head of the least recently used chain. Control is then passed to block 1092. Step 1092 unlocks the lock pointer. Control is then passed to step 1094. Step 1094 returns control to the requesting function or requesting hardware, as desired.

Figure 12C:
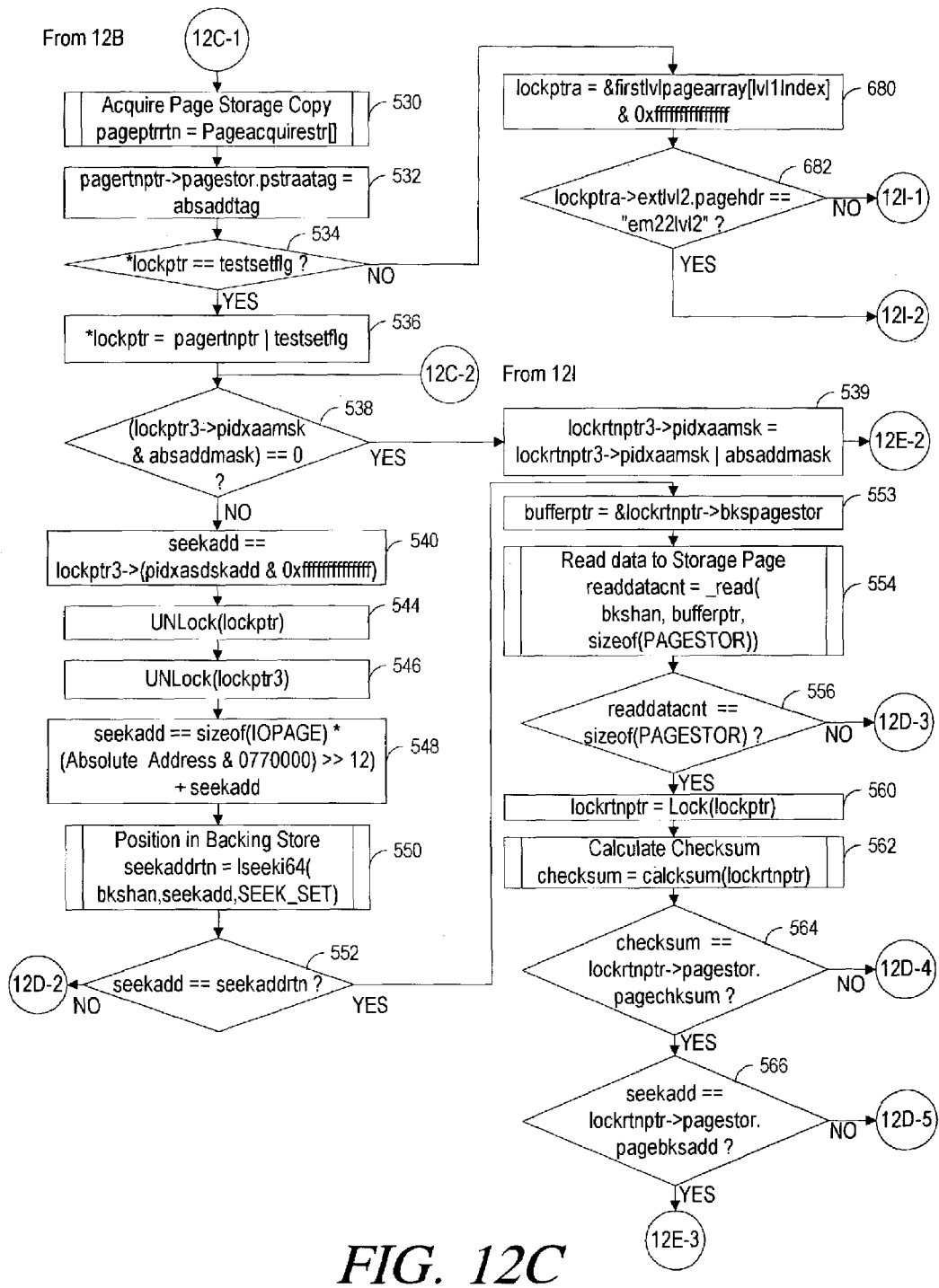
Figure 12D:
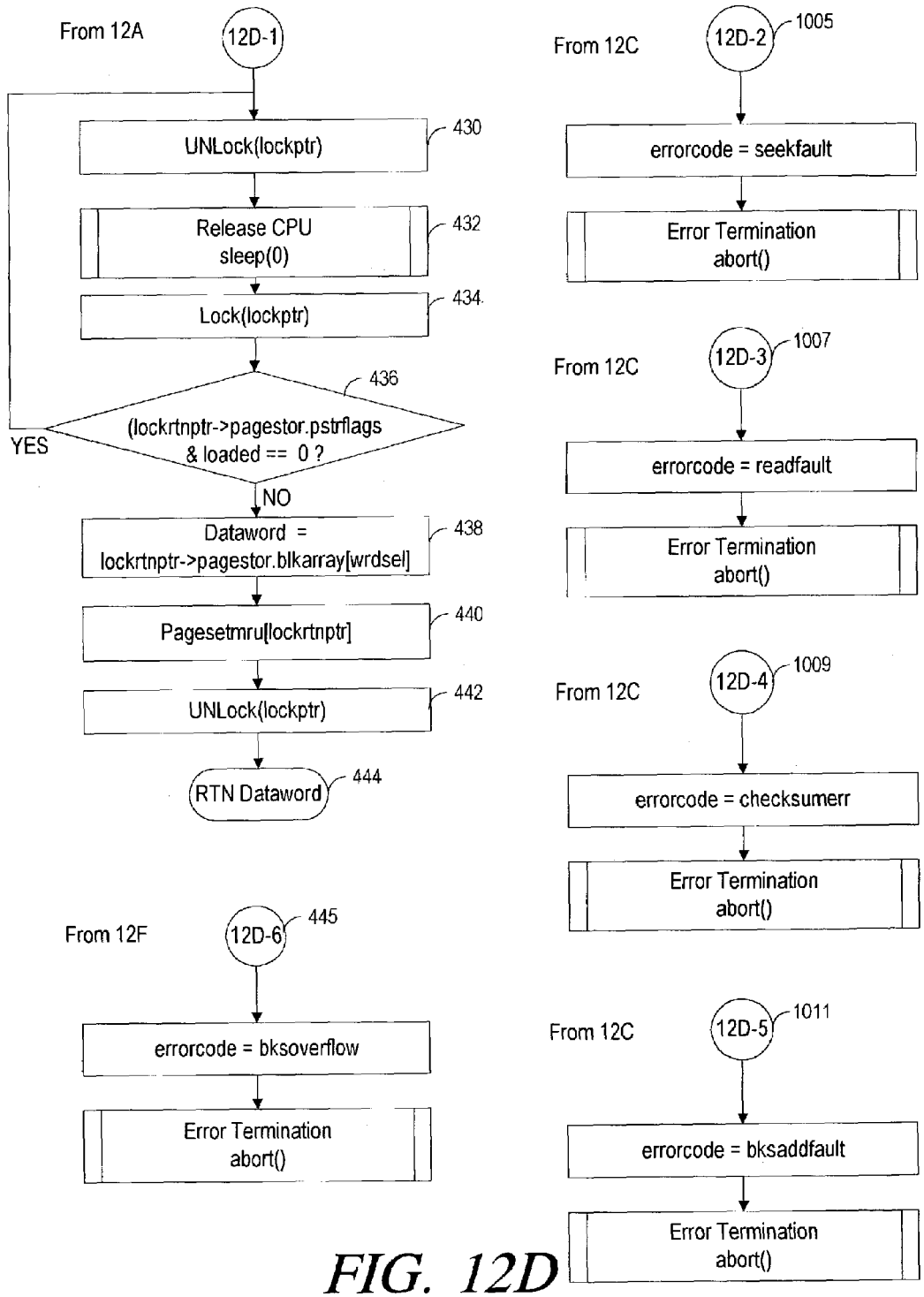

FIG. 12C is the same as FIG. 11C except that steps 568, 570, 572 and 574 of FIG. 11C are removed. That is, and referring to step 566 of FIG. 12C, if the seek address equals the page backing store address of the page, control is passed to step 1100 of FIG. 12E. If the seek address does not equal the page backing store address of the page, control is passed to step 1011 of FIG. 12D, and an error is issued.

Figure 12E:
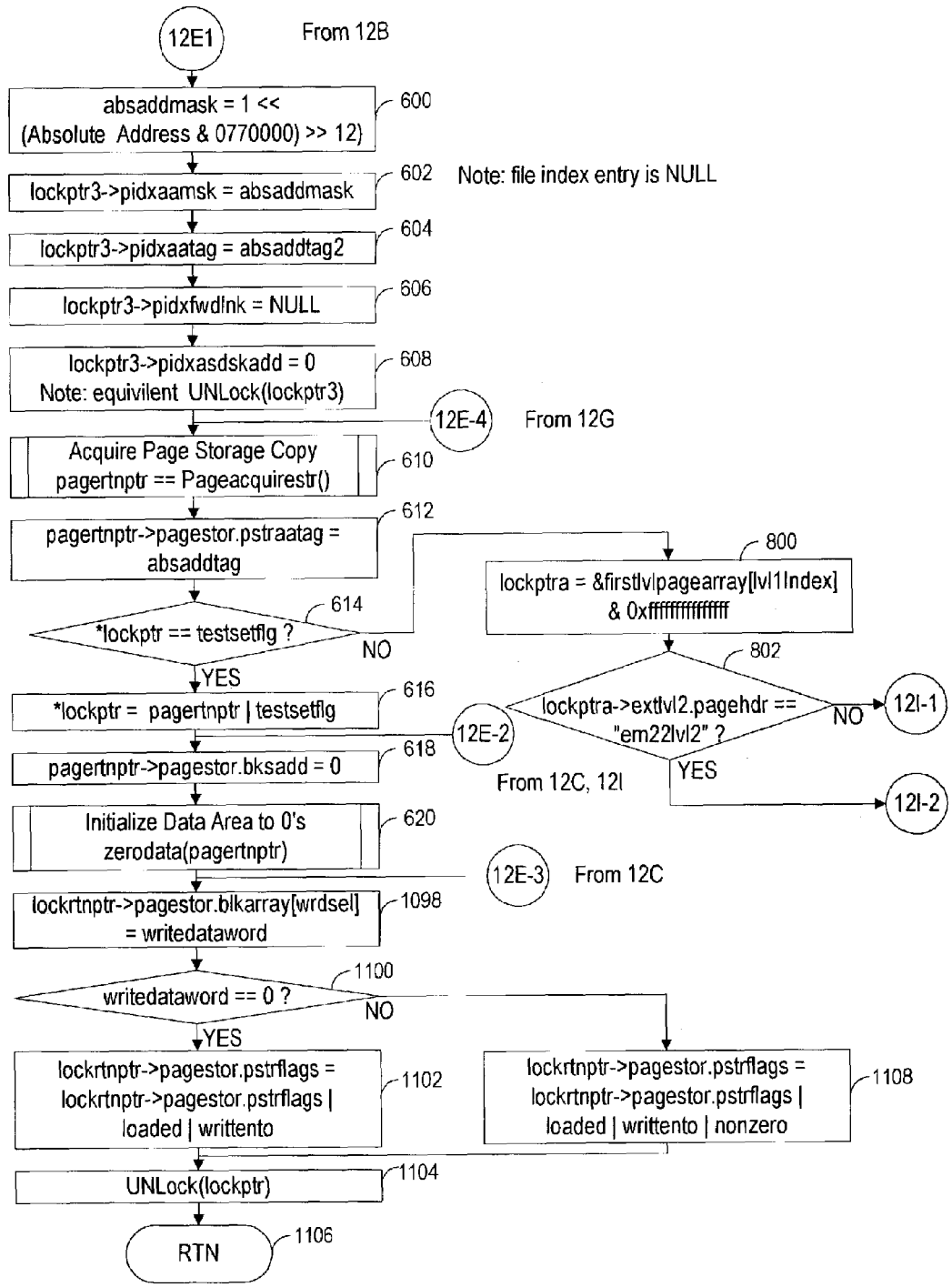
Figure 12F:
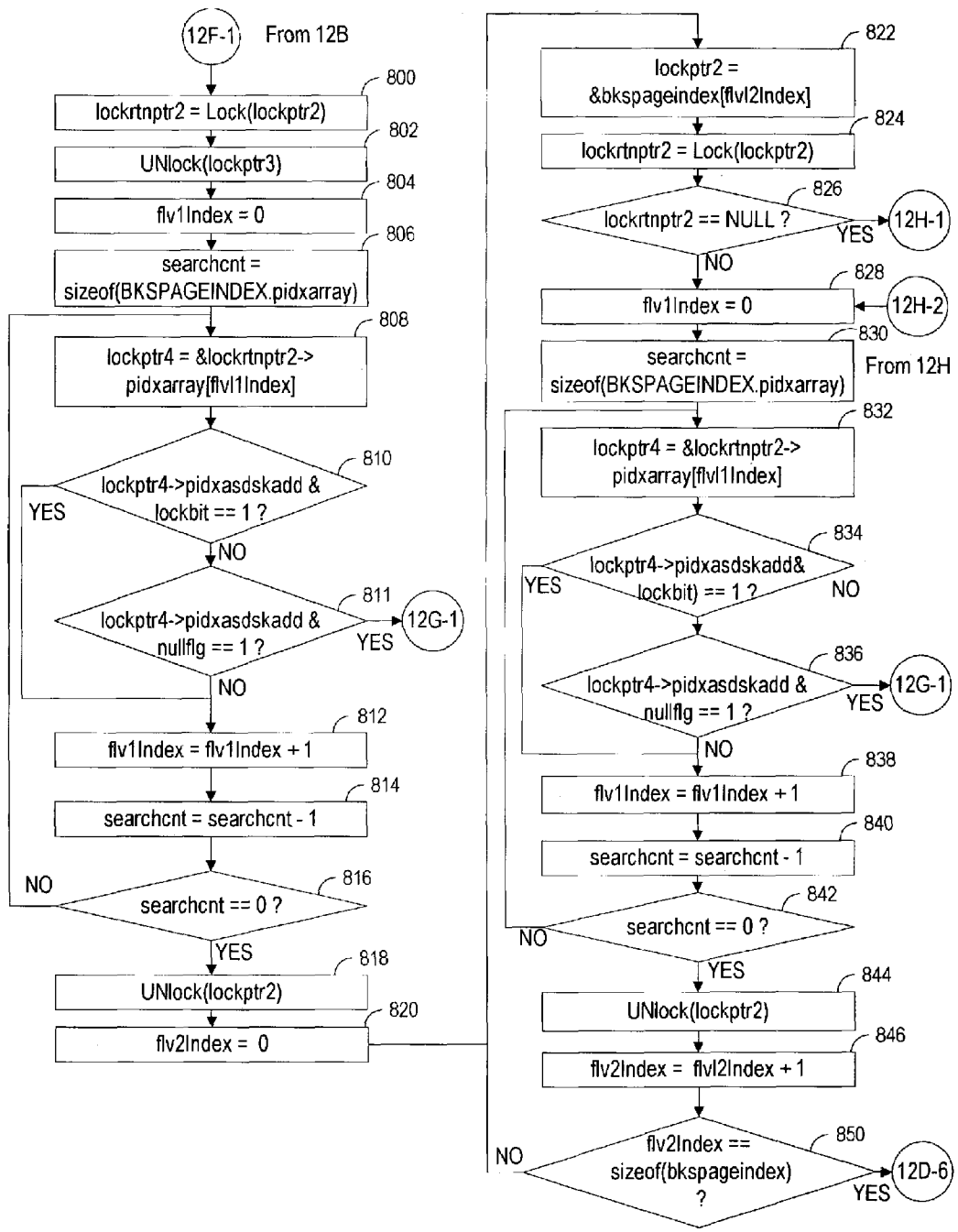
Figure 12G:
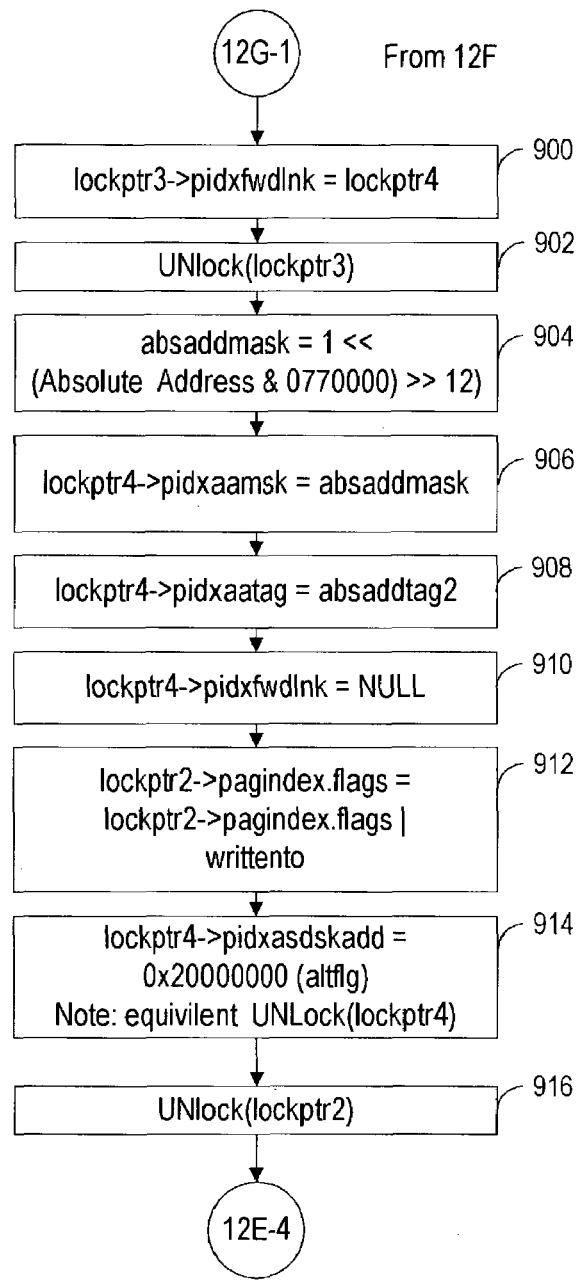
Figure 12H:
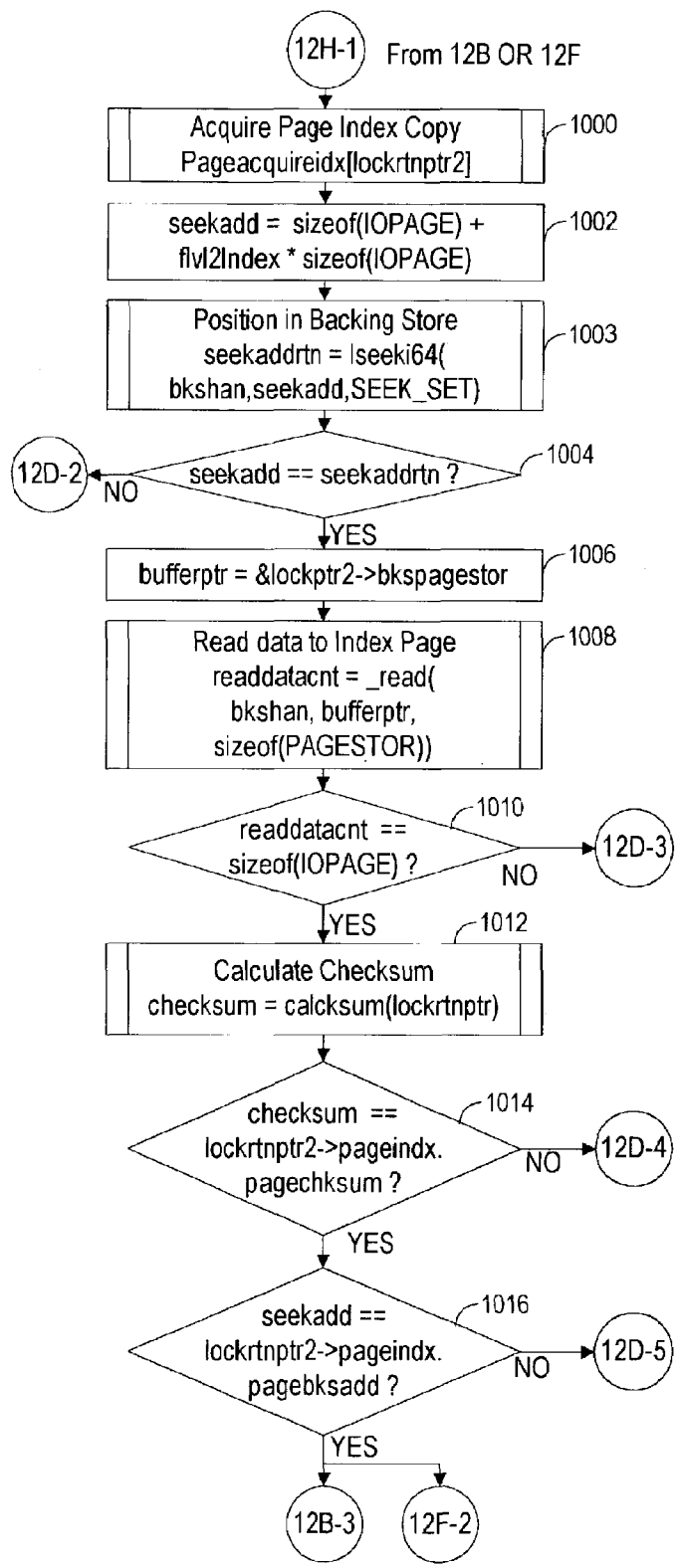
Figure 12I:
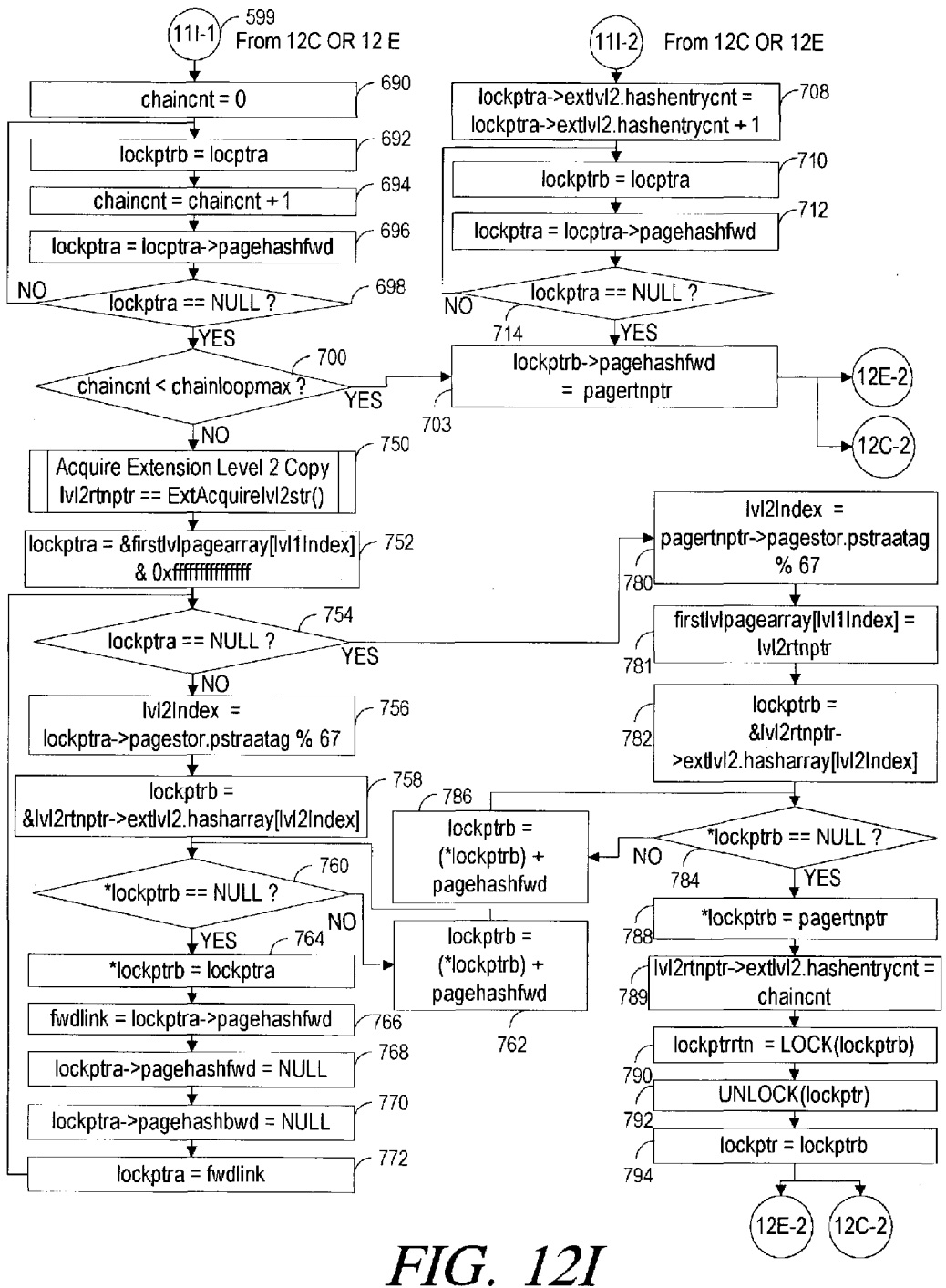

FIG. 12E is the same as FIG. 11E except that steps 622, 624, 626 and 268 of FIG. 11E are replaced with steps 1098, 1100, 1102, 1004, 1106 and 1108. After the data area is initialized to zero, control is passed to step 1098. Step 1098 writes the data word (writedataword) to the location indexed by word select calculated in step 400 of the page identified by lock return pointer. Control is then passed to step 1100. Step 1100 determines if the write data word is equal to zero. If the write data word is equal to zero, control is passed to step 1102. Step 1102 sets the loaded flag of the page store flags in the header of the page identified by lock return pointer. Control is then passed to 1104. Step 1104 unlocks the lock pointer. Control is then passed to step 106. Step 1106 indicates that the write is complete and returns control to the calling function.

Referring back to step 1100, if the write data word is not equal to zero, control is passed to step 1108. Step 1108 sets the loaded written to and non-zero flags in the header of the page identified by lock return pointer. The written to and non-zero flags can be used to determine if a particular page has to be written to backing store before the page is released or reused. Control is then passed to step 1104. The remaining steps are similar to those described with respect to FIGS. 11A–11I.

Page Acquire

The acquire page is accomplished by removing a page from the tail of the MRU/LRU queue and placing the removed page on the head of the Invalidate queue. Any cache entries associated with the removed page is invalidated. The new page to be used is removed from the tail of the invalidate queue.

Figure 13A:
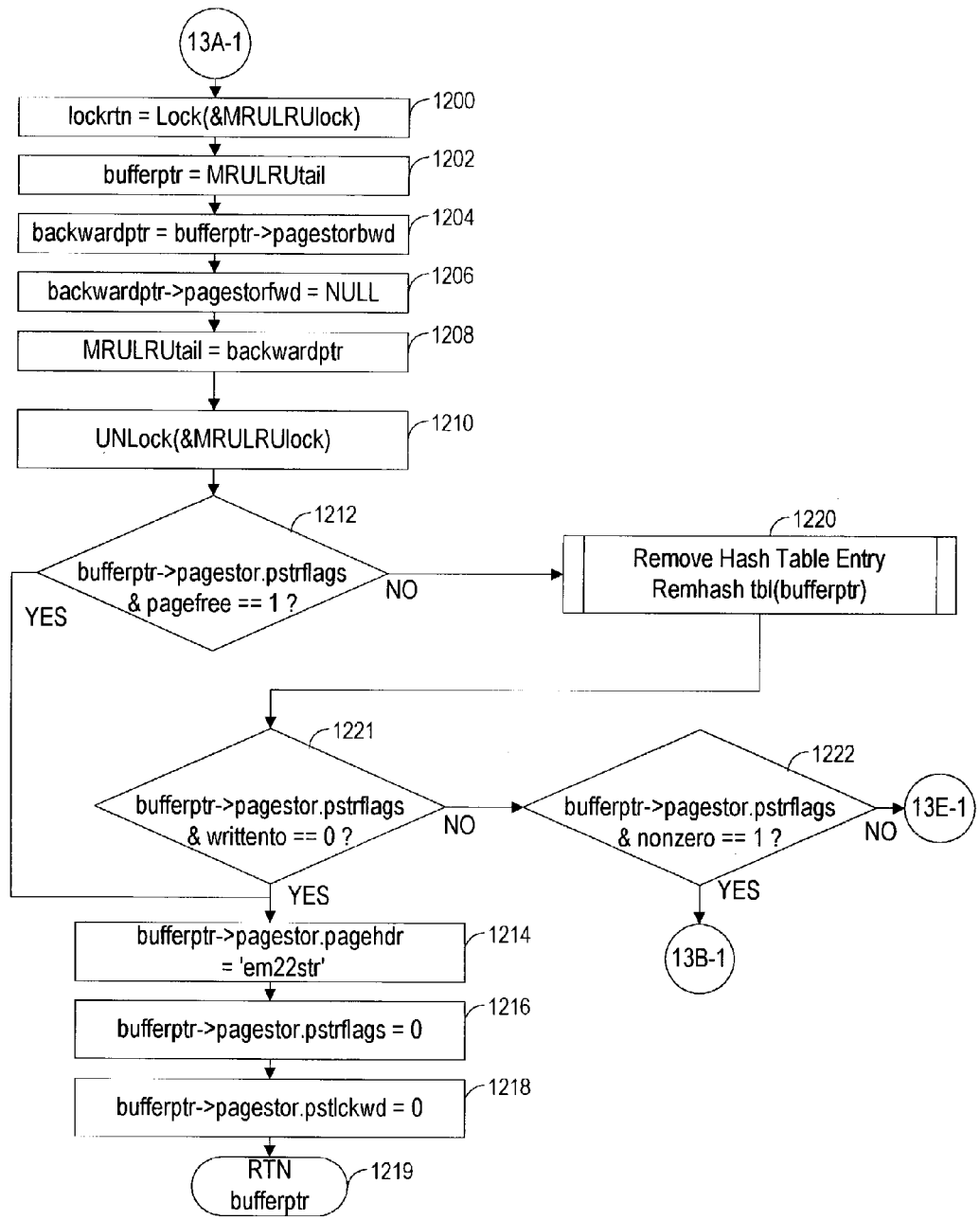
FIGS. 13A–13G are flow diagrams showing an illustrative page acquire in accordance with the present invention.

A more detailed description of an illustrative page acquire is shown and described with reference to FIGS. 13A–13G. Referring first to FIG. 13A, at step 1200, the address of the Most Recently Used/Least Recently Used queue (MRULRU) lock location is passed to the lock function, which locks the MRULRU queue. The MRULRU queue is a doubly linked list of all available pages in the system, and includes the head of the queue and the tail of the queue. Control is then passed to step 1202.

Step 1202 sets a buffer pointer equal to the MRULRU tail. Control is then passed to step 1204. Step 1204 sets a backward pointer equal to the backward pointer of the last page in the MRULRU queue, as identified by the buffer pointer. Control is then passed to step 1206. Step 1206 writes the page store forward link of the second to last page in the MRULRU queue to null. Control is then passed to step 1208.

Step 1208 sets the MRULRU tail to the second to last page in the MRULRU tail. Now, the second to last page in the MRULRU queue is at the tail at the double link list. The page that was removed, or in this case the last page in the MRULRU queue, is pointed to by the buffer pointer. Control is then passed to step 1210. Step 1210 unlocks the MRULRU queue. Control is then passed to step 1212.

Step 1212 determines if the page free flag of the removed page identified by the buffer pointer is equal to one. The page free flag will be set to one if the page is not linked into a hash table. If the page free flag is equal to one, control is then passed to step 1214. Step 1214 writes the header of the just removed page with the EM22STR string, which indicates that the page is now a storage page. Control is then passed to step 1216. Step 1216 sets all the flags of the recently removed page equal to zero. Control is then passed to step 1218. Step 1218 sets the lock word for the page that was just removed equal to zero, which indicates that the page is no longer locked. Control is then passed to step 1219, wherein a pointer to the page just removed from the MRULRU queue is passed to the calling function such as block 530 of FIG. 11C of the read access.

Referring back to step 1212, if the page free flag is not equal to one, the page is currently assigned to a hash table and therefore must be removed from the hash table before it is assigned a new address in the hash table. Control is then passed to step 1221. Step 1221 determines if the "written to" flag of the page just removed from the MRULRU queue is equal to zero. If it is equal to zero, the page has not yet been written to and therefore it does not have to be written to backing store, and control is then passed to step 1214. If, however, the "written to" bit is not equal to zero, control is then passed to step 1222. Step 1222 determines if the non-zero flag is equal to one. If the non-zero flag is equal to one, the page must be written to backing store and control is passed to FIG. 13B. If the non-zero flag is not equal to one, control is passed to FIG. 13E, and removed from the address space.

Figure 13B:
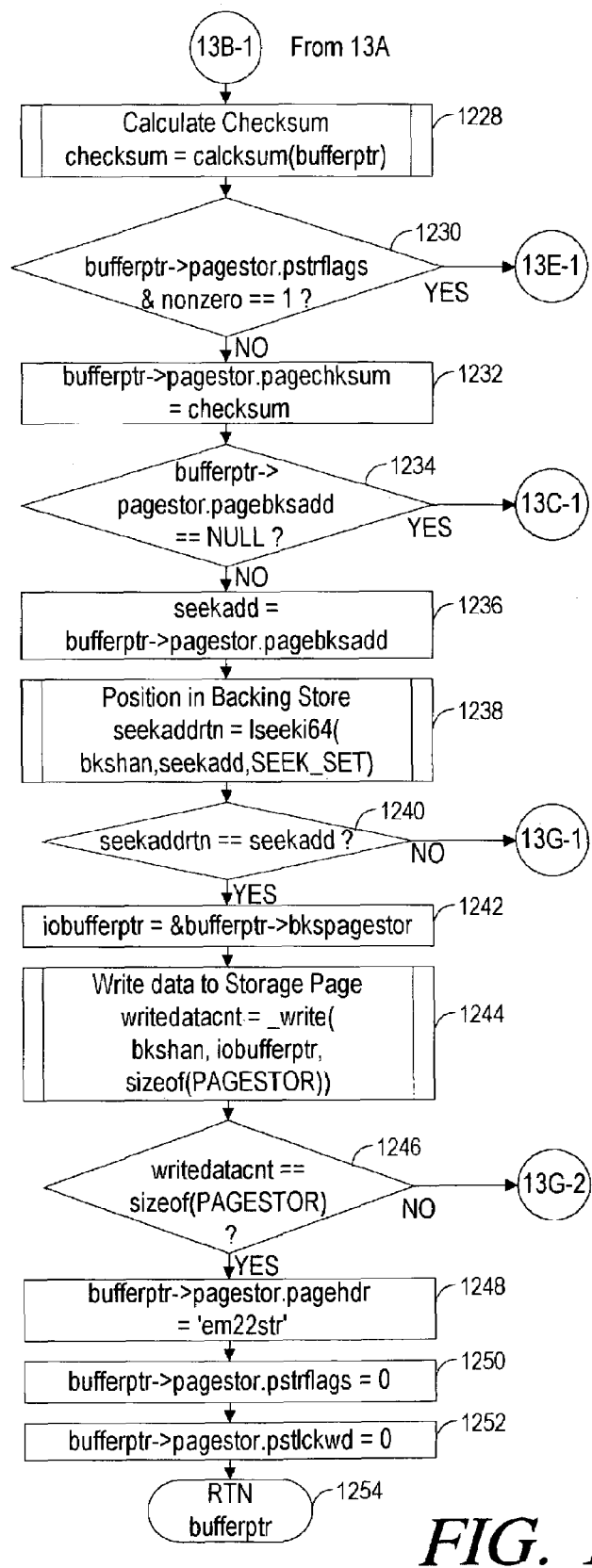

Referring now to FIG. 13B. At step 1228, a check sum is calculated for the page pointed to by the buffer pointer. Control is then passed to step 1230. Step 1230 determines if the non-zero flag of the page pointed to by buffer pointer is equal to one. The non-zero flag could have been set by the calculate check sum step 1228 when the page equals all zeros. If the non-zero flag is equal to one, the page contains all zeros and can be squashed as shown and described with reference to FIG. 13E. If the non-zero flag is not equal to one, control is passed to step 1232.

Step 1232 stores the generated check sum in the check sum field of the page header identified by the buffer pointer. Control is then passed to step 1234. Step 1234 determines if the backing store address for the page identified by the buffer pointer is equal to null. If the page backing store address is equal to null, control is passed to FIG. 13C. If the page backing store address is not equal to null, the page already has a backing store address and control is passed to step 1236.

Step 1236 sets the seek address equal to the page backing store address of the page identified by the buffer pointer. Control is then passed to step 1238. Step 1238 positions the backing store to the seek address. Control is then passed to step 1240. Step 1240 determines if the seek address returned by the position backing store function 1238 is equal to the seek address of step 1236. If the seek address returned by the position in backing store function 1238 is not equal to the seek address of step 1236, control is passed to FIG. 13G for error processing. If, however, the seek address returned by the position in backing store function 1238 equals the seek address of step 1236, control is passed to step 1242.

Step 1242 sets an I/O buffer pointer equal to the address of the beginning of the page.

Control is then passed to step 1244. Step 1244 writes the page to the backing store. Control is then passed to step 1246. Step 1246 determines if the write data count returned by the write data to storage page function 1244 is equal to the size of a storage page. If the write data count is not equal to the size of a storage page, control is passed to FIG. 13G for error processing. If, however, the write data count is equal to the size of the storage page, control is passed to step 1248. Step 1248 sets the header of the page identified by the buffer pointer to indicate that it is a storage page. Control is then passed to step 1250. Step 1250 sets the flags of the page identified by the buffer pointer equal to zero. Control is then passed to step 1252. Step 1252 sets the lock word of the page identified by the buffer pointer equal to zero. Control is then passed to step 1254. Step 1254 returns the address of the page just acquired to the calling function.

Figure 13C:
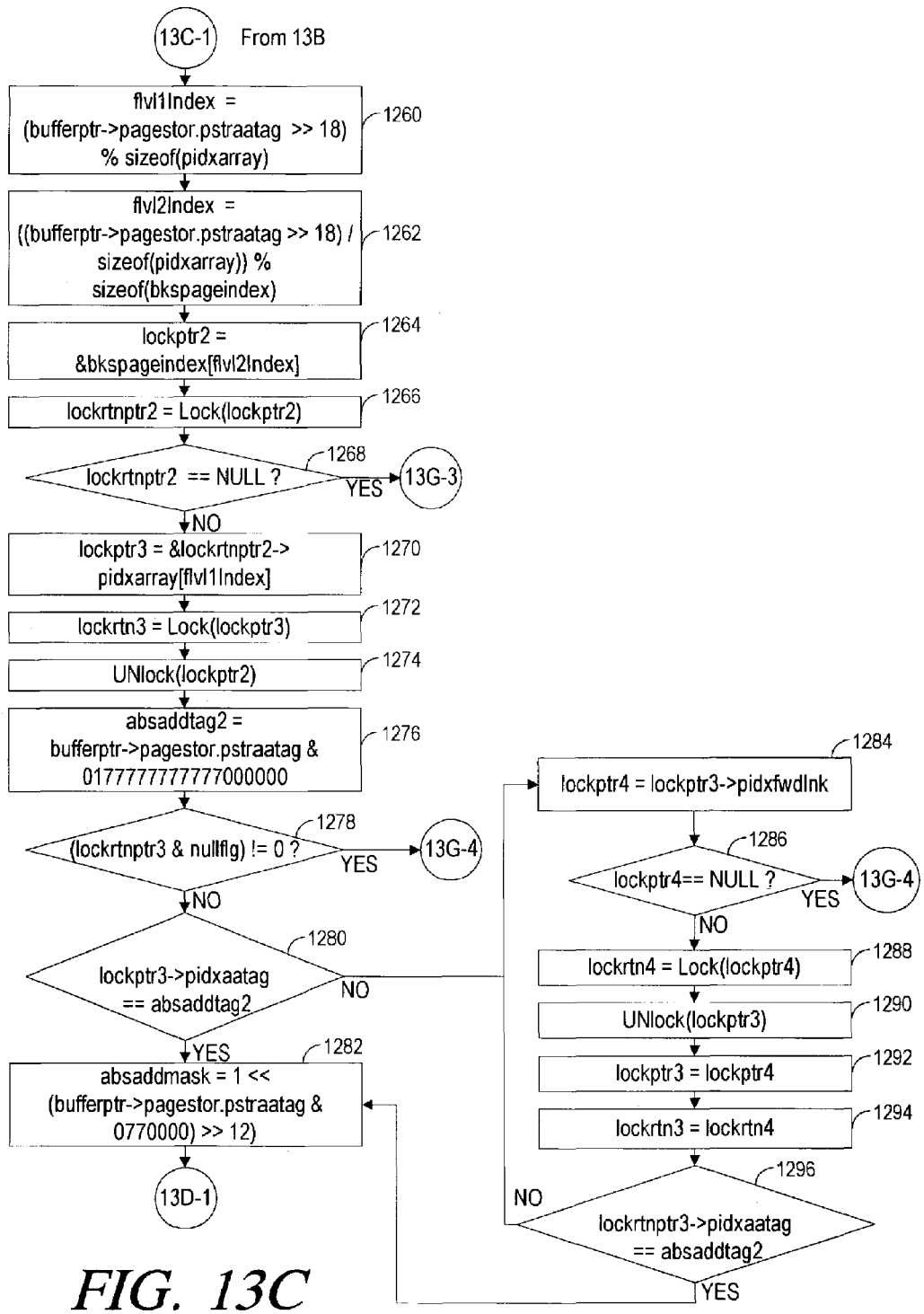

Referring back to step 1234, if the page backing store address is equal to null, control is passed to FIG. 13C. Referring to FIG. 13C, step 1260 calculates a first level index (flvl1Index), which equals the remainder of bits 53–18 of the absolute address divided by the size of a PIDX array, which in this case, is 1039. When calculating the first level index, the quotient of bits 53–18 of the absolute address and the size of the PIDX array is also stored. Control is then passed to step 1262. Step 1262 calculates a level 2 index (flvl2index), which equals the remainder of the quotient calculated in step 1260 divided by the size of a backing store page index. The size of the backing store page index in this illustrative embodiment is 61. Control is then passed to step 1264.

Step 1264 calculates a lock pointer 2 (lockptr2), which is a pointer into the back storage page index. Control is then passed to step 1266. In step 1266, the "Lock" function locks the page identified by lock pointer 2 (lockptr2), and passes the data contents to lock return pointer 2 (locktrnptr2), which is a pointer to an array of PIDXT entries. Each PIDXT entry represents 64 consecutive pages in the address range. Control is then passed to step 1268.

Step 1268 determines if the lock return pointer 2 is equal to null. If the lock return pointer is equal to null, control is passed to FIG. 13G for error processing. If, however, lock return pointer 2 is not equal to null, control is passed to step 1270. Step 1270 calculates a lock pointer 3 (lockptr3). The lock pointer 3 is a pointer into the page identified by the first level index (flvl1Index). Control is then passed to step 1272. In step 1272, the lock function locks the lock pointer 3 and passes its contents into lock return pointer 3 (lockrtnptr3). Control is then passed to step 1274. Step 1274 unlocks lock pointer 2. Control is then passed to step 1276. Step 1276 calculates an absolute tag 2 (absaddtag2) using a mask field, which in this case, equals bits 53–18 of the absolute address. Control is then passed to step 1278.

Step 1278 determines whether the PIDX entry identified by lock return pointer 3 is empty or blank. If the PIDX entry is empty or blank, the block of pages identified by the lock return pointer 3 has not yet been created. That is, they don't exist in the PIDX table. However, because the nonzero flag is set (see Step 1222 above), we know the page exists. Therefore, if they don't exist, control is passed to FIG. 13G for error processing. If they do exist, control is passed to step 1280.

Step 1280 determines if a PIDXAA tag in the page identified by the lock return pointer 3 is equal to the absolute address tag 2 calculated in step 1276. If they are equal, control is passed to step 1282. Step 1282 calculates an absolute address mask which has 64 bits, with all bits zero except one. Bits 17–12 of the absolute address determine which of the 64 bits of the absolute address mask is a one. Control is then passed to step 1300 of FIG. 13D.

Referring back to step 1280, if the PIDXAATAG field of the PIDX entry is not equal to the absolute address tag 2 calculated in step 1276, control is passed to step 1284. Step 1284 sets a lock pointer 4 equal to the PIDX forward link (PIDXFWDLNK) of the PIDX entry identified by lock pointer 3. Control is then passed to step 1286. Step 1286 determines whether the lock pointer 4 is null. If the lock pointer 4 is null, control is passed to FIG. 13G for error processing. If the lock pointer 4 is not null, control is passed to step 1288. Step 1288 locks the lock pointer 4, returns the data pointed to by lock pointer 4, and assigns the data to lock return pointer 4. Control is then passed to step 1290. Step 1290 unlocks the lock pointer 3. Control is then passed to block 1292. Block 1292 sets the lock pointer 3 equal to the lock pointer 4. Control is then passed to 1294. Step 1294 sets lock return pointer 3 equal to the lock return pointer 4. Control is then passed to 1296. Step 1296 determines if the PIDXAA tag of the PIDX entry identified by lock return pointer 3 is equal to the absolute address tag 2 calculated in step 1276. If it is not, control is passed back to step 1284, wherein the next PIDXFWDLNK in the PIDX entry chain is followed. If the PIDXAA tag of the PIDX entry identified by lock return pointer 3 is equal to the absolute address tag 2 calculated in step 1276, control is passed to step 1282. This indicates that the PIDX entry was found for the requested page.

Figure 13D:
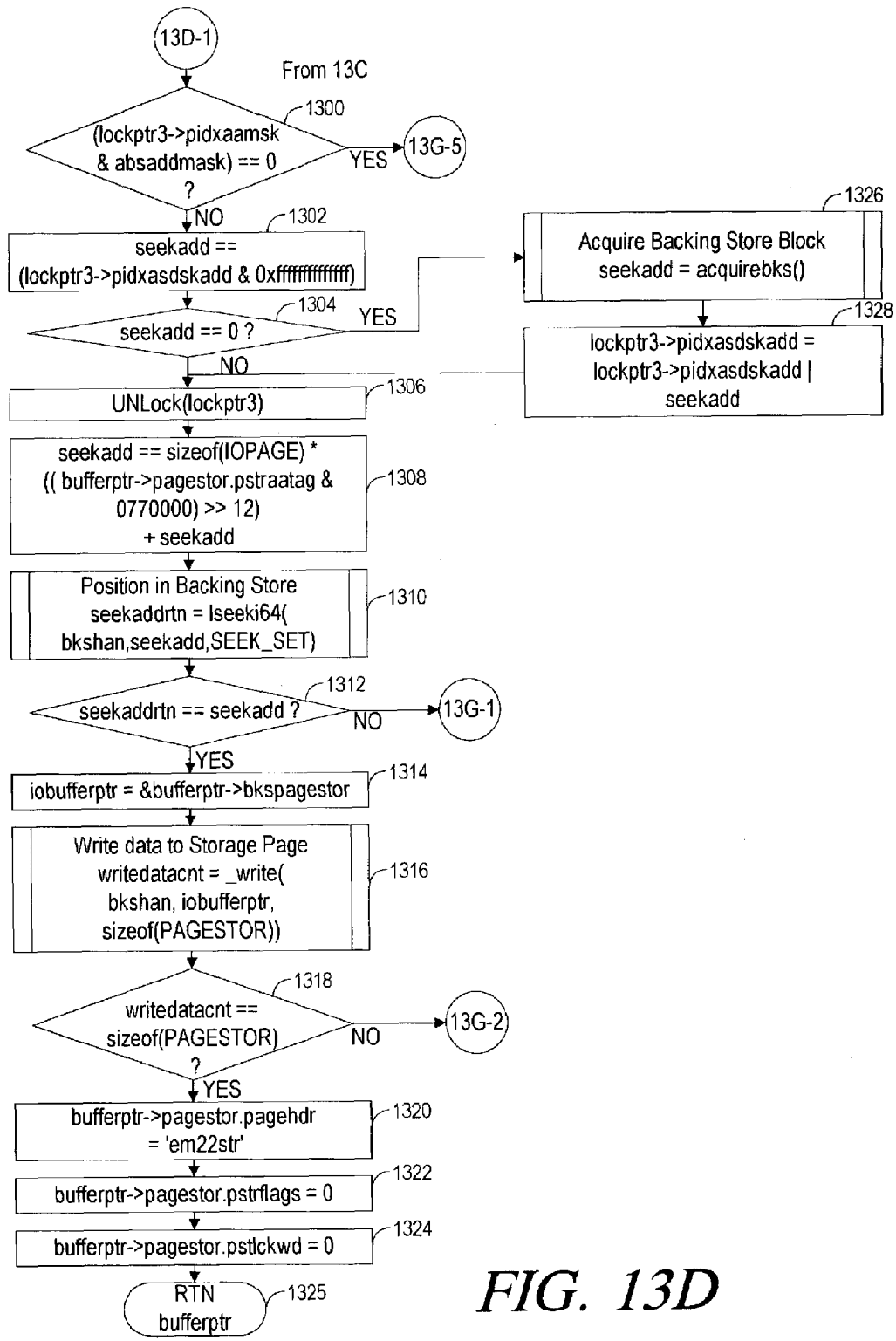

Referring now to FIG. 13D, step 1300 logically ANDS the PIDXAAMSK and the absolute address mask of the PIDXT entry. If the result of the logical AND is equal to zero, the page is not valid in the PIDX entry, and control is passed to FIG. 11G for error processing. If, however, the result of the logical AND is not equal to zero, control is passed to step 1302.

Step 1302 sets the seek address equal to the bottom 56 bits of the PIDXASDSKADD of the PIDXT entry. The upper 8 bits are flags in the illustrative embodiment. Control is then passed to step 1304. Step 1304 determines if the seek address equals zero. If the seek address does equal zero, this indicates that there is no space assigned to this PIDX entry, and control is passed to step 1326. Step 1326 acquires a backing store block, which is 64 pages in the illustrative embodiment. The method for acquiring a backing store block is further described below with respect to FIGS. 14A–14D. Control is then passed to step 1328. Step 1328 sets the PIDXASDSKADD equal to the PIDXASDSKADD ORed with the seek address. Essentially the bottom 56 bits of the seek address are entered into the PIDXASDSKADD field of the PIDXT entry, leaving the flags alone. The seek address was passed to step 1328 from the acquire backing store block function in step 1326. Control is then passed to step 1306.

Referring back to step 1304, if the seek address is not equal to zero, the space was previously acquired, and control is passed to step 1306. Step 1306 unlocks the PIDXT entry. Control is then passed to step 1308. Step 1308 sets the seek address equal to the address in the backing store of the desired location to store the page. The size of the I/O page times bit 17–12 of the absolute address tag shifted by 12 bits produces an offset into a 64 page block which identifies 1 of the 64 pages within the block. This offset is then added to the seek address to arrive at the actual address of the specified page. Control is then passed to step 1310.

Step 1310 positions the backing store at the seek address. Control is then passed to step 1312. Step 1312 determines if the seek address return provided by the position in backing store function 1310 is equal to the seek address. If the seek address return is not equal to the seek address, control is passed to FIG. 13G for error processing. If, however, the seek address return is equal to the seek address, control is passed to step 1314.

Step 1314 sets an 10 buffer pointer equal to equal to the address of the beginning of the page identified by the buffer pointer. Control is then passed to step 1316. Step 1316 writes the page to the backing store. Control is then passed to step 1318. Step 1318 determines if the write data count returned by the write data to storage page function 1316 is equal to the size of a storage page. If the write data count is not equal to the size of a storage page, control is passed to FIG. 13G for error processing. If, however, the write data count is equal to the size of the storage page, control is passed to step 1320. Step 1320 sets the header of the page identified by the buffer pointer to indicate that it is a storage page. Control is then passed to step 1322. Step 1322 sets the flags of the page identified by the buffer pointer equal to zero. Control is then passed to step 1324. Step 1324 sets the lock word of the page identified by the buffer pointer equal to zero. Control is then passed to step 1325. Step 1325 returns the address of the page just acquired to the calling function.

Figure 13E:
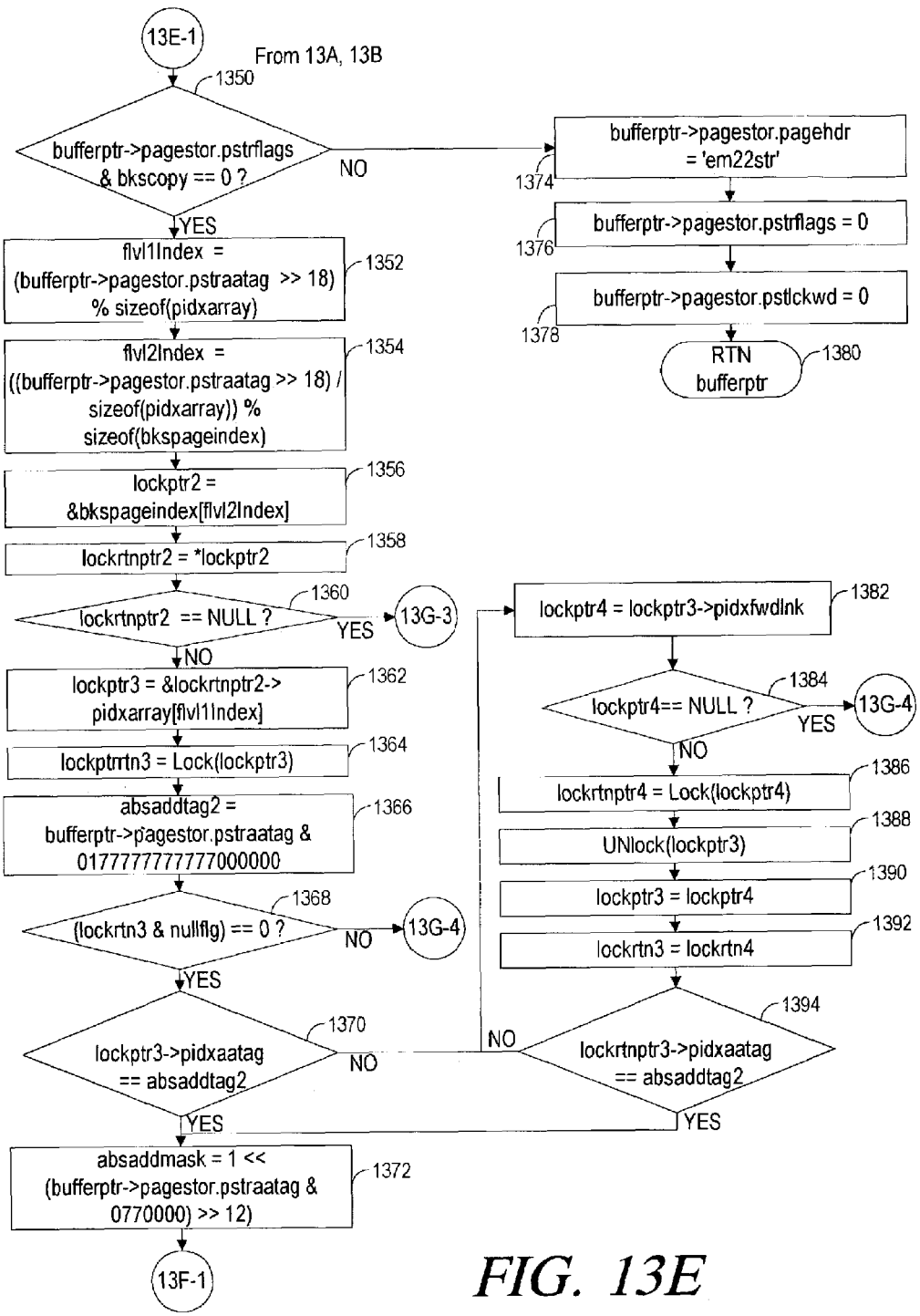

FIG. 13E deals with squashing pages. Step 1350 of FIG. 13E determines if the backing store copy flag of the page identified by the buffer pointer is equal to zero. If the backing store copy flag is set to 1, a copy of the page is already stored on backing store and cannot be immediately squashed, and control is passed to step 1374. If the backing store copy flag is equal to zero, a copy of the page is not already stored on backing store and can be squashed, and control is passed to step 1352.

Step 1352 calculates a first level index (flvl1Index), which equals the remainder of bits 53–18 of the absolute address divided by the size of a PIDX array, which in this case, is 1039. When calculating the first level index, the quotient of bits 53–18 of the absolute address and the size of the PIDX array is also stored. Control is then passed to step 1354. Step 1354 calculates a level 2 index (flvl2index) which equals the remainder of the quotient calculated in step 1352 divided by the size of a backing store page index. The size of the backing store page index in this illustrative embodiment is 61. Control is then passed to step 1356. Step 1356 calculates a lock pointer 2 (lockptr2), which is a pointer into the back storage page index. Control is then passed to step 1358.

Step 1358 passes the data contents identified by lock pointer 2 to lock return pointer 2 (locktrnptr2), which is a pointer to an array of PIDXT entries. Each PIDXT entry represents 64 consecutive pages in the address range. Control is then passed to step 1360. Step 1360 determines if the lock return pointer 2 (locktrnptr2) is equal to null. If the lock return pointer 2 equals null, then the page identified by the lock return pointer 2 is indicated as not yet been created, and control is passed to FIG. 13G for error processing. If the lock return pointer 2 is not null, control is passed to step 1362.

Step 1362 calculates a lock pointer 3 (lockptr3). The lock pointer 3 is a pointer into the page identified by the first level index (flvl1Index) calculated in step 1352. Control is then passed to step 1364. In step 1364, the lock function locks the lock pointer 3 and passes its contents into lock return pointer 3 (lockrtnptr3). Control is then passed to step 1366. Step 1366 calculates an absolute tag 2 (absaddtag2) using a mask field, which in this case, equals bits 53–18 of the absolute address. Control is then passed to step 1368.

Step 1368 determines whether the PIDX entry identified by lock return pointer 3 is empty or blank. If the PIDX entry is empty or blank, the block of pages identified by the lock return pointer 3 are indicated as having never yet been created, and control is passed to FIG. 13G for error processing. If they do exist, control is passed to step 1370.

Step 1370 determines if a PIDXAA tag in the page identified by the lock return pointer 3 is equal to the absolute address tag 2 calculated in step 1366. If they are equal, control is passed to step 1372. Step 1372 calculates an absolute address mask which has 64 bits, with all bits zero except one. Bits 17–12 of the absolute address determine which of the 64 bits of the absolute address mask is a one. Control is then passed to step 1400 of FIG. 13F.

Referring back to step 1370, if the PIDXAATAG field of the PIDX entry is not equal to the absolute address tag 2 calculated in step 1366, control is passed to step 1382. Step 1382 sets a lock pointer 4 equal to the PIDX forward link (PIDXFWDLNK) of the PIDX entry identified by lock pointer 3. Control is then passed to step 1384. Step 1384 determines whether the lock pointer 4 is null. If the lock pointer 4 is null, control is passed to FIG. 13G for error processing. If the lock pointer 4 is not null, control is passed to step 1386. Step 1386 locks the lock pointer 4, returns the data pointed to by lock pointer 4, and assigns the data to lock return pointer 4. Control is then passed to step 1388. Step 1388 unlocks the lock pointer 3. Control is then passed to block 1390. Step 1390 sets the lock pointer 3 equal to the lock pointer 4. Control is then passed to step 1392. Step 1392 sets lock return pointer 3 equal to the lock return pointer 4. Control is then passed to step 1394. Step 1394 determines if the PIDXAA tag of the PIDX entry identified by lock return pointer 3 is equal to the absolute address tag 2 calculated in step 1366. If it is not, control is passed back to step 1382, wherein the next PIDXFWDLNK in the PIDX entry chain is followed. If the PIDXAA tag of the PIDX entry identified by lock return pointer 3 is equal to the absolute address tag 2 calculated in step 1366, control is passed to step 1372. This indicates that the PIDX entry was found for the requested page.

Referring back to step 1350, if the backing store copy flag is not equal to zero, control is passed to step 1374. Step 1374 sets the header of the page identified by the buffer pointer to indicate that it is a storage page. Control is then passed to step 1376. Step 1376 sets the flags of the page identified by the buffer pointer equal to zero. Control is then passed to step 1378. Step 1378 sets the lock word of the page identified by the buffer pointer equal to zero. Control is then passed to step 1380. Step 1380 returns the address of the page just acquired to the calling function.

Figure 13F:
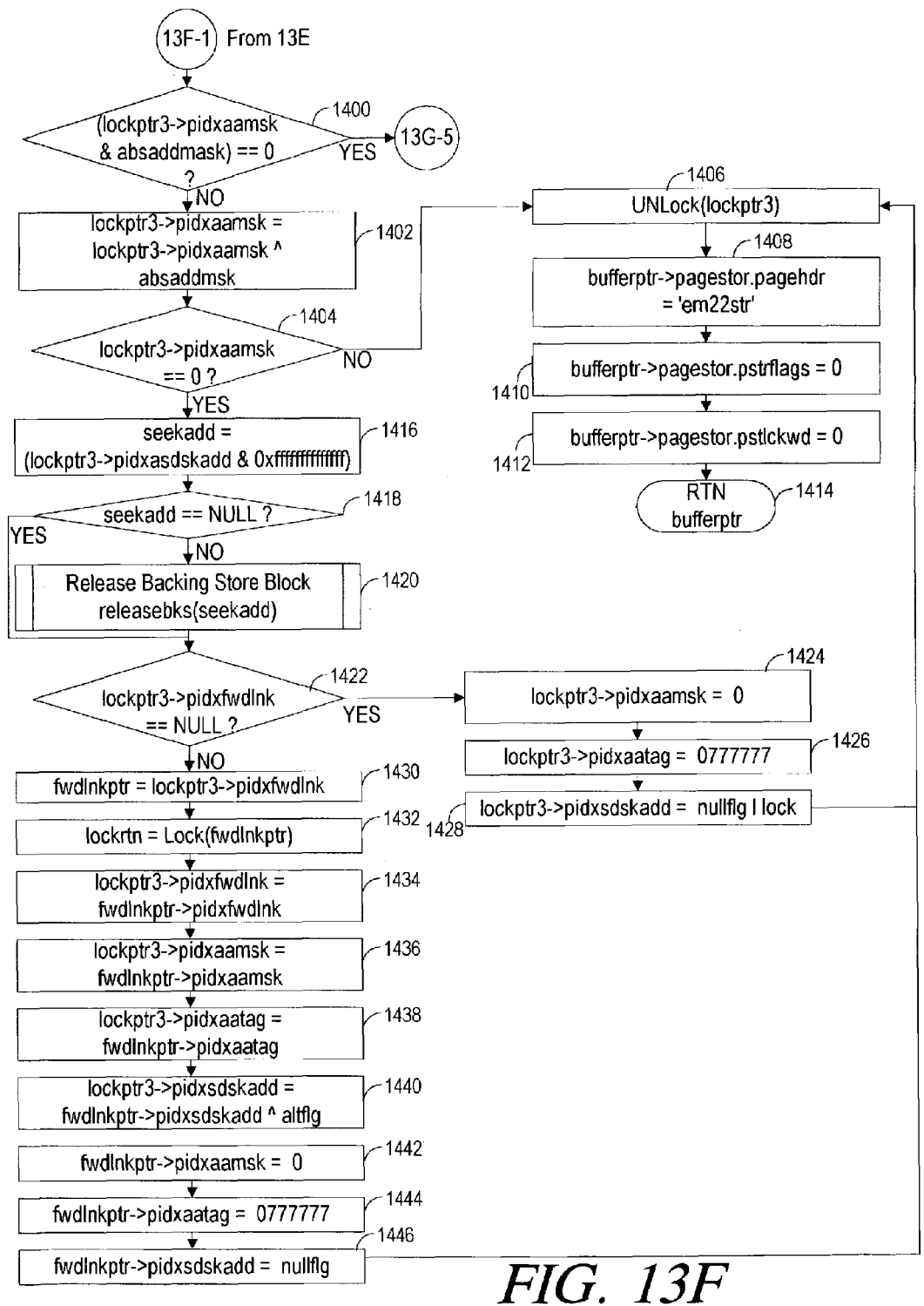
Figure 13G:
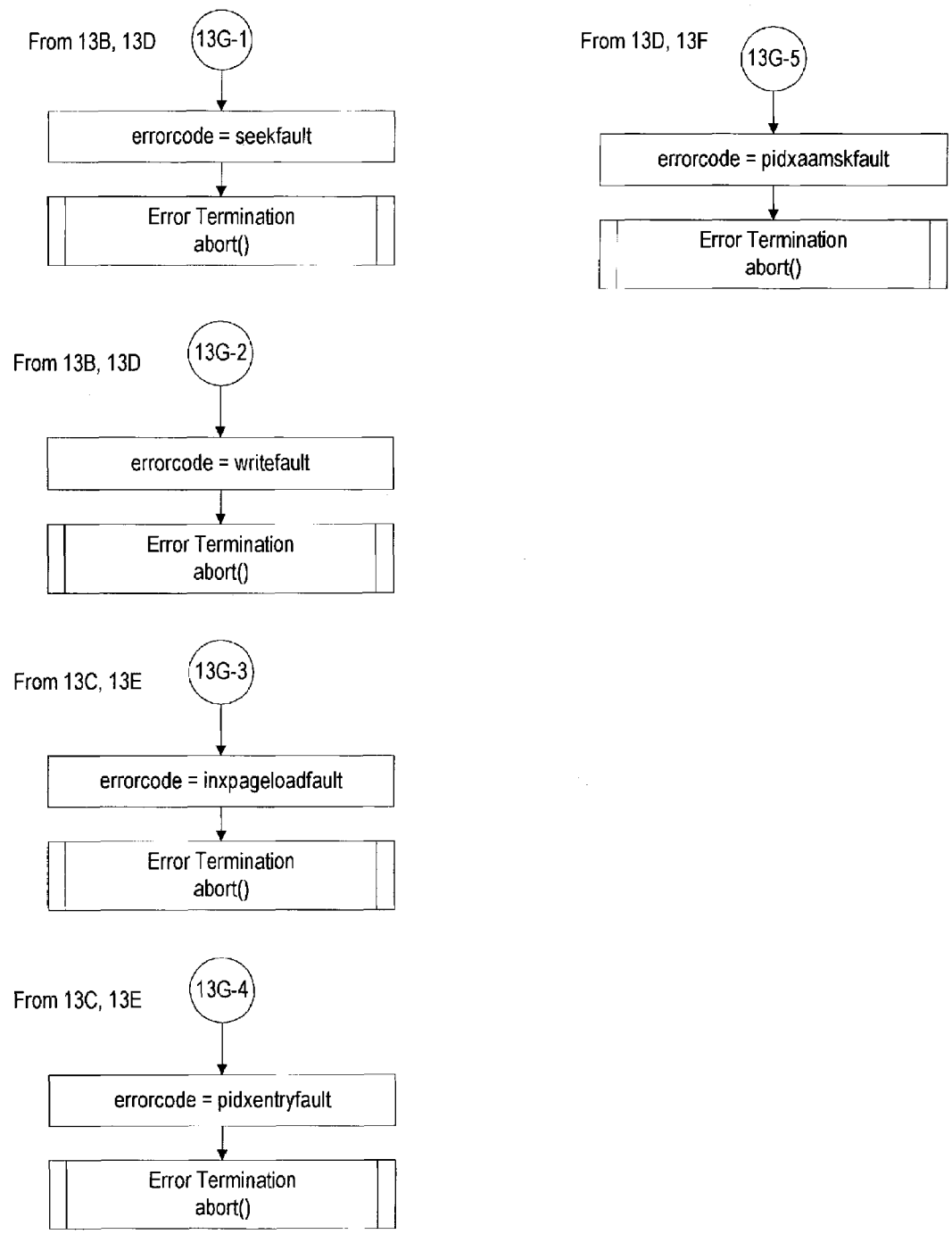

Referring now to FIG. 13F. Step 1400 of FIG. 13F determines if the PIDXAMSK logically ANDed with the absolute address mask is equal to zero. If the result of the logical AND is equal to zero, the page is not in the PIDXT entry and control is passed to FIG. 13G for error processing. If the page is in the PIDX entry, control is passed to step 1402. Step 1402 removes the page from the PIDXT entry by exclusive ORing the PIDXAAMSK with the absolute address mask. Control is then passed to step 1404. Step 1404 determines if the PIDXAAMSK is equal to zero. If the PIDXAAMSK is equal to zero, control is passed to step 1416. If the PIDXAAMSK of the PIDXT entry identified by lock pointer 3 is not equal to zero, this indicates that the PIDXT entry still has pages, and control is passed to step 1406.

Step 1416 sets the seek address equal to the lower 56 bits of the PIDXASDSKADD. Control is then passed to step 1418. Step 1418 determines if the seek address provided in step 1416 is equal to null. If it is, control is passed to step 1422. If the seek address is not equal to null, however, control is passed to step 1420. Step 1420 releases the backing store block and control is passed to step 1422.

Step 1422 determines if the PIDX forward link of the PIDX entry is equal to null. If the PIDX forward link is not equal to null, control is passed to step 1430. Step 1430 sets a forward link pointer equal to the PIDX forward link. Control is then passed to step 1432. Step 1432 locks the forward link pointer. Control is then passed to step 1434. Step 1434 sets the PIDX forward link of the PIDX entry identified by lock pointer 3 equal to the PIDX forward link of the PIDX entry identified by FWDLNKPTR of step 1430. These steps are removing the PIDX entry from a chain of PIDX entries. Control is then passed to step 1436. Step 1436 sets the PIDXAAMSK equal to the PIDXAAMSK of the PIDX entry identified by forward link pointer. Control is then passed to step 1438. Step 1438 sets the PIDXAA tag equal to the PIDXAA tag of the PIDX entry identified by the forward link pointer. Control is then passed to step 1440.

Step 1440 sets the PIDXSDSKADD equal to the PIDX-SDSKADD exclusive ORed with the alt flag of the PIDX entry identified by forward link pointer. Control is then passed to step 1442. Step 1442 sets the PIDXAAMSK of the PIDX entry identified by the forward link pointer equal to zero. Control is then passed to step 1444. Step 1444 sets the bottom 18 bits of PIDXAA tag of the PIDX entry identified by the forward link pointer equal to 1. Control is then passed to step 1446. Step 1446 sets the null flag of the PIDX entry identified by forward link pointer. Control is then passed to step 1406.

Step 1406 unlocks the PIDXT entry. Control is then passed to step 1408. Step 1408 sets the header of the page identified by the buffer pointer to indicate that it is a storage page. Control is then passed to step 1410. Step 1410 sets the flags of the page identified by the buffer pointer equal to zero. Control is then passed to step 1412. Step 1412 sets the lock word of the page identified by the buffer pointer equal to zero. Control is then passed to step 1414. Step 1414 returns the address of the page just acquired to the calling function.

Referring back to step 1422, if the PIDX forward link of the PIDXT entry identified by lock pointer 3 is equal to null, the PIDXT entry is either the only link in a chain or the last link in the chain, and control is passed to step 1424. Step 1424 sets the PIDXAAMSK of the PIDXT entry equal to zero. Control is then passed to step 1426. Step 1426 sets the lower 18 bits of the PIDXAA tag equal to all ones. Control is then passed to step 1428. Step 1428 sets the null end lock flag of the PIDXSDSKADD. Control is then passed to step 1406.

Hash Table Entry Removal

Figure 14A:
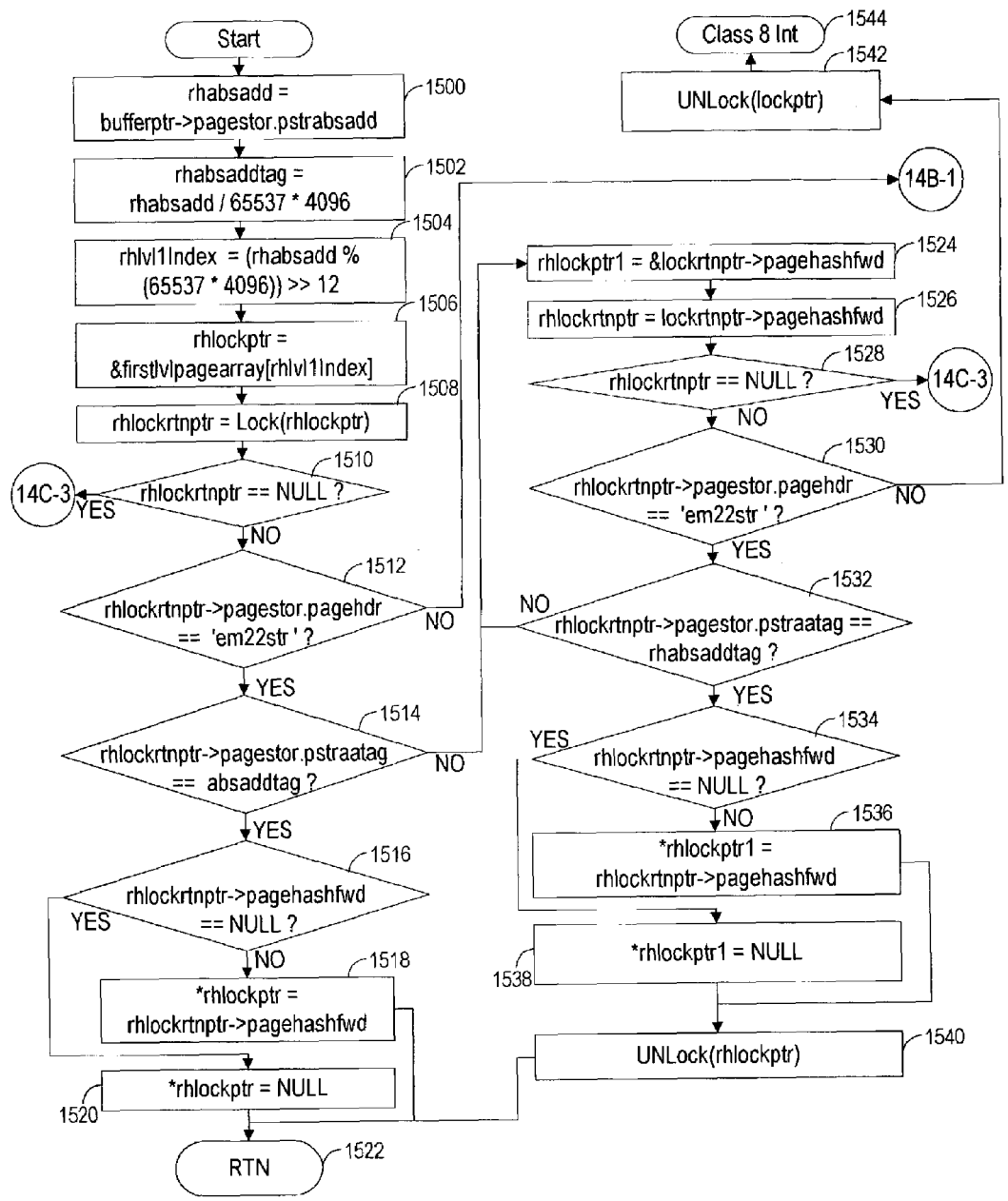
FIGS. 14A–14D are flow diagrams showing the removal of a hash table entry in accordance with an illustrative embodiment of the present invention.

FIGS. 14A–14D are flow diagrams showing the removal of a hash table entry in accordance with an illustrative embodiment of the present invention. Step 1220 in FIG. 13A, for example, may use the method shown in FIGS. 14A–14D. Referring first to FIG. 14A, step 1500 sets the remove hash absolute address equal to the absolute address from the page store header. Control is then passed to step

1502. Step 1502 calculates an remove hash absolute address tag (rhabsaddtag), which in the case, equals the remove hash absolute address bits 53–12 divided by the size of a first level page array. The 4096 in the denominator is used to shift the absolute address 12 bits, thereby shifting bits 11–0 (i.e. the page offset) from the absolute address leaving bits 53–12 as bits 41–0. Step 1504 calculates a remove hash level 1 index (rhlvl1Index) into the first level page array by performing a similar operation as in step 1502, but only provides the remainder. The remainder is used as the remove hash level 1 index into the first level page array.

Step 1506 calculates a remove hash lock pointer (rhlockptr) by indexing the remove hash level 1 index calculated in step 1504 into the first level page array (firstlvlpagearray), which returns a NT pointer to the memory location that points to the specific page within the first level page array. Step 1506 multiplies the remove hash level 1 index by the size of the pointer and adds the result to the beginning address of the first level page array and stores the result as the remove hash lock pointer.

In step 1508, the "Lock" function returns the data content identified by the remove hash lock pointer. The "Lock" function also locks the location identified by the remove hash lock pointer, or waits until the location is unlocked and then locks it. The remove hash lock return pointer (rhlockrtnptr) represents a pointer to the desired page, a pointer to a second level page array, or is null if no page exists. Step 1510 determines if the remove hash lock return pointer is null, which as noted above, indicates that the page currently does not exist. If the page does exist, control is passed to FIG. 14C for error processing. Step 1512 determines if the header of the identified page is a storage page, where the reference em22str is included in the header of all storage pages. If the header of the page identified by the remove hash lock return pointer is a storage page, control is passed to step 1514.

Step 1514 determines if the remove hash absolute address tag in the identified storage page is equal to the absolute address tag of the page identified by the remove hash lock return pointer. If it is, control is passed to step 1516. Step 1516 determines if the page hash forward link of the page identified by the remove hash lock return pointer is equal to null. If the page hash forward link is equal to null, this means that the current page is the only page in the hash table entry and control is passed to step 1520. Step 1520 sets the hash entry equal to null, which frees the hash entry. Control is then passed to step 1522, which returns control to, for example, step 1220 FIG. 13A.

Referring back to step 1514, if the remove hash absolute address tag does not equal the absolute address tag of the page identified by remove hash lock return pointer, control is passed to step 1524. Step 1524 sets a remove hash lock pointer 1 equal to the address of the page hash forward link of the current page. Control is then passed to step 1526. Step 1526 sets the remove hash lock return pointer equal to the page hash forward link of the current page. Control is then passed to step 1528. Step 1528 determines if the remove hash lock return pointer equals null. If the remove hash lock return pointer does equal null, the end of the chain was reached but the page was not found, and control is passed to FIG. 14C for error processing. If, however, the remove hash lock pointer is not equal to null, control is passed to step 1530. Step 1530 determines if the page identified by the remove hash lock return pointer is a storage page. If the page identified by the remove hash lock return pointer is not a storage page, control is passed to step 1542. Step 1542 unlocks the lock pointer and passes control to step 1544. Step 1544 issues an interrupt.

Referring back to step 1530, if the page identified by remove hash lock return pointer is a storage page, control is passed to step 1532. Step 1532 determines if the remove hash absolute address tag calculated in step 1502 equals the absolute address tag of the page identified by remove hash lock return pointer. If the remove hash absolute address tag does not equal the absolute address tag of the page identified by remove hash lock return pointer, control is passed back to step 1524, and relinked to the next entry. If, however, the remove hash absolute address tag equals the absolute address tag at the page identified by the remove hash lock return pointer, control is passed to step 1534.

Step 1534 determines if the page hash forward link of the page identified by the remove hash lock return pointer is equal to null. If the page hash forward link is equal to null, the end of the chain has been reached, and control is passed to step 1538. Step 1538 sets the forward link of the previous hash entry to null. Control is then passed to step 1540, which unlocks the remove hash lock pointer.

Referring back to step 1534, if the page hash forward link of the page identified by remove hash lock return pointer is not equal to null, the end of the chain has not been reached, and control is passed to step 1536. Step 1536 sets the page hash forward of the previous hash entry equal to the page hash forward link of the current page identified by the remove hash lock return pointer. Control is then passed to step 1540.

Figure 14B:
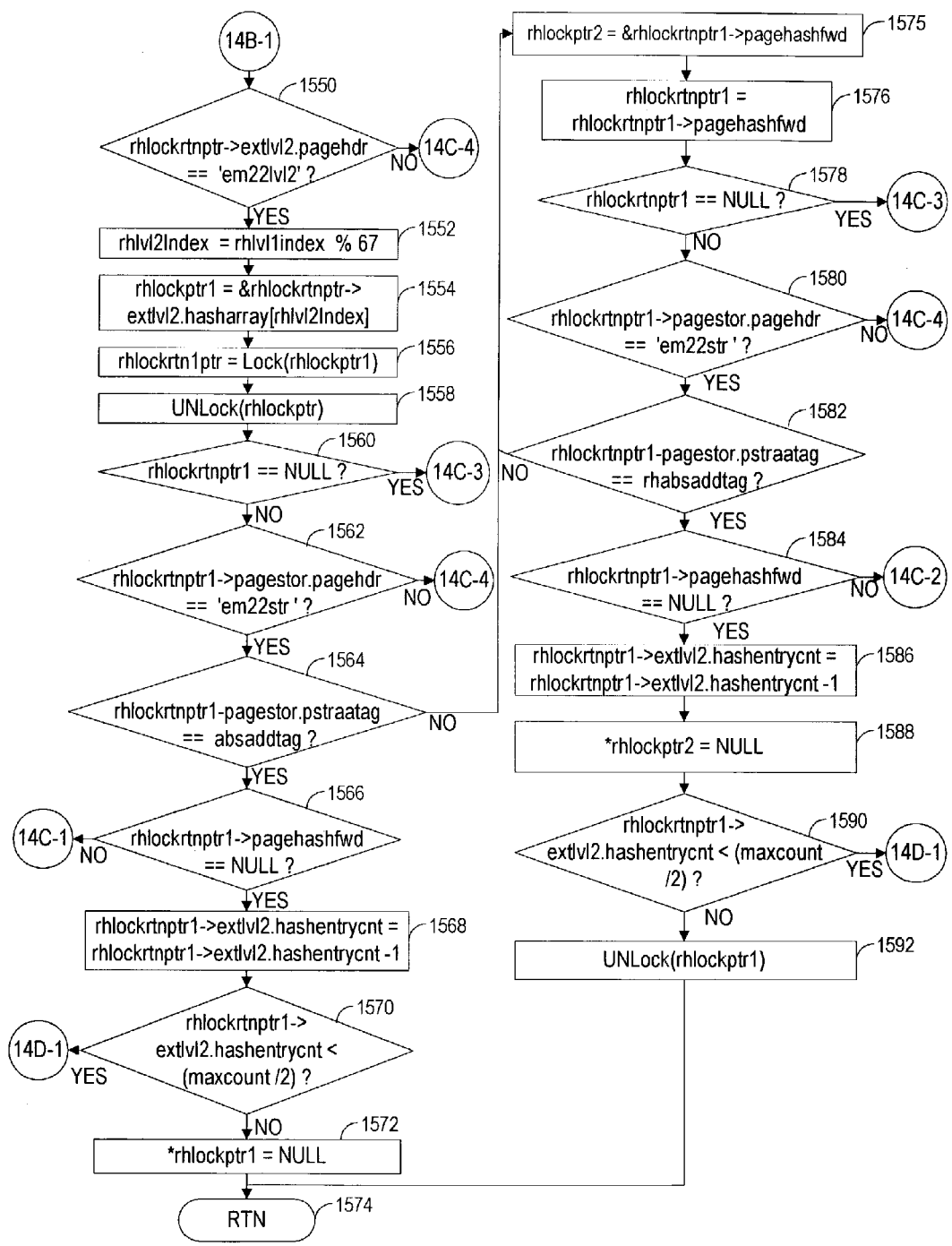

Referring now to FIG. 14B, step 1550 determines if the page identified by the remove hash lock return pointer is a level 2 extension page. If it is not a level 2 extension page, control is passed to page 3 for error processing. If the page is a level 2 extension page, control is passed to step 1552. Step 1552 calculates a remove hash level 2 index which, in this case, equals the remainder of the remove hash level 1 index divided by the size of the second level page array (e.g. 67). Control is then passed to step 1554. Step 1554 calculates a new remove hash lock pointer (rhlockptr1) into the level 2 page array. The remove hash lock pointer 1 (rhlockptr1) calculated in step 1554 is an NT pointer that points to the memory location that points to the specific page within the second level page array. Control is then passed to step 1556. Step 1556 locks the cell on the second level page array identified by the remove hash lock pointer 1, and returns the data contents of that location and assigns it to remove hash lock return pointer 1 (rhlockrtnptr1). Control is then passed to step 1558. Step 1558 unlocks the first level remove hash lock pointer (rhlockptr1), which frees the first level page array for access by other threads.

Step 1560 determines if the remove hash lock return pointer 1 is equal to null. If the remove hash lock return pointer 1 is equal to null, the entry does not exist for the page that was just removed from the MRULRU, and control is passed to FIG. 14C for error processing. If, however, the remove hash lock return pointer 1 is not equal to null, control is passed to step 1562.

Step 1562 determines if the page identified by remove hash lock return pointer 1 is a storage page. If the page is not a storage page, control is passed to FIG. 14C for error processing. If the page is a storage page, however, control is passed to step 1564. Step 1564 determines if the remove hash absolute address tag equals the absolute address tag of the page identified by the remove hash lock return pointer 1.

If the remove hash absolute address tag is equal to the absolute address tag of the page identified by remove hash lock return pointer 1, control is passed to step 1566.

Step 1566 determines if the page hash forward link of the page identified by the remove hash lock return pointer 1 is equal to null. If the page hash forward link is not equal to null, this indicates that there is more than one page chained at that index and control is passed to step 1600 of FIG. 14C. If, however, the page hash forward link of the page identified by remove hash lock return pointer 1 is equal to null, control is passed to step 1568.

Step 1568 decrements the hash entry count. Control is then passed to step 1570. Step 1570 determines if the hash entry count is less than half of the maximum hash entry count. If the hash entry count is less than half the maximum hash entry count, control is passed to FIG. 14D. If the hash entry count is not less than half of the max hash entry count, control is passed to step 1572. Step 1572 sets the hash entry to null. Control is then passed to step 1574. Step 1574 passes control back to a calling function, such as step 1220 of FIG. 13A.

Referring back to step 1564, if the remove hash absolute address tag was not equal to the absolute address tag of the page identified by remove hash lock return pointer 1, control is passed to step 1575. Step 1575 sets a remove hash lock pointer 2 equal to the address of the page hash forward link of the page identified by remove hash lock return pointer 1. Control is then passed to step 1576. Step 1576 sets the remove hash lock return pointer 1 equal to the page hash forward link of the page identified by remove hash lock return pointer 1. Control is then passed to step 1578. Step 1578 determines if the remove hash lock return pointer 1 is equal to null. If the remove hash lock return pointer 1 equals null, the end of the chain was reached but the desired page was not found, and control is passed to FIG. 14C for error processing. If the remove hash lock return pointer does not equal null, however. control is passed to step 1580.

Step 1580 determines if the page identified by remove hash lock return pointer 1 is a storage page. If the page is not a storage page, control is passed to FIG. 14C for error processing. If the page is a storage page, however, control is passed to step 1582. Step 1582 determines if the remove hash absolute address tag equals the absolute address tag of the page identified by the remove hash lock return pointer 1. If the remove hash absolute address tag does not equal the absolute address tag of the page identified by remove hash lock return pointer 1, control is passed back to step 1575. This is continued until the end of the chain is reached or until the page having a matching remove hash absolute address tag is found.

Referring back to step 1582, if the remove hash absolute address tag does equal the absolute address tag of the page identified by remove hash lock return pointer 1, control is passed to step 1584. Step 1584 determines if the page hash forward link of the page identified by the remove hash lock return pointer 1 is equal to null. If the page hash forward link is not equal to null, control is passed to step 1610 of FIG. 14C. If the page hash forward link of the page identified by the remove hash lock return pointer 1 does equal null, however, control is passed to step 1586.

Step 1586 decrements the hash entry count. Control is then passed to step 1588. Step 1588 sets the remove hash lock pointer 2, which is pointing to the page hash forward link of the previous entry, equal to null. Control is then passed to step 1590. Step 1590 determines if the hash entry count is less than half of the maximum hash entry count. If the hash entry count is less than half of the maximum hash entry count, control is passed to FIG. 14D. If the hash entry count is not less than half the maximum hash entry count, control is passed to step 1592. Step 1592 unlocks the remove hash lock pointer 1, which was locked in step 1556. Control is then passed to step 1574. Step 1574 passed control back to the calling function, such as step 1220 of FIG. 13A.

Figure 14C:
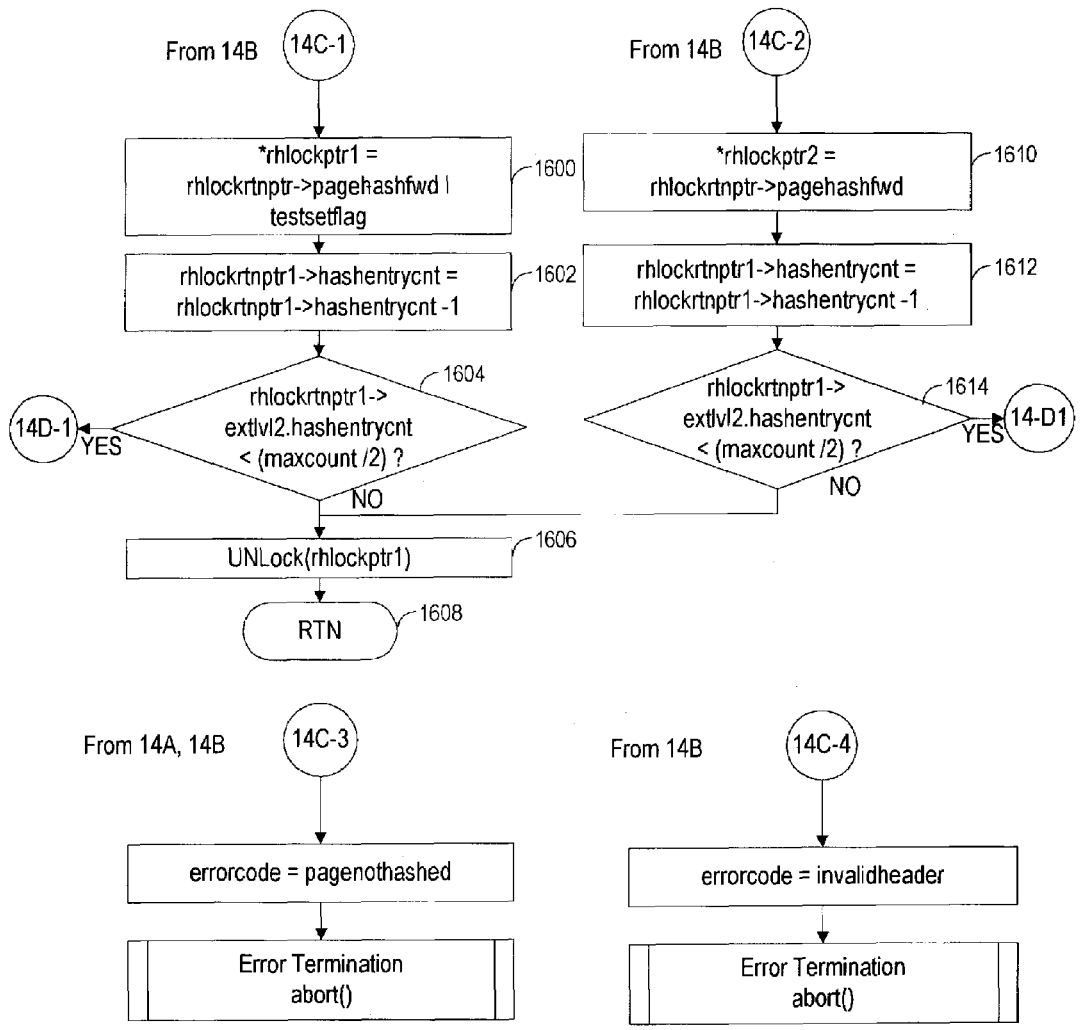

Referring now to FIG. 14C. Step 1600 of FIG. 14C writes the level 2 index identified by the remove hash lock pointer 1 with the page hash forward link or with the test set flag of the page identified by the remove hash lock return pointer. The test set flag is used to keep the level 2 index entry locked. Control is then passed to step 1602. Step 1602 decrements the hash entry count. Control is then passed to step 1604. Step 1604 determines if the hash entry count is less than one half the max hash entry count. If the hash entry count is less than half the max hash entry count, control is passed to FIG. 14D. If the hash entry count is not less than one half the max hash entry count, however, control is passed to step 1606. Step 1606 unlocks the remove hash lock pointer 1. Control is then passed to step 1608, which returns control to a calling function, such as step 1220 of FIG. 13A.

Step 1610 sets the page hash forward link of the page identified by the remove hash lock pointer 2 to the page hash forward link of the page identified by remove hash lock return pointer. Control is then passed to step 1612. Step 1612 decrements the hash entry count. Control is then passed to step 1614. Step 1614 determines if the hash entry count is less than one half of the maximum hash entry count. If the hash entry count is less than half the max hash entry count, control is passed to FIG. 14D. If the hash entry count is not less than one half the max hash entry count, however, control is passed to step 1606. Step 1606 unlocks the remove hash lock pointer 1. Control is then passed to step 1608, which passes control back to a calling function, such as step 1220 of FIG. 13A.

Figure 14D:
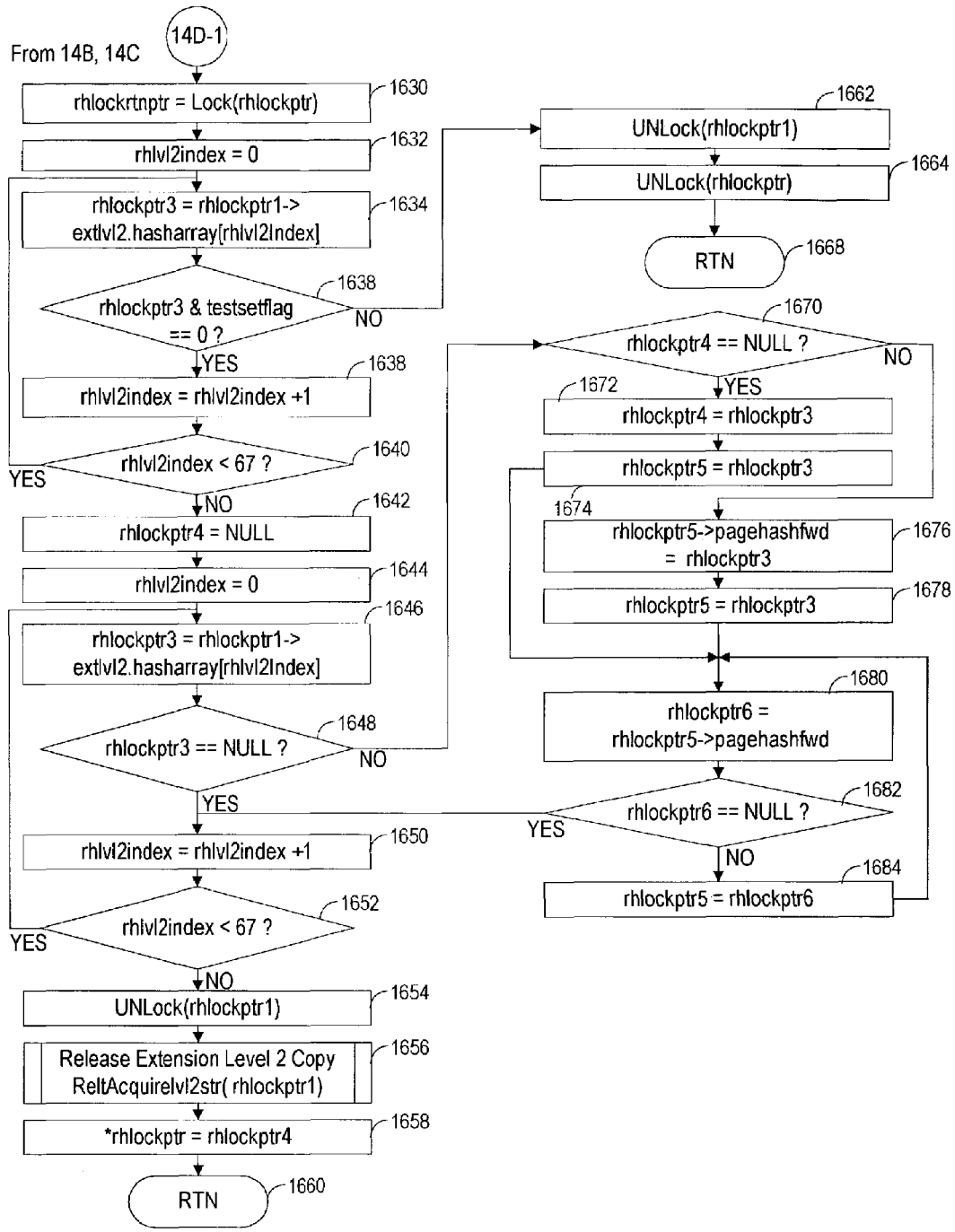

Referring now to FIG. 14D. Step 1630 of FIG. 14D locks the remove hash lock pointer. Control is then passed to step 1632. Step 1632 sets the remove hash level 2 index equal to zero. Control is then passed to step 1634. Step 1634 sets a remove hash lock pointer 3 equal to the entry in the level 2 index identified by remove hash level 2 index. Control is then passed to step 1636. Step 1636 determines if the test and set flag of the hash entry is equal to zero. If the test set flag is not equal to zero, some other processor has locked this entry, and control is passed to step 1662. Step 1662 unlocks the remove hash lock pointer 1, and passes control to step 1664. Step 1664 unlocks the remove hash lock pointer, and passes control to step 1668. Step 1668 returns control to a calling function, such as step 1220 of FIG. 13A.

Referring back to step 1636, if the test and set flag is equal to zero, control is passed to step 1638. Step 1638 increments the remove hash level 2 index. Control is then passed to step 1640. Step 1640 determines if the remove hash level 2 index is less than 67, which corresponds to the number of entries in the level 2 index. If the remove hash level 2 index is less than 67, control is passed back to step 1634. This loop is continued until all entries in the second level index have been scanned for a test and set flag equal to one. Once all of the entries have been scanned, control is passed to step 1642.

Step 1642 sets a remove hash lock pointer 4 equal to null. Control is then passed to step 1644. Step 1644 sets the remove hash level 2 index equal to zero. Control is then passed to step 1646. Step 1646 sets the remove hash lock pointer 3 equal to the pointer in the hash entry identified by the remove hash level 2 index. Control is then passed to step 1648. Step 1648 determines if the remove hash lock pointer is equal to null. If the remove hash lock pointer equals null, there is nothing at that index, and control is passed to step 1650. Step 1650 increments the remove hash level 2 index. Control is then passed to step 1652. Step 1652 determines if the remove hash level 2 index is less than 67. If the remove hash level 2 index is less than 67, control is passed back out to step 1646. This is continued until all 67 entries have been processed. If the remove hash level 2 index is not less than 67, control is passed to step 1654.

Step 1654 unlocks the remove hash lock pointer 1. Control is then passed to step 1656. Step 1656 releases the level 2 extension table. Control is then passed to step 1658. Step 1658 sets the level 1 remove hash lock pointer equal to the pointer to the first page of the chain of pages. Control is then passed to step 1660. Step 1660 returns control to a calling function, such as step 1220 of FIG. 13A.

Referring back to step 1648, if the remove hash lock pointer 3 does not equal null, the page or chain of pages exists at that level, and control is passed to step 1670. Step 1670 determines if the remove hash lock pointer 4 equals null. If the remove hash lock pointer 4 equals null, control is passed to step 1672. Step 1672 sets the remove hash lock pointer 4 equal to remove hash lock pointer 3. Control is then passed to step 1674. Step 1674 sets a remove hash lock pointer 5 equal to remove hash lock pointer 3. Control is then passed to step 1680. Step 1680 sets a remove hash lock pointer 6 equal to the page hash forward link of the page identified by remove hash lock pointer 5. Control is then passed to step 1682. Step 1682 determines if the remove hash lock pointer 6 is equal to null. If remove hash lock pointer 6 does not equal null, there is more entries in the chain, and control is passed to step 1684.

Step 1684 sets remove hash lock pointer 5 equal to remove hash lock pointer 6, and returns control to step 1680. Step 1680, 1682 and 1684 are repeated until the end of the chain is reached and remove hash lock pointer 5 points to the last entry in the chain. When this occurs, control is passed to step 1650. This loop continues then with step 1646, 1648, 1650 and 1652 until all entries have been processed, thereby disassembling the second level table. The entries that came from the second level table are chained together in one chain and identified by an entry in the first level hash table.

Referring back to step 1670, if the remove hash lock pointer 4 does equal null, control is passed to step 1676. Step 1676 sets the page hash forward link in the entry identified by remove hash lock pointer 5 to remove hash lock pointer 3. Control is then passed to step 1678. Step 1678 sets remove hash lock pointer 5 equal to remove hash lock pointer 3. Control is then passed to step 1680.

Acquisition of Backing Store Block

Figure 15:
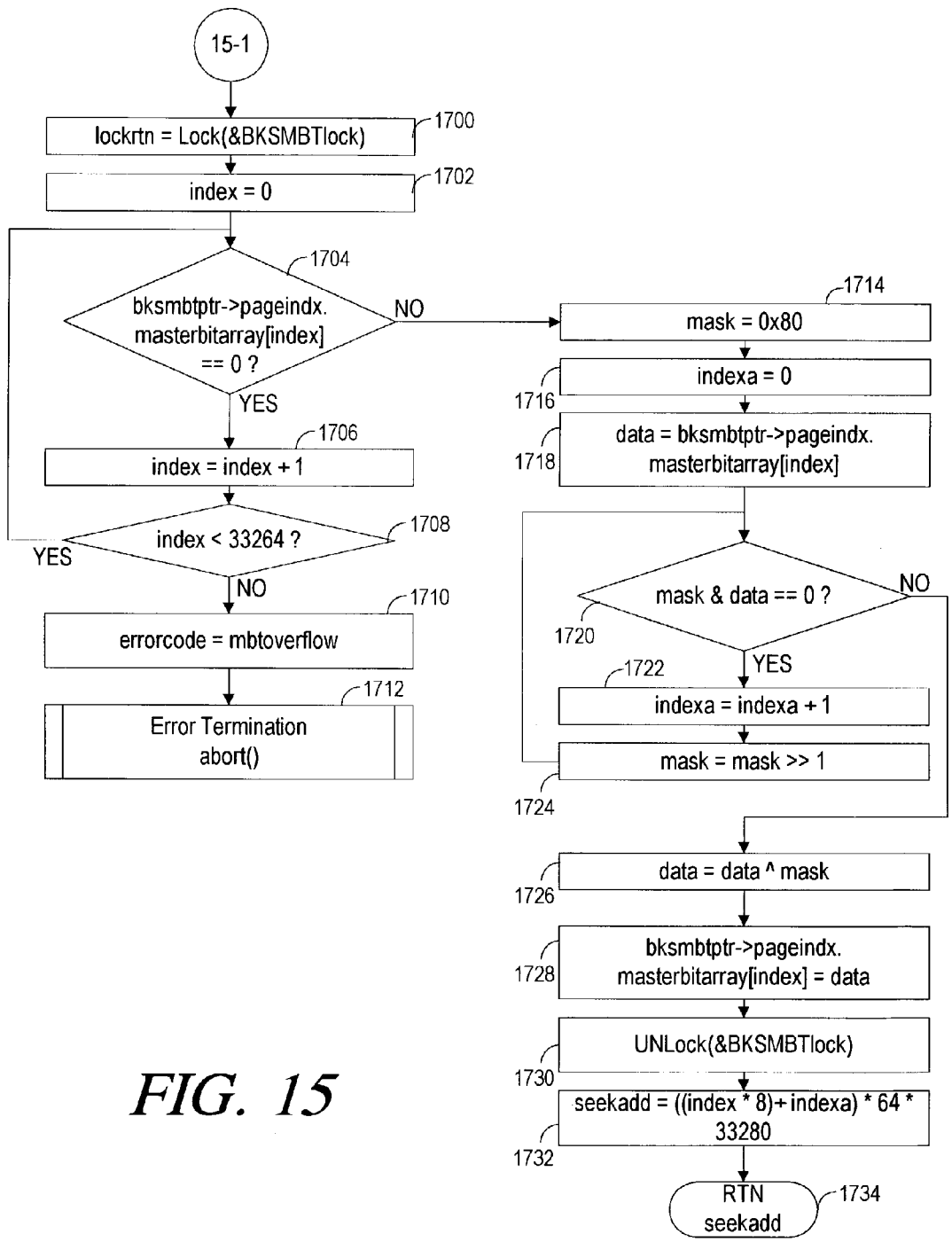
FIG. 15 is a flow diagram showing the acquisition of a backing store block in accordance with an illustrative embodiment of the present invention.

FIG. 15 is a flow diagram showing the acquisition of a backing store block in accordance with an illustrative embodiment of the present invention. The acquisition of a backing store block is carried out in, for example, step 1326 of FIG. 13D. Step 1700 locks the backing store master bit table facility. The backing store master bit table facility includes 33,264 bytes. Each bit of each byte represents 64 pages. Control is then passed to step 1702. Step 1702 sets an index equal to zero. Control is then passed to step 1704. Step 1704 determines if the byte in the backing store master bit table identified by the index is equal to zero. If it is equal to zero, control is passed to step 1706. Step 1706 increments the index, and passes control to step 1708. Step 1708 determines if the index is less than the size of the backing store master bit table, or in this case, 33,264. If the index is less than 33,264, control is passed back to step 1704. Steps 1704, 1706 and 1708 are repeated until a non-zero byte is found in the backing store master bit table, wherein control is passed to step 1714. Referring back to step 1708, if the index is not less than 33,264, control is passed to step 1710. Step 1710 sets an error code equal to MBT overflow. Control is then passed to step 1712, wherein the acquire backing store block is terminated.

Step 1714 sets a mask equal to 0X80. The mask 0X80, which as further described below, is used to identify the most significant bit of a byte. Control is then passed to step 1716. Step 1716 sets an index A equal to zero. Control is then passed to step 1718. Step 1718 sets a variable data equal to the value of the byte in the backing store master bit table identified by the index. Control is then passed to step 1720. Step 1720 determines if a logical AND of mask and data equals zero. If the mask logically ANDED with the data equals zero, the block of 64 pages identified by the mask bit are currently in use, and control is passed to step 1722. Step 1722 increments index A. Control is then passed to step 1724. Step 1724 shifts the mask by one bit to the right. Control is then passed back to step 1720. Step 1720, 1722 and 1724 are repeated for each bit in the byte identified by index A, until a bit having a value of 1 is identified. When this occurs, control is passed to step 1726. Step 1726 sets the variable data equal to data exclusive ORed with the mask, clearing that particular bit. Control is then passed to step 1728. Step 1728 sets the byte in the backing store master bit table that is identified by index equal to data. Control is then passed to step 1730. Step 1730 unlocks the backing store master bit table facility. Control is then passed to step 1732. Step 1732 sets the seek address equal to the index times 8+the index A, the quantity of which is multiplied by 64× the size of an IO page. Control is then passed to step 1734. Step 1734 returns the seek address back to the calling function, which in this example, is step 1326 of FIG. 13D.

Release Backing Store Block

Figure 16:
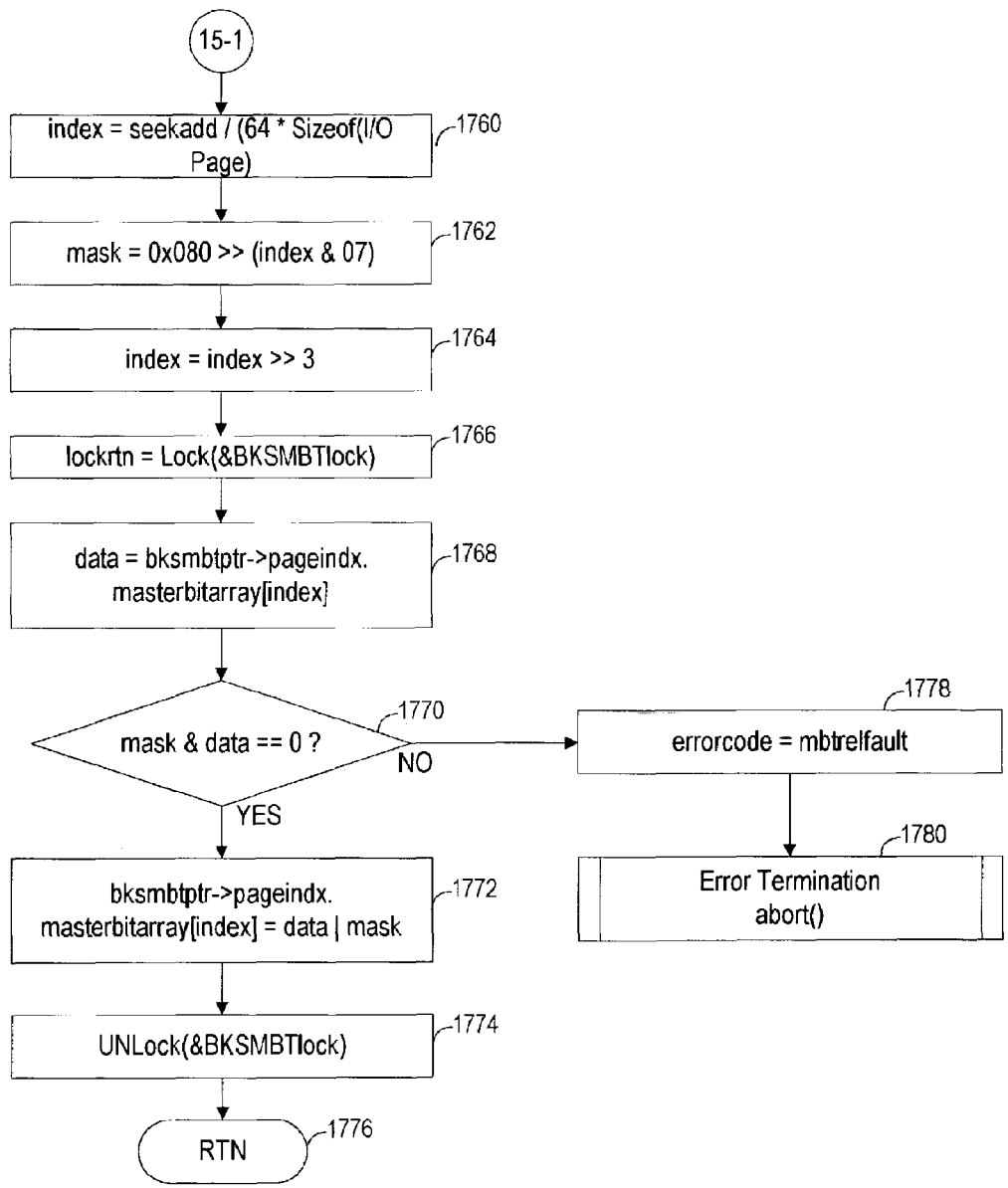
FIG. 16 is a flow diagram showing the release of a backing store block in accordance with an illustrative embodiment of the present invention.

FIG. 16 is a flow diagram showing the release of a backing store block in accordance with an illustrative embodiment of the present invention. The release of a backing store block is carried out in, for example, step 1420 of FIG. 13F. Step 1760 sets an index equal to the seek address/(64* Size of an IO Page)). Control is then passed to step 1762. Step 1762 calculates a mask by shifting 0X080 by a number between 0 and 7 which is controlled by the bottom 3 bits of the index. Control is then passed to step 1764. Step 1764 shifts the index by 3 bit positions to the right, which effectively divides the index by 8. Control is then passed to step 1766. Step 1766 locks the backing store master bit table facility. Control is then passed to step 1768. Step 1768 sets a data variable equal to the byte stored in the backing store master bit table array identified by the index. Control is then passed to step 1770. Step 1770 determines if the logical AND of the mask and data is zero. If the logical AND of the mask and data are zero, the block is assigned so that it can be released. Control is then passed to step 1772. Step 1772 assigns the byte in the backing store master bit facility identified by the index equal to data ORed with the mask, which releases the block. Control is then passed to step 1774. Step 1774 unlocks the backing store master bit table facility. Control is then passed to step 1776, which in this example, returns control to step 1420 of FIG. 13D.

Referring back to step 1770, if the logical AND of the mask and data is not equal to zero, control is passed to step 1778. If step 1778 is reached, a block of pages that is already released is attempting to be released. Step 1778 sets an error code equal to MBTREL fault. Control is then passed to step 1780, which terminates the function.

Having thus described the preferred embodiments of the present invention, those of skill in the art will readily appreciate that the teachings found herein may be applied to yet other embodiments within the scope of the claims hereto attached.

What is claimed is:

1. A data processing system, comprising:
   one or more requesters for accessing data by providing a corresponding first address from a first address range;
   a sparse matrix paging system for converting the first address provided by the one or more requesters to a second address of a second address range, wherein the second address range is smaller than the first address range; and
   wherein the first address is an absolute address.

2. A data processing system according to claim 1 wherein the second address is a virtual address.

3. A data processing system according to claim 1 wherein the second address is a real address.

4. A data processing system according to claim 1 wherein the sparse matrix paging system indexes one or more pages, wherein at least one of the pages includes the data corresponding to the first address.

5. A data processing system according to claim 4 wherein the sparse matrix paging system only indexes those pages that have been requested by the one or more requestors.

6. A data processing system according to claim 5 further including:
   a main memory;
   a backing store; and
   wherein the sparse matrix paging system does not index pages on the backing store until the number of requested pages exceed a capacity of the main memory.

7. A data processing system according to claim 1 further comprising an operating system, wherein the sparse matrix paging system is implemented as part of the operating system.

8. A data processing system according to claim 1 further comprising an operating system, wherein the sparse matrix paging system is implemented separate from the operating system.

9. A data processing system according to claim 8 wherein the sparse matrix paging system is implemented as an emulator.

10. A data processing system according to claim 1 wherein the sparse matrix paging system includes one or more levels of index tables.

11. A data processing system according to claim 10 wherein at least some of the one or more levels of index tables are hashed using, at least in part, the first address provided by the one or more requesters.

12. A data processing system according to claim 11 wherein the sparse matrix paging system dynamically creates another index table level when a predetermined threshold is reached.

13. A data processing system according to claim 11 wherein the sparse matrix paging system dynamically eliminates an index table level when a predetermined threshold is reached.

14. A data processing system according to claim 1 wherein the sparse matrix paging system dynamically creates a page for the requested data if a page does not yet exist.

15. A data processing system according to claim 1 wherein the sparse matrix paging system dynamically eliminates a page if the page has been squashed.

16. A data processing system according to claim 1 wherein the sparse matrix paging system selectively eliminates a page if the page is a least recently used page.

17. A method for accessing data, the method comprising the steps of:
   requesting data by providing a first address from a first address range;
   converting the first address to a second address of a second address range through indexing, wherein the second address range is smaller than the first address range, and wherein the second address corresponds to an indexed storage page, the storage pages being stored in a main memory and/or a backing store;
   wherein the converting step uses one or more levels of index tables, wherein at least one of the levels of index tables is hashed using, at least in part, the first address provided by the requesting step, and dynamically creating another index table level when a predetermined threshold is reached;
   only indexing those storage pages that are requested by the requesting step; and
   only storing pages on the backing store after the storage capacity of the main memory is reached.

18. A data processing system, comprising:
   one or more requestors for accessing data by providing a corresponding first address from a first address range;
   a sparse matrix paging system for converting the first address provided by the one or more requestors to a second address of a second address range, wherein the second address range is smaller than the first address range; and
   wherein the second address is a virtual address.

19. A data processing system, comprising:
   one or more requesters for accessing data by providing a corresponding first address from a first address range;
   a sparse matrix paging system for converting the first address provided by the one or more requestors to a second address of a second address range, wherein the second address range is smaller than the first address range; and
   an operating system, wherein the sparse matrix paging system is implemented as an emulator that is separate from the operating system.

20. A data processing system, comprising:
   one or more requesters for accessing data by providing a corresponding first address from a first address range;
   a sparse matrix paging system for converting the first address provided by the one or more requestors to a second address of a second address range, wherein the second address range is smaller than the first address range; and
   wherein the sparse matrix paging system includes one or more levels of index tables wherein at least some of the one or more levels of index tables are hashed using, at least in part, the first address provided by the one or more requesters, and wherein the sparse matrix paging system dynamically creates another index table level when a first predetermined threshold is reached.

21. A data processing system according to claim 20 wherein the sparse matrix paging system dynamically eliminates an index table level when a second predetermined threshold is reached.

22. A method for accessing data, the method comprising the steps of:
   requesting data by providing a first address from a first address range;

converting the first address to a second address of a second address range through indexing, wherein the second address range is smaller than the first address range, and wherein the second address corresponds to an indexed storage page, the storage pages being stored in a main memory and/or a backing store;

wherein the converting step uses one or more levels of index tables, wherein at least one of the levels of index tables is hashed using, at least in part, the first address provided by the requesting step, and dynamically eliminating an index table level when a predetermined threshold is reached;

only indexing those storage pages that are requested by the requesting step; and only storing pages on the backing store after the storage capacity of the main memory is reached.

23. A method for accessing data, the method comprising the steps of:

requesting data by providing a first address from a first address range;

converting the first address to a second address of a second address range through indexing, wherein the second address range is smaller than the first address range, and wherein the second address corresponds to an indexed storage page, the storage pages being stored in a main memory and/or a backing store;

wherein the converting step uses one or more levels of index tables, wherein at least one of the levels of index tables is hashed using, at least in part, the first address provided by the requesting step, and dynamically eliminating a storage page if the storage page has been squashed;

only indexing those storage pages that are requested by the requesting step; and only storing pages on the backing store after the storage capacity of the main memory is reached.

24. A method for accessing data, the method comprising the steps of:

requesting data by providing a first address from a first address range;

converting the first address to a second address of a second address range through indexing, wherein the second address range is smaller than the first address range, and wherein the second address corresponds to an indexed storage page, the storage pages being stored in a main memory and/or a backing store;

wherein the converting step uses one or more levels of index tables, wherein at least one of the levels of index tables is hashed using, at least in part, the first address provided by the requesting step, and selectively eliminating a storage page if the storage page is a least recently used page;

only indexing those storage pages that are requested by the requesting step; and only storing pages on the backing store after the storage capacity of the main memory is reached.

* * * * *